(12) United States Patent
Paliwal et al.

(10) Patent No.: US 12,401,743 B1
(45) Date of Patent: Aug. 26, 2025

(54) CUSTOMER AGENT RECORDING SYSTEMS AND METHODS

(71) Applicant: Ujwal Inc., Mountain View, CA (US)

(72) Inventors: Neeraj Paliwal, Bangalore (IN);
Bhupesh Rohilla, New Delhi (IN);
Shlok Kapoor, New Delhi (IN);
Aadarsh Verma, New Delhi (IN);
Abhimanyu Talwar, Mississauga (CA);
Sumeet Khullar, Santa Clara, CA (US);
Shubham Goswami, New Delhi (IN);
Ashish Nagar, Los Altos, CA (US);
Kishan Joshi, Ahmedabad (IN);
Manisha Barnwal, New Orleans, LA (US)

(73) Assignee: Ujwal Inc., Mountain View, CA (US)

( * ) Notice: Subject to any disclaimer, the term of this patent is extended or adjusted under 35 U.S.C. 154(b) by 0 days.

(21) Appl. No.: 19/169,882

(22) Filed: Apr. 3, 2025

Related U.S. Application Data

(63) Continuation of application No. PCT/US2024/034187, filed on Jun. 14, 2024.

(60) Provisional application No. 63/597,343, filed on Nov. 9, 2023, provisional application No. 63/521,105, filed on Jun. 15, 2023.

(51) Int. Cl.
| | |
|---|---|
| *H04M 1/64* | (2006.01) |
| *G10L 15/16* | (2006.01) |
| *H04M 3/42* | (2006.01) |
| *H04M 3/51* | (2006.01) |
| *G10L 15/08* | (2006.01) |

(52) U.S. Cl.
CPC ......... *H04M 3/42221* (2013.01); *G10L 15/16* (2013.01); *H04M 3/5175* (2013.01); *G10L 2015/088* (2013.01)

(58) Field of Classification Search
CPC . H04M 3/42221; H04M 3/5175; G10L 15/16; G10L 2015/088; G10L 17/24
USPC ............................................................ 379/68
See application file for complete search history.

(56) References Cited

U.S. PATENT DOCUMENTS

| | | | |
|---|---|---|---|
| 2015/0131792 A1 | 5/2015 | Kuhn et al. | |
| 2018/0220002 A1 | 8/2018 | Wu et al. | |
| 2021/0203784 A1 | 7/2021 | Konig et al. | |
| 2022/0328050 A1 * | 10/2022 | Hennig | G10L 17/24 |
| 2022/0417579 A1 | 12/2022 | Dorogusker et al. | |

OTHER PUBLICATIONS

International Search Report and Written Opinion of PCT Application No. PCT/US24/34187, mailed on Sep. 12, 2024.

* cited by examiner

*Primary Examiner* — Md S Elahee
(74) *Attorney, Agent, or Firm* — American Patent Agency PC; Daniar Hussain; Stephen M. Hou

(57) ABSTRACT

Automatic analyses of customer-agent interactions provide valuable, actionable feedback for managers, agents, and customers. To provide such analyses, methods for recording and analysis of customer-agent interactions using a customer relationship management (CRM) system are disclosed. A recorder application records the customer-agent interaction, and sensitive information may be identified. Sensitive portions of the recording may then be redacted and removed from the recording. The redacted recording is then analyzed to generate useful summary and analytics information.

18 Claims, 35 Drawing Sheets

FIG. 28

FIG. 31

CUSTOMER AGENT RECORDING SYSTEMS AND METHODS

REFERENCE TO RELATED APPLICATIONS

If an Application Data Sheet (ADS) or PCT Request Form ("Request") has been filed on the filing date of this application, it is incorporated by reference herein. Any applications claimed on the ADS or Request for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

Furthermore, this application is related to the U.S. patent applications listed below, which are incorporated by reference in their entireties herein, as if fully set forth herein:

- U.S. provisional patent application No. 63/442,159, filed on 31 Jan. 2023, entitled "Configurable Intent Phrase Based Quality Assurance Systems," describing semantic similarity-based configurable systems for automatic scenario detection in customer-agent conversations.
- U.S. provisional patent application No. 63/521,105, filed on 15 Jun. 2023, entitled "Customer Agent Screen Recording Systems and Methods," describing methods for triggered recording and analysis of customer-agent interactions using a customer relationship management (CRM) system.
- U.S. provisional patent application No. 63/597,343, filed on 9 Nov. 2023, entitled "Transformer-Based Assistant for Identifying, Organizing, and Responding to Customer Concerns," describing transformer-based agent assistant systems that serve as machine learning-based customer service tools that analyze past customer-agent conversations to build knowledge bases of problem-resolution steps.
- PCT patent application No. PCT/US24/13558, filed on 30 Jan. 2024, entitled "Quality Assurance Systems Based on Speaker Intent Detection," describing semantic similarity-based configurable systems for automatic scenario detection in customer-agent conversations.
- PCT patent application No. PCT/US24/34187, filed on 14 Jun. 2024, entitled "Customer Agent Recording Systems and Methods," describing methods for triggered recording and analysis of customer-agent interactions using a customer relationship management (CRM) system.
- PCT patent application No. PCT/US24/55312, filed on 11 Nov. 2024, entitled "Transformer-Based Assistant for Identifying, Organizing, and Responding to Customer Concerns," describing transformer-based agent assistant systems that serve as machine learning-based customer service tools that analyze past customer-agent conversations to build knowledge bases of problem-resolution steps.

FIELD OF THE INVENTION

This disclosure relates to an artificial intelligence based system for recording of customer-agent interactions.

BACKGROUND OF THE INVENTION

The statements in the background of the invention are provided to assist with understanding the invention and its applications and uses, and may not constitute prior art.

As companies grow in terms of employees, products, and complexity, it is vital that they maintain positive customer-company relationships. A typical scenario involves a customer reaching out to a company's customer service hotline. The customer is then re-directed to a call agent, where the agent assists the customer regarding his or her questions or concerns. Contact centers that manage such agents have come to realize that the quality of customer experiences largely depends on the performance of these front-line agents. However, these agents need feedback and guidance in order to understand specifically how to improve their customer engagements. Additionally, the agents work in complex environments and must manage multiple tools to perform their work effectively. Consequently, issues such as tool proliferation, knowledge availability, tracking compliance, and agent engagement are among the most common challenges faced by contact center leaders on a day-to-day basis.

On the other hand, large contact center teams often struggle to understand what constitutes a great customer experience. While analysts can infer it from various metrics such as average handling time (AHT) and customer satisfaction (CSAT) scores, they often find it difficult to determine with any certainty what specifically works and what specifically does not work in terms of influencing or improving the customer experience. The evolution of the industry includes a progression from auditors physically sitting next to agents to observe their actions during calls, to screenshot-based agent activity tracking, and more recently, to solutions that record agent sessions based on the start and stop of customer cases. While such screenshot-based agent activity trackers are trying to solve screen recording based on the start and stop of the customer case, they fall short in offering a compelling value proposition in the following areas: (1) helping auditors quickly skim through the entire screen recording, generate insights, and take action; (2) solving for e-mail and chat (asynchronous) as a channel, as these solutions are primarily focused on voice as a channel; (3) providing compliance and governance features such as PII/PCI redaction and restricted downloading; and (4) offering screen analytics to view the time distribution of different platforms/screens used by the agent during the call and make it actionable.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

Accordingly, in view of the background, it would be an advancement in the state of the art to develop methods for recording and analysis of customer-agent interactions using a customer relationship management (CRM) system. A recorder application records the customer-agent interaction, and sensitive information may be redacted. The recording is then analyzed to generate useful summary and analytics information.

According to a first aspect or in one embodiment, a computer-implemented method for recording and redacting a customer-agent interaction using a customer relationship management (CRM) system is provided. The method may comprise starting a recording of the customer-agent interaction. The method may comprise sending a record command to a recorder application. The method may comprise recording the customer-agent interaction to generate a recorded interaction file. The recorded interaction file may comprise a video recording of the customer-agent interaction. The method may comprise halting the recording of the customer-agent interaction. The method may comprise analyzing the recorded interaction file by identifying a plurality of portions of the recorded interaction file to be redacted by a rule-based redaction matching model comprising a trained neural network. The method may comprise redacting the recorded interaction file by removing the plurality of portions of the recorded interaction file to be redacted to generate a redacted recording file. The method may comprise generating a non-skip playlist comprising a plurality of non-skip ranges using a computer-vision based algorithm. The method may comprise generating a smart screen metadata by utilizing a trained supervised neural network. The method may comprise storing the redacted recording file, the non-skip playlist, and the smart screen metadata into a database.

In one embodiment, the smart screen metadata comprises timeline snippets. The timeline snippets may further comprise a plurality of time ranges in the customer-agent interaction based on the plurality of non-skip ranges.

In one embodiment, the smart screen metadata comprises a resolution metadata. The resolution metadata may be determined from natural language processing applied to the redacted recording file.

In one embodiment, the smart screen metadata further comprises a quality assurance metadata. The quality assurance metadata may be based on the resolution metadata.

In one embodiment, the rule-based redaction matching model comprising the trained neural network is trained on simulated data sets.

In one embodiment, the computer-vision based algorithm analyzes the redacted recording file in the context of frame detection and screen recording to generate a dynamic ranging to generate the non-skip playlist. The dynamic ranging may be configured to provide dynamic grouping and dynamic thresholding.

In one embodiment, the trained supervised neural network uses optical character reading (OCR) to generate the smart screen metadata. The OCR may comprise OCR detection and OCR recognition.

In one embodiment, the method may further comprise triggering a recording of the customer-agent interaction by automatic scenario detection of an interaction beginning scenario using a semantic similarity based configurable system. The method may further comprise triggering a halting of the recording of the customer-agent interaction by automatic scenario detection of an interaction ending scenario using the semantic similarity based configurable system. The method may further comprise analyzing the recorded interaction file by identifying a plurality of portions of the recorded interaction file to be redacted by automatic scenario detection of sensitive scenarios using the semantic similarity based configurable system.

In one embodiment, the automatic scenario detection using the semantic similarity based configurable system for triggering the recording (or simply "automatic scenario detection for triggering the recording") may comprise receiving, by a retrieve stage, a plurality of conversation beginning scenarios and a plurality of lists of conversation beginning sample phrases. Each scenario of the plurality of scenarios may be associated with a list of sample phrases. The automatic scenario detection for triggering the recording may comprise encoding, by the retrieve stage, each sample phrase in the plurality of lists of sample phrases into phrase encodings. The automatic scenario detection for triggering the recording may comprise receiving, by the retrieve stage, an utterance. The utterance may comprise a portion of the customer-agent interaction being currently analyzed. The automatic scenario detection for triggering the recording may comprise encoding, by the retrieve stage, an encoding of the utterance. The automatic scenario detection for triggering the recording may comprise determining, by the retrieve stage, a plurality of first similarity scores for the encoding of the utterance. Each first similarity score of the plurality of first similarity scores may be associated with a scenario of the plurality of scenarios. The automatic scenario detection for triggering the recording may comprise determining a highest first similarity score among the plurality of first similarity scores. The automatic scenario detection for triggering the recording may comprise determining a no interaction beginning scenario if the highest first similarity score is below a first preset threshold. The automatic scenario detection for triggering the recording may comprise determining an interaction beginning scenario from the plurality of scenarios associated with the utterance. The beginning scenario may be associated with the highest first similarity score of the plurality of first similarity scores indicating a beginning of the customer-agent interaction. The automatic scenario detection for triggering the recording may comprise determining, by a rerank stage, a plurality of second similarity scores for the encoding of the utterance and the closest scenario. Each second similarity score of the plurality of second similarity scores may be associated with the list of sample phrases associated with the closest scenario. The automatic scenario detection for triggering the recording may comprise determining, by the rerank stage, a no interaction beginning scenario if none of the second similarity scores among the plurality of similarity scores exceeds a second preset threshold. The automatic scenario detection for triggering the recording may comprise generating, by the rerank stage, a conversation beginning label of the closest scenario if at least one of the second similarity scores among the plurality of similarity scores exceeds the second preset threshold.

In one embodiment, the automatic scenario detection using the semantic similarity based configurable system for identifying the plurality of portions of the recorded interaction file to be redacted (or simply "automatic scenario detection for identifying redaction portions") may comprise receiving, by a retrieve stage, a plurality of sensitive scenarios and a plurality of lists of sample sensitive phrases, wherein each scenario of the plurality of scenarios is associated with a list of sample sensitive phrases. The automatic scenario detection for identifying redaction portions may comprise encoding, by the retrieve stage, each sample phrase in the plurality of lists of sample phrases into phrase encodings. The automatic scenario detection for identifying redaction portions may comprise receiving, by the retrieve stage, an utterance. The utterance may comprise a portion of the customer-agent interaction being currently analyzed. The automatic scenario detection for identifying redaction portions may comprise encoding, by the retrieve stage, an encoding of the utterance. The automatic scenario detection for identifying redaction portions may comprise determining, by the retrieve stage, a plurality of first similarity scores for the encoding of the utterance. Each first similarity score of the plurality of first similarity scores may be associated with a sensitive scenario of the plurality of scenarios. The automatic scenario detection for identifying redaction portions may comprise determining a highest first similarity score among the plurality of first similarity scores. The automatic scenario detection for identifying redaction portions may comprise determining a no sensitive scenario if the highest first similarity score is below a first preset threshold. The automatic scenario detection for identifying redaction portions may comprise determining the sensitive scenario from the plurality of scenarios associated with the utterance. The closest scenario may be associated with the highest first similarity score of the plurality of first similarity scores. The automatic scenario detection for identifying redaction portions may comprise determining, by a rerank stage, a plurality of second similarity scores for the encoding of the utterance and the closest scenario. Each second similarity score of the plurality of second similarity scores may be associated with the list of sample phrases associated with the closest scenario. The automatic scenario detection for identifying redaction portions may comprise determining, by the rerank stage, a no sensitive scenario if none of the second similarity scores among the plurality of similarity scores exceeds a second preset threshold. The automatic scenario detection for identifying redaction portions may comprise generating, by the rerank stage, a sensitive label of the closest scenario if at least one of the second similarity scores among the plurality of similarity scores exceeds the second preset threshold.

In one embodiment, the automatic scenario detection using the semantic similarity based configurable system for triggering the halting of the recording (or simply "automatic scenario detection for triggering halting") may comprise receiving, by a retrieve stage, a plurality of interaction ending scenarios and a plurality of lists of sample interaction ending phrases. Each interaction ending scenario of the plurality of scenarios may be associated with a list of sample interaction ending phrases. The automatic scenario detection for triggering halting may comprise encoding, by the retrieve stage, each sample phrase in the plurality of lists of sample phrases into phrase encodings. The automatic scenario detection for triggering halting may comprise receiving, by the retrieve stage, an utterance. The automatic scenario detection for triggering halting may comprise encoding, by the retrieve stage, an encoding of the utterance. The utterance may comprise a portion of the customer-agent interaction being currently analyzed. The automatic scenario detection for triggering halting may comprise determining, by the retrieve stage, a plurality of first similarity scores for the encoding of the utterance. Each first similarity score of the plurality of first similarity scores may be associated with a scenario of the plurality of scenarios. The automatic scenario detection for triggering halting may comprise determining a highest first similarity score among the plurality of first similarity scores. The automatic scenario detection for triggering halting may comprise determining a no conversation ending scenario if the highest first similarity score is below a first preset threshold. The automatic scenario detection for triggering halting may comprise determining a conversation ending scenario from the plurality of scenarios associated with the utterance. The closest scenario may be associated with the highest first similarity score of the plurality of first similarity scores. The automatic scenario detection for triggering halting may comprise determining by a rerank stage a plurality of second similarity scores for the encoding of the utterance and the closest scenario. Each second similarity score of the plurality of second similarity scores may be associated with the list of sample phrases associated with the closest scenario. The automatic scenario detection for triggering halting may comprise determining by the rerank stage a no intent scenario if none of the second similarity scores among the plurality of similarity scores exceeds a second preset threshold. The automatic scenario detection for triggering halting may comprise generating by the rerank stage a label of the closest scenario if at least one of the second similarity scores among the plurality of similarity scores exceeds the second preset threshold.

In one embodiment, the method further comprises generating an analytics report.

In one embodiment, the method further comprises generating an audit report of the portions that were redacted.

In one embodiment, the method further comprises streaming the recording of the customer-agent interaction to a media service.

In one embodiment, the method further comprises streaming the redacted recording file of the customer-agent interaction to a media service.

In one embodiment, analyzing the recorded interaction file is concurrent with recording the customer-agent interaction to generate the recorded interaction file.

According to a second or in one embodiment, a non-transitory physical storage medium storing program code is provided. The program code is executable by a hardware processor. The hardware processor when executing the program code causes the hardware processor to execute a computer-implemented process for recording and redacting a customer-agent interaction using a customer relationship management (CRM) system. The program code comprises code that may start a recording of the customer-agent interaction. The program code may comprise code to send a record command to a recorder application. The program code may comprise code to record the customer-agent interaction to generate a recorded interaction file. The recorded interaction file may comprise a video recording of the customer-agent interaction. The program code may comprise code to halt the recording of the customer-agent interaction. The program code may comprise code to analyze the recorded interaction file by identifying a plurality of portions of the recorded interaction file to be redacted by a rule-based redaction matching model comprising a trained neural network. The program code may comprise code to redact the recorded interaction file by removing the plurality of portions of the recorded interaction file to be redacted to generate a redacted recording file. The program code may comprise code to generate a non-skip playlist comprising a plurality of non-skip ranges using a computer-vision based algorithm. The program code may comprise code to generate a smart screen metadata by utilizing a trained supervised neural network. The program code may comprise code to store the redacted recording file, the non-skip playlist, and the smart screen metadata into a database.

In one embodiment, the smart screen metadata comprises timeline snippets comprising a plurality of time ranges in the customer-agent interaction based on the plurality of non-skip ranges.

In one embodiment, the smart screen metadata comprises resolution metadata, wherein the resolution metadata is determined from natural language processing applied to the redacted recording file.

In one embodiment, the smart screen metadata further comprises quality assurance metadata, wherein the quality assurance metadata is based on the resolution metadata.

In various embodiments, a computer program product is disclosed. The computer program may include a computer-readable storage medium having program instructions, or program code, embodied therewith, the program instructions executable by a processor to cause the processor to perform steps to the steps described herein.

In various embodiments, a system is described, including a memory that stores computer-executable components, and a hardware processor, operably coupled to the memory, and that executes the computer-executable components stored in the memory, wherein the computer-executable components may include components communicatively coupled with the processor that execute the steps described herein.

In another embodiment, the present invention is a non-transitory, computer-readable storage medium storing executable instructions, which when executed by a processor, causes the processor to perform a process for recording and analysis of a customer-agent interaction using a customer relationship management (CRM) system, the instructions causing the processor to perform the steps described herein.

In another embodiment, the present invention is a system for recording and analysis of a customer-agent interaction using a customer relationship management (CRM) system, as shown and described herein, the system comprising a user device having a processor, a display, a first memory; a server comprising a second memory and a data repository; a telecommunications-link between said user device and said server; and a plurality of computer codes embodied on said first and second memory of said user-device and said server, said plurality of computer codes which when executed causes said server and said user-device to execute a process comprising the steps described herein.

In yet another embodiment, the present invention is a computerized server comprising at least one processor, memory, and a plurality of computer codes embodied on said memory, said plurality of computer codes which when executed causes said processor to execute a process comprising the steps described herein. Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which:

FIG. 28 shows a first example graphical user interface (GUI) as it relates to a scenario detection and conversation tag system, according to exemplary embodiments of the present invention.

FIG. 31 shows a fourth example graphical user interface (GUI) as it relates to a scenario detection and conversation tag system, according to exemplary embodiments of the present invention.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Customer-Agent Interaction Recording System: An Overview

Figure 1:
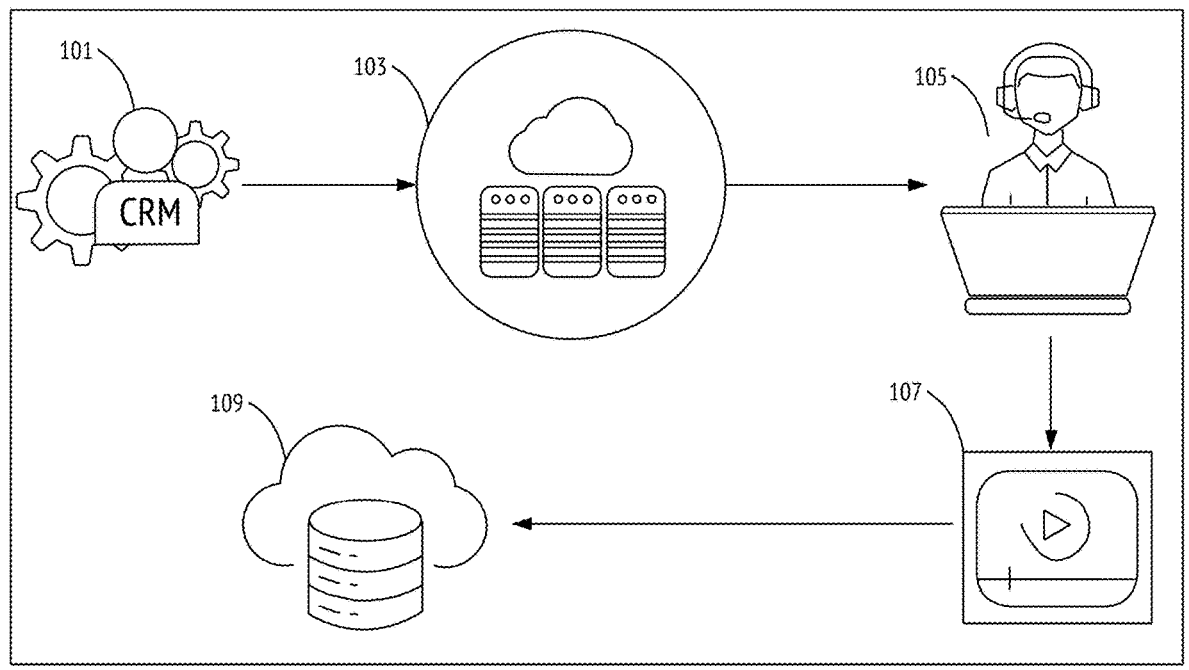
FIG. 1 shows an example workflow for a customer-agent interaction recording system, in accordance with the examples disclosed herein.

FIG. 1 shows an example workflow for a customer-agent interaction recording system, in accordance with the examples disclosed herein. This workflow for a customer-agent interaction recording system provides a screen recording product that meets the challenge of obtaining actionable insights from agent interactions with customers, especially when the agents are performing critical tasks on their computers. Call center supervisors are interested in knowing what their agents are doing during attending to business-critical customer calls. This solution brings the detailed analysis of which applications agents are using for how long with all compliances by redacting personal data from video. From the agents' perspective, they merely need to install a recorder application and log in, which enables quick onboarding and training for agents. Afterwards, this application will automatically start (begin) and stop (halt) recording as agents attend calls. The recordings are analyzed for the supervisor to obtain and review.

In some embodiments, the customer-agent interaction recording system is lightweight, platform-agnostic, and case-agnostic. This enables the system to be compatible with platforms that include APIs that provide start and stop level case triggers as well as with platforms that may not. Thus, the system is built to cover all cases and cater to various platform requirements. The system also supports a wide range of customer relationship management (CRM) and telephony systems.

In some embodiments, the system is able to provide omni-channel screen recording across voice, e-mail, and chat channels, with support for parallel cases. In some embodiments, the system is integrated with AI technology to help identify key moments in the screen recording and make the recording actionable for auditors and leaders. In some embodiments, the system uses industry-compliant data storage and access with payment card industry (PCI) and personal identifying information (PII) redaction for potential review by auditors or agents. Finally, in some embodiments, the system provides integrated screen recording analytics that make it easy for managers to take action based on insights gleaned from the recordings.

An overview of the steps of the example workflow for a customer-agent interaction recording system as described below, and FIGS. 2, 3, 4, and 5 show more detailed representations of the steps.

In step 101, a customer relationship management (CRM) system decides to record a customer-agent interaction. In some embodiments, the customer-agent interaction is automatically recorded without prompting. In some embodiments, an entire work session or work day for an agent may be recorded, and then individual customer-agent interactions in the omnibus recording are later identified and split into individual files or recordings. In some embodiments, the decision to record the customer-agent interaction may be triggered by one or more events. In some embodiments, the CRM system includes a human who is monitoring the customer-agent interaction, and the human triggers the decision to record. In some embodiments, the CRM system includes a computer system that in turn includes an artificial intelligence (AI) module, and the computer system triggers the decision to record. In some embodiments, the decision to record the customer-agent interaction occurs while the interaction is still ongoing.

In step 103, the CRM system sends a "record" command to a backend application, which receives the command. In some embodiments, the CRM system and the backend application reside on the same computer. In other embodiments, the CRM system and the backend application reside on different computers, in which case the command may be sent via any computer networking protocol, e.g. the Internet, an intranet, or a wired connection.

In step 105, the backend application directs a recorder application ("recorder app") to record the targeted customer-agent interaction. In some embodiments, the recorder app resides on the agent's computer. In other embodiments, the recorder app resides on a different computer from the agent's, in which case the targeted customer-agent interaction is sent from the agent's computer to the recorder app. In some embodiments, one or more (or a combination thereof) of the following are recorded from the targeted customer-agent interaction: audio, screenshots, and video. Audio may include sound uttered by the customer and/or by the agent that is transmitted to the other party. Screenshots may include screen or image captures of part of or the entirety of the agent's computer screen at some points during the targeted customer-agent interaction. Video may include a series of screen or image captures of part of or the entirety of the agent's computer screen at some points during the targeted customer-agent interaction. In cases where the agent accesses the customer's computer screen (e.g. an information technology agent is troubleshooting a customer's computer), the recording of the agent's computer screen therefore may include in part a recording of the customer's computer screen. In cases where an agent accesses multiple screens sequentially or simultaneously, all the screens may be recorded.

In some embodiments, only video is captured, and audio may be supplied by the CRM. In some embodiments, the audio and video information are combined into a single audio-video (A/V) record of the targeted customer-agent interaction. In some embodiments, the various recorded portions of the targeted customer-agent interaction are combined into a recorded interaction file. In some embodiments, keystrokes entered by the agent, mouse movement made by the agent, and/or names of files accessed by the agent are also recorded.

In step 107, the targeted customer-agent interaction is analyzed and selected aspects of the interaction are redacted, which generates an analytics report and a redacted recording in the form of a redacted recording file of the targeted customer-agent interaction. In some embodiments, an analytics engine performs the analysis and redaction.

In step 109, the redacted recording of the customer-agent interaction and/or the analytics report are uploaded to an electronic storage system. In some embodiments, the read and/or write access to the electronic storage system may be restricted to particular users. In some embodiments, the contents of the electronic storage system may be encrypted.

Customer-Agent Interaction Recording System: Process Steps

FIGS. 2, 3, 4, and 5 show more detailed representations of the steps of an example workflow for a customer-agent interaction recording system as discussed with reference to FIG. 1.

Figure 2:
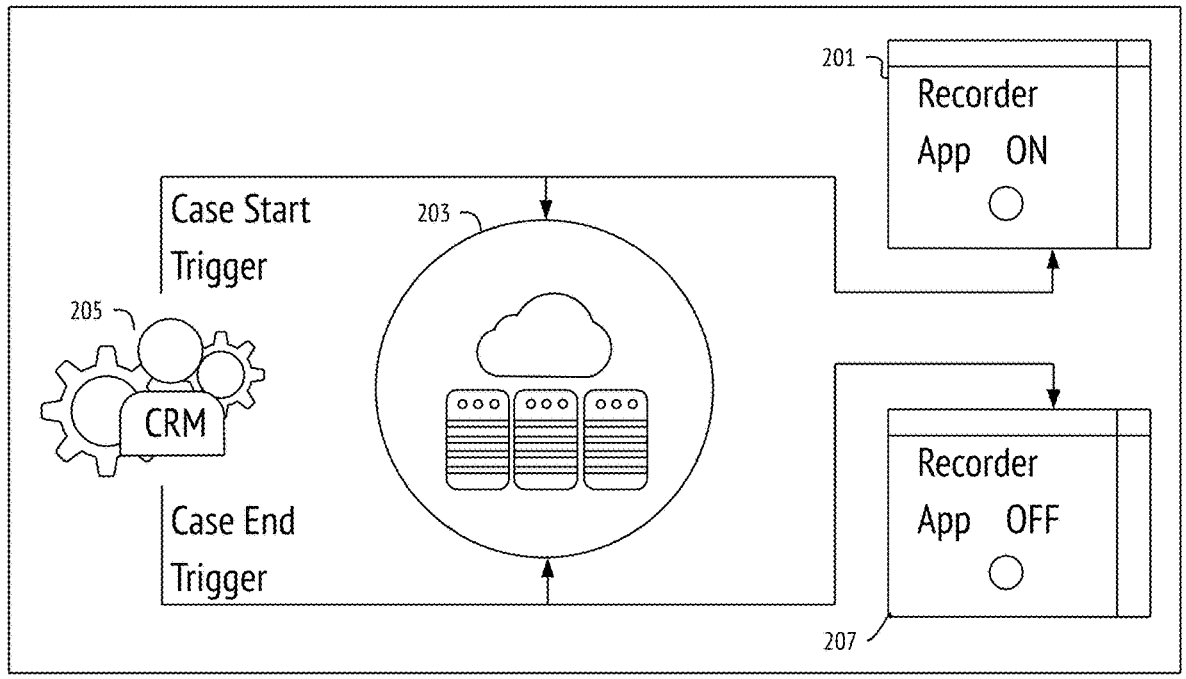
FIG. 2 shows an example flowchart involving a CRM trigger event for a customer-agent interaction recording system, in accordance with the examples disclosed herein.

FIG. 2 shows an example flowchart involving a CRM trigger event for a customer-agent interaction recording system, in accordance with the examples disclosed herein. In some embodiments, this example flowchart corresponds to steps 101 and 103 with reference to the workflow shown in FIG. 1. The system monitors an ongoing, targeted customer-agent interaction (CRM) 205, and the decision to start (begin) or to stop (halt) recording a targeted customer-agent interaction is triggered by one or more events. In some embodiments, the recording is stored in and retrieved from a database 203. In some embodiments, a user may customize the set of types of events that trigger the starting or the stopping of a recording. In some embodiments, events that trigger the recording to start include: (1) the system determines that the customer is expressing dissatisfaction with customer service or other negative emotions, and (2) the system determines that the customer is expressing satisfaction with customer service or other positive emotions. Each of these cases would be of interest to analyze to improve the performance of agents. Similarly, events that trigger the recording to stop (halt) include: (1) the system determines that the targeted customer-agent interaction is at or nearing completion, and (2) the system determines that the targeted customer-agent interaction has switched topics.

In order to detect the aforementioned events, in some embodiments, the customer-agent interaction recording system further comprises a scenario detection system and a conversation tag system, which provides an integrated system of "scenarios and conversation tags" that enables clients to configure various types of events to be detected. The "scenarios" portion of the integrated system is a behavior detection system, and the "conversation tags" portion of the integrated system is an alarm system. The alarm is triggered contingent on detection of a scenario, and, in some embodiments, a few other configuration options. The scenario detection system and a conversation tag system are described in further detail with reference to FIGS. 8, 9, 10, 11, and 12.

After the decision to start or stop the recording is made, the customer-agent interaction recording system sends a command to the recorder app to start or stop the recording. In some embodiments, a window on the agent's computer screen shows the status of the recorder app: "ON" 201 if the present interaction is being recorded and "OFF" 207 otherwise.

Figure 3:
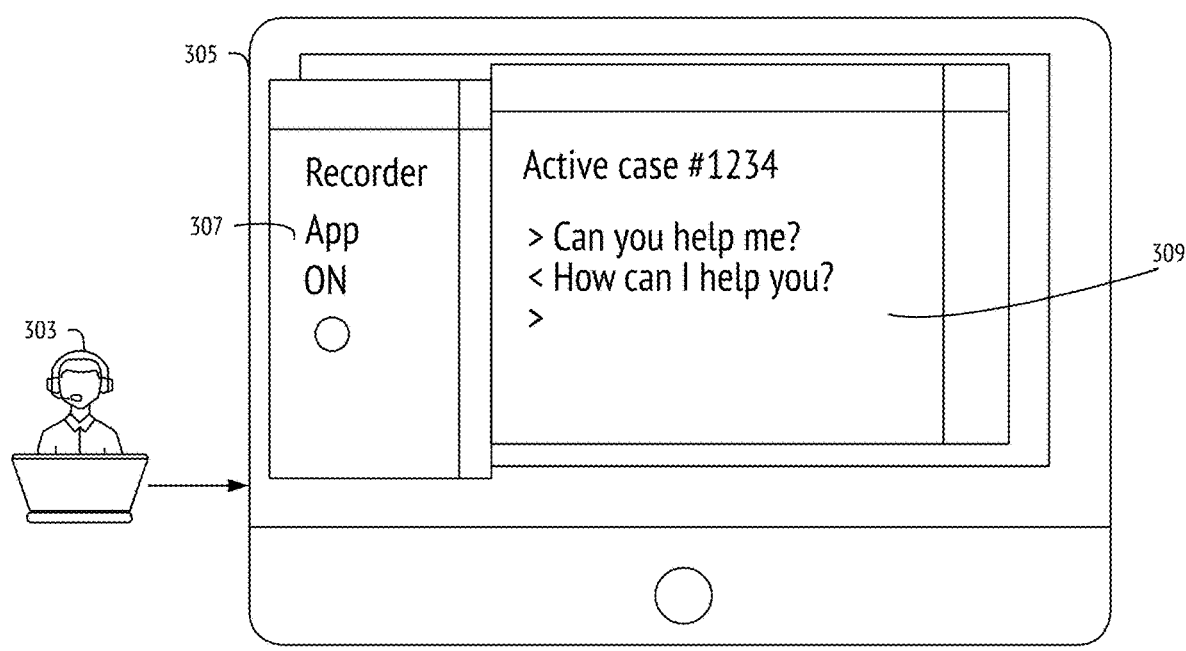
FIG. 3 shows an example idealized screenshot while a customer-agent interaction is being recorded, in accordance with the examples disclosed herein.

FIG. 3 shows an example idealized screenshot while a customer-agent interaction is being recorded. in accordance with the examples disclosed herein. In some embodiments, this example idealized screenshot corresponds to step 105 with reference to the workflow shown in FIG. 1. During the targeted customer-agent interaction, a window on the agent's 303 computer screen 305 shows that the status of the recorder app is "ON" 307. In some embodiments, any aspects of a conversation within the targeted customer-agent interaction may be recorded. For example, if the targeted customer-agent interaction comprises a text conversation 309, then the text messages on the screen are captured as a video or as a series of screenshots; if the targeted customer-agent interaction comprises a telephonic conversation, then the telephonic conversation is recorded. In some embodiments, the recorder app installed on the agent computer records all activity of the agent for a supervisor to analyze later. In addition to text conversations, the activity may include keystrokes, mouse movements, and list of files accessed.

Figure 4:
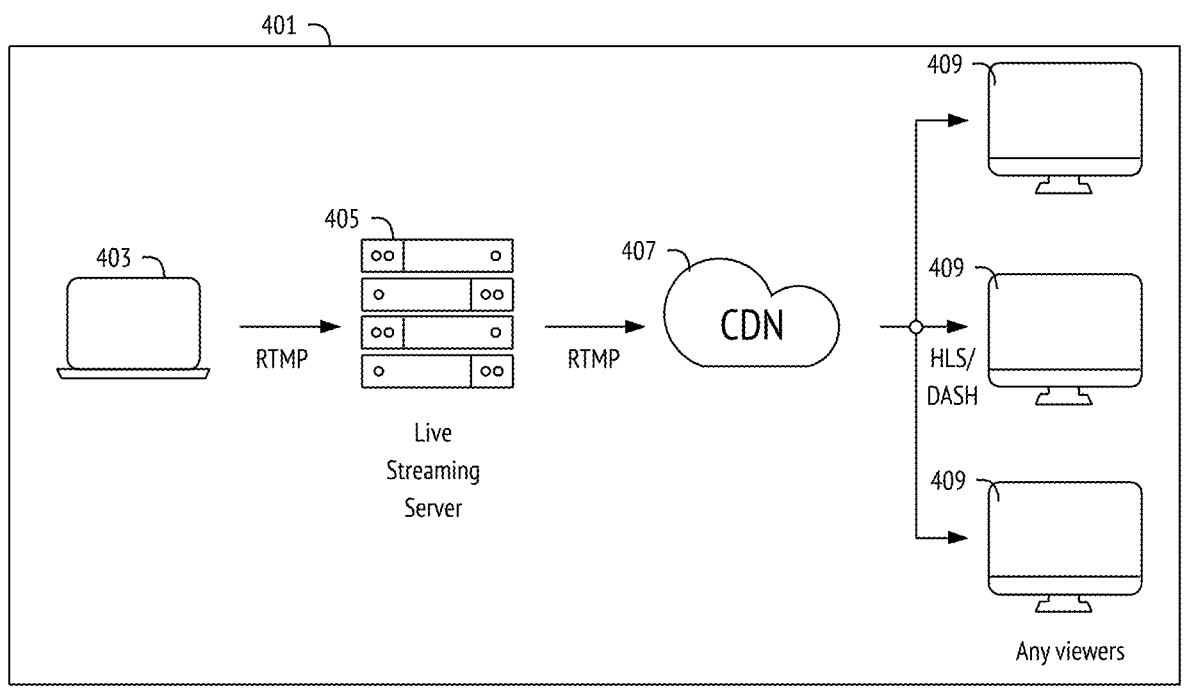
FIG. 4 shows an example data streaming flowchart while a customer-agent interaction is being recorded, in accordance with the examples disclosed herein.

FIG. 4 shows an example data streaming flowchart 401 while a customer-agent interaction is being recorded, in accordance with the examples disclosed herein. In some embodiments, this example flowchart 401 corresponds to step 105 with reference to the workflow shown in FIG. 1. In some embodiments, the recorder app streams frames from the agent's computer 403 to a media service, which is finally stored on cloud for later usage. In some embodiments, the frames from the agent's computer 403 are streamed in real-time, e.g., via real-time messaging protocol (RTMP) to a live streaming server 405. The live streaming server 405 then further streams the frames (e.g., via RTMP) through a content delivery network (CDN) 407 to a variety of potential viewers 409. In some embodiments, the CDN 407 delivers the frames to the viewers 409 using the HTTP live streaming (HLS) protocol or dynamic adaptive streaming over HTTP (MPEG-DASH), standards for streaming video and audio content over the Internet. The choice of protocol may depend on bandwidth, network conditions, and buffering requirements. Thus, the viewers 409 may view content (e.g. audio, video, screenshots) from the agent's computer 403 in real-time or near real-time. In some embodiments, a viewer may provide real-time feedback to the recorded agent via e-mail, text messaging, etc.

Figure 5:
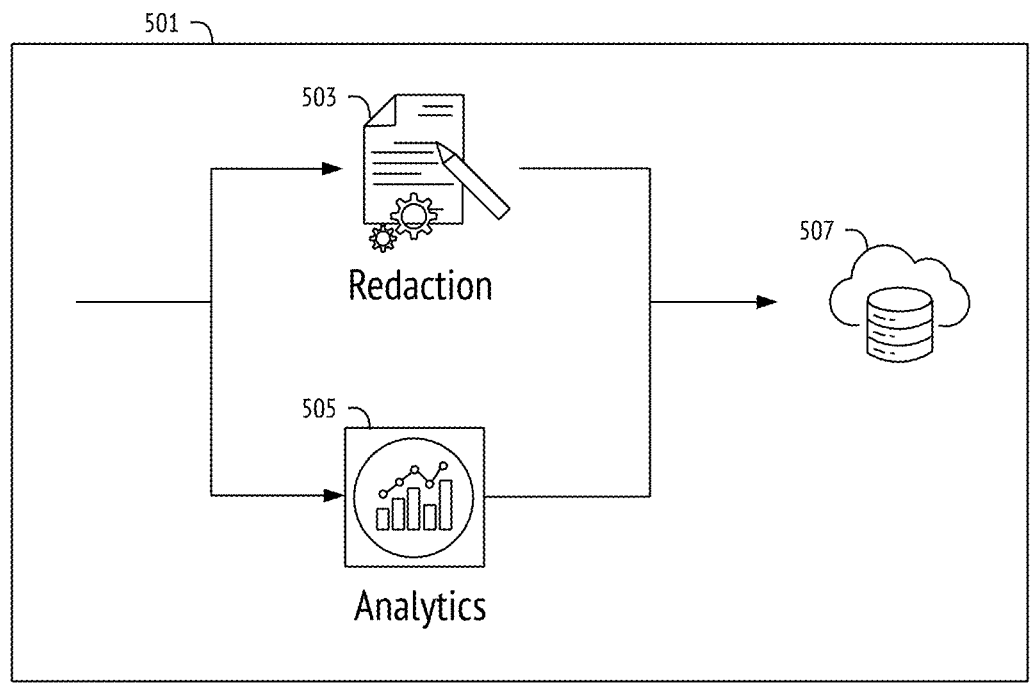
FIG. 5 shows an example flowchart for an analysis and redaction of a customer-agent interaction recording, and the storage of an analytics report and a redacted recording of the targeted customer-agent interaction, in accordance with the examples disclosed herein.

FIG. 5 shows an example flowchart 501 for an analysis and redaction of a customer-agent interaction recording, and the storage of an analytics report and a redacted recording of the targeted customer-agent interaction, in accordance with the examples disclosed herein. In some embodiments, this example flowchart 501 corresponds to steps 107 and 109 with reference to the workflow shown in FIG. 1. Before uploading it on cloud 507, there is redaction 503 of sensitive data from video and generation 505 of an analytics report. For example, if the customer or agent in the targeted customer-agent interaction mentions personal information that is irrelevant for QA purposes, such as names, mailing and e-mail addresses, phone numbers, government ID numbers, financial information, medical information, names of applications accessed by agents, etc., that information may be redacted from the recording.

The redaction 503 may include, for example, replacing audio segments with noise or silence, replacing portions of videos or screenshots with pixelated regions or other cover-up regions. In some embodiments, an analytics engine powered by artificial intelligence (AI) systems are employed to determine whether sensitive data is present and to redact the appropriate sections. In some embodiments, the scenario detection system and a conversation tag system described in further detail with reference to FIGS. 17-31 may be used for such purposes.

In addition to data redaction, in some embodiments, an analytics engine may generate 505 an analytics report associated with the targeted customer-agent interaction. In some embodiments, the same analytics engine performs both data redaction 503 as well as analytics report generation 505. In other embodiments, separate analytics engines perform the two operations. The analytics report may include information that would be relevant to the evaluation of customer-agent interactions, such as the length of interaction, whether the interaction successful resolved the customer's issues, whether the agent was properly equipped to resolve the customer's issues (e.g., whether the agent needed to seek additional advice from a colleague or supervisor), how satisfied the customer was with the resolution, etc. In some embodiments, the scenario detection system and a conversation tag system described in further detail with reference to FIGS. 17-31 may be used for such purposes.

In some embodiments, for redaction, AI is used to: (1) locate a bounding box of text, and (2) identify text from an individual frame. In some embodiments, for analytics, AI is used to: (1) locate a bounding box of various application windows and/or widgets, and (2) identify the category of the application being used by an agent.

Figure 6:
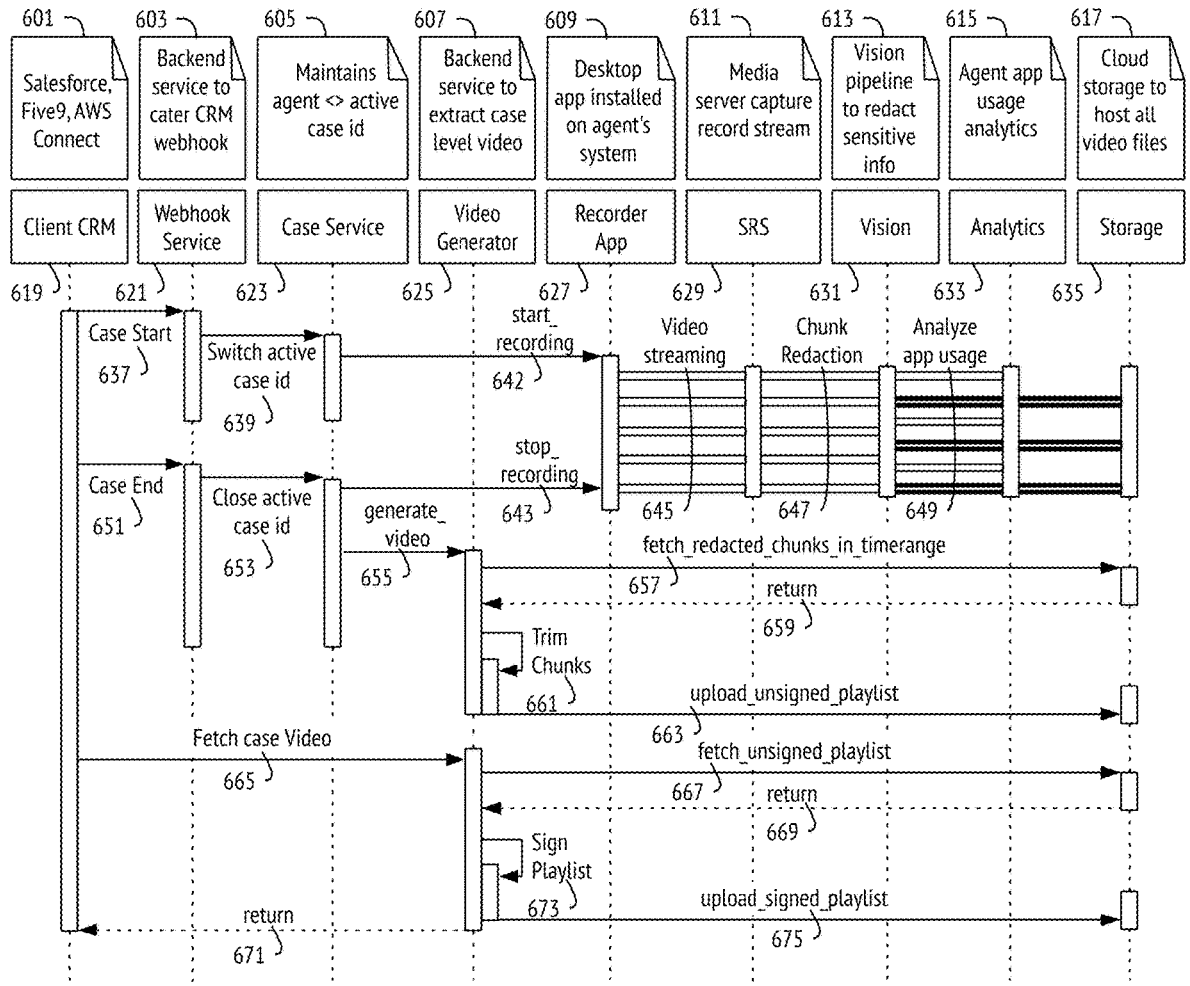
FIG. 6 shows an example swimlane flowchart for a customer-agent interaction recording system, in accordance with the examples disclosed herein.

FIG. 6 shows an example swimlane flowchart for a customer-agent interaction recording system, in accordance with the examples disclosed herein. In some embodiments, the steps and methods disclosed in the swimlane flowchart correspond to aspects described with references to FIGS. 1, 2, 3, 4, 5, and/or 6. First, a client CRM 619 (e.g., SALES-FORCE, FIVE9, AWS CONNECT 601) indicates to a webhook service 621 (e.g., backend service 603 that caters to CRM) that a case (e.g., a targeted customer-agent interaction) starts 637. Then, the webhook service 621 indicates to a case service 623 (which maintains 605 the agent and active case ID) to switch 639 a case ID to be "active." Next, a "start recording" command 642 is sent to a record app 627, which may be a desktop app 609 installed on the agent's system.

The client CRM 619 may also indicate to the webhook service 621 that the currently active case ends 651. Then, the webhook service 621 indicates to the case service 623 to close 653 the active case ID. Next, a "stop recording" 643 command is sent to the record app 627.

In some embodiments, either after the video streaming completes or while the video is streaming, the recorder app 627 then steams video 645 (e.g., in real-time) to a simple real-time server (SRS) 629, which is a media server 611 that captures a streamed recording. Either after the video streaming completes or while the video is streaming, a vision 631 pipeline 613 identifies and redacts ("chunk redaction" 647) sensitive information from the streamed video. An analytics engine 633 analyzes 649 the streamed video and generates an analytics report, e.g., agent app usage analytics 615. The redacted video recordings and/or the analytics report are then placed in storage 635 (e.g. a cloud storage medium 617). In some embodiments, any file (e.g., audio, video, text) placed in a cloud storage file is not accessible as is for security purposes. Cloud providers provide methods of generating unique URLs for private access ("unsigned") and public access ("signed").

In some embodiments, when an active case ID is closed, in addition to a "stop recording" 643 command being sent by the case service 623, a "generate video" 655 command is sent by the case service 623 to a video generator 625 to generate a video. In some embodiments, the video generator 625 is a backend service 607 that extracts case level video. The video generator 625 may then trim (i.e. redact) chunks 661 (synonymous with "segments" or "slices") from the video to generate a redacted video. An unsigned playlist corresponding to the generated redacted video may then be uploaded 663 to storage 635. In some embodiments, the video generator 625 may request ("fetch redacted chunks in time range" 657) from storage 635 specific redacted chunks in a specific time range. In response, storage 635 then sends ("returns" 659) the requested information to the video generator 625. In some embodiments, "trim chunk" 661 is a step where one chunk (e.g., of 30-second duration) is trimmed to meet an exact start and end time of the case. Note that the chunk trimming 661 is generally applied for situations where the user may not have real-time triggers from the CRM 619. In such cases, an entire work session or work day for an agent may be recorded, and then individual cases in the omnibus recording are identified and split into individual files or recordings. In some embodiments, the redaction of a chunk may be agnostic of the length of the chunk. Thus, an untrimmed chunk is similar to a trimmed chunk for redaction purposes. In some embodiments, the redacted portions ("redacted chunks") of the video are placed in storage 635, which may be retrieved and viewed upon request. In some embodiments, the chunks are stored in a ".ts" file format, and complete case level videos are stored in a ".m3u8" (M3U8) file format.

In some embodiments, the client CRM 619 may submit a request for a particular stored video ("fetch case video" 665), which is received by the video generator 625. The video generator 625 then fetches 667 the unsigned playlist that corresponds to the requested stored video from storage 635, which sends ("returns" 669) the unsigned playlist to the video generator 625. The video generator 625 then signs 673 the playlist (indicating that the corresponding video has been requested), and the signed playlist is uploaded 675 to storage 635. The requested stored video is then sent ("returned" 671) to the client CRM 619, and the video may be viewed or further analyzed.

Figure 7:
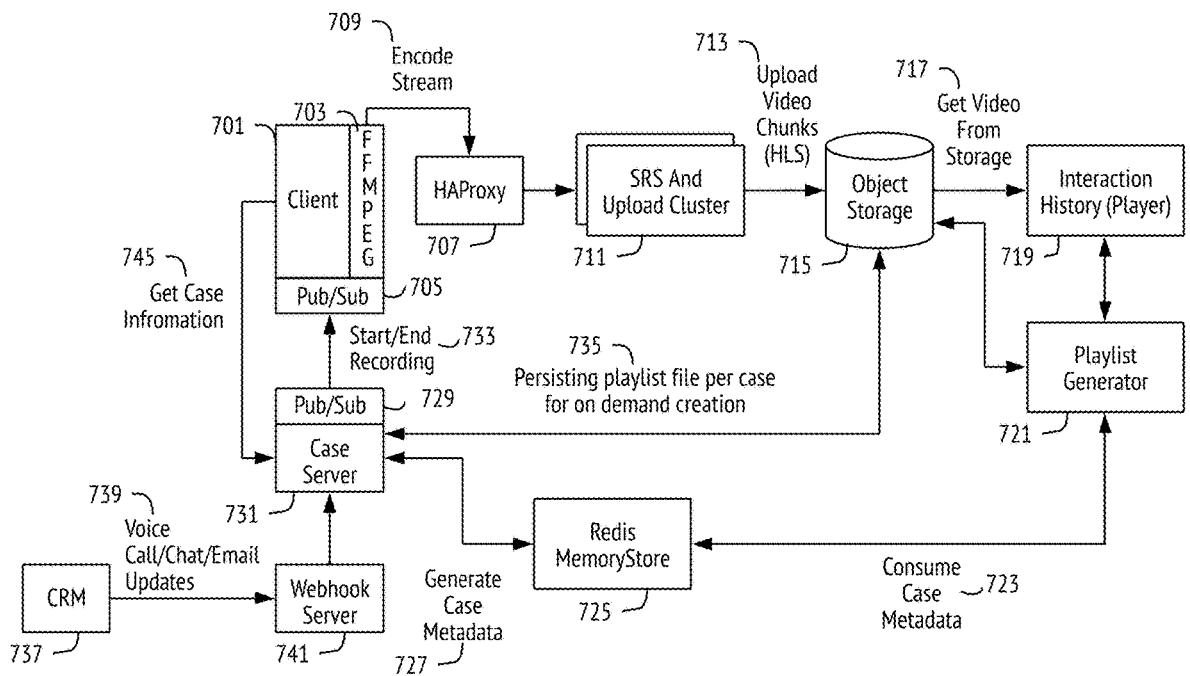
FIG. 7 shows an example implementation of a customer-agent interaction recording system, in accordance with the examples disclosed herein.

FIG. 7 shows an example implementation of a customer-agent interaction recording system, in accordance with the examples disclosed herein. The process begins with a customer relationship management (CRM) system 737 that sends an update 739 (voice call, chat, e-mail) to a callback function server 741 (e.g., a webhook server), which interacts with a case server 731. The case server 731 may employ a publish-subscribe messaging ("pub/sub") service 729 for real-time updates. The case server 731 interacts with an object storage 715 to send, store, and retrieve persisting playlist files per case for on-demand creation 735. The case server 731 sends a "start recording" or "end recording" 733 signal to a client 701. which may employ a publish-subscribe messaging ("pub/sub") service 705 and/or may hold a suite 703 (e.g., FFmpeg) of libraries and programs for handling video, audio, and other multimedia files and streams. The client 701 may get case information 745 from the case server 731. The client 701 may encode 709 a stream using the suite 703 and send it to a high availability load balancer and proxy 707 (e.g., HAProxy) for TCP and HTTP-based applications that spreads requests across multiple servers. The encoded stream is then forwarded to an SRS and upload cluster 711, which uploads 713 video chunks (e.g., using HTTP live streaming (HLS)) to the object storage 715. A stored video can be retrieved 717 by an interaction history (player) 719, which interacts with a playlist generator 721. The playlist generator 721 may also interact with the object storage 715. The playlist generator 721 consumes case metadata 723 from an in-memory store 725 (e.g., Redis MemoryStore), which generates case metadata 727 based on inputs from the case server 731. This flowchart effectively outlines the interconnected steps and components involved in the video generation and management process, highlighting the roles of various services and data storage elements within the system.

Customer-Agent Interaction Recording System: Implementation

Figure 8:
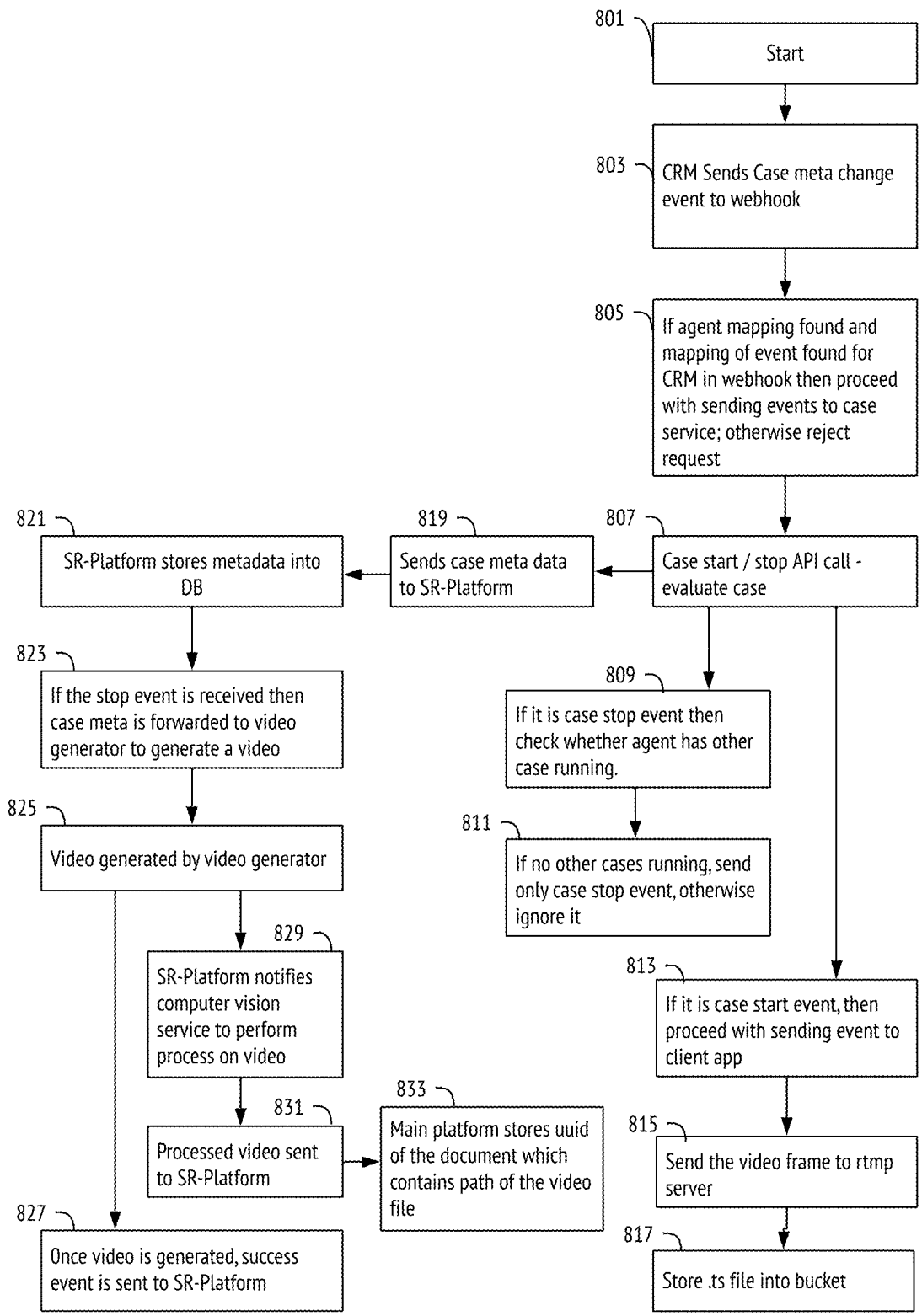
FIG. 8 shows an example detailed flowchart of a process related to video generation and management within a customer-agent interaction recording system, in accordance with the examples disclosed herein.

FIG. 8 shows an example detailed flowchart of a process related to video generation and management within a customer-agent interaction recording system, in accordance with the examples disclosed herein. The process begins at the start block (801) and proceeds to the customer relationship management (CRM) system, which then sends 803 case meta change events to a callback function (e.g., webhook). Next in step 805, if an agent mapping and an event mapping are found for the CRM in the webhook, then the system proceeds with sending events to a case service; otherwise, the request is rejected. In step 807, when a case start API call or a stop API call is made, the case is evaluated. In step 809, if the event is a case stop event, then the system checks whether the agent has any other case running at the moment.

In step 811, if there are not any other cases, then the system sends only the case stop event; otherwise, the system ignores it. In step 813, if the event is a case start event, then the system proceeds with sending the event to a client application ("client app"), which in step 815 then sends the video frame to an RTMP server 811. In step 817, the RTMP server stores the .ts file into a bucket.

In step 819, the case also sends case metadata to a screen recording platform ("SR-platform"). In step 821, the SR-platform stores metadata into a database. In step 823, if the stop event is received, then case meta is forwarded to a video generator to generate a video. In step 825, the video generator generates the video, and in step 827, the video generator sends a success event to the SR-platform. In step 829, the SR-platform notifies computer vision services to process the video. In step 831, the processed video is sent to the SR-Platform. Finally, in step 833, the main platform stores the universally unique identifier (UUID) of the document containing the video file path. This flowchart effectively outlines the interconnected steps and components involved in the video generation and management process within the described system.

Figure 9:
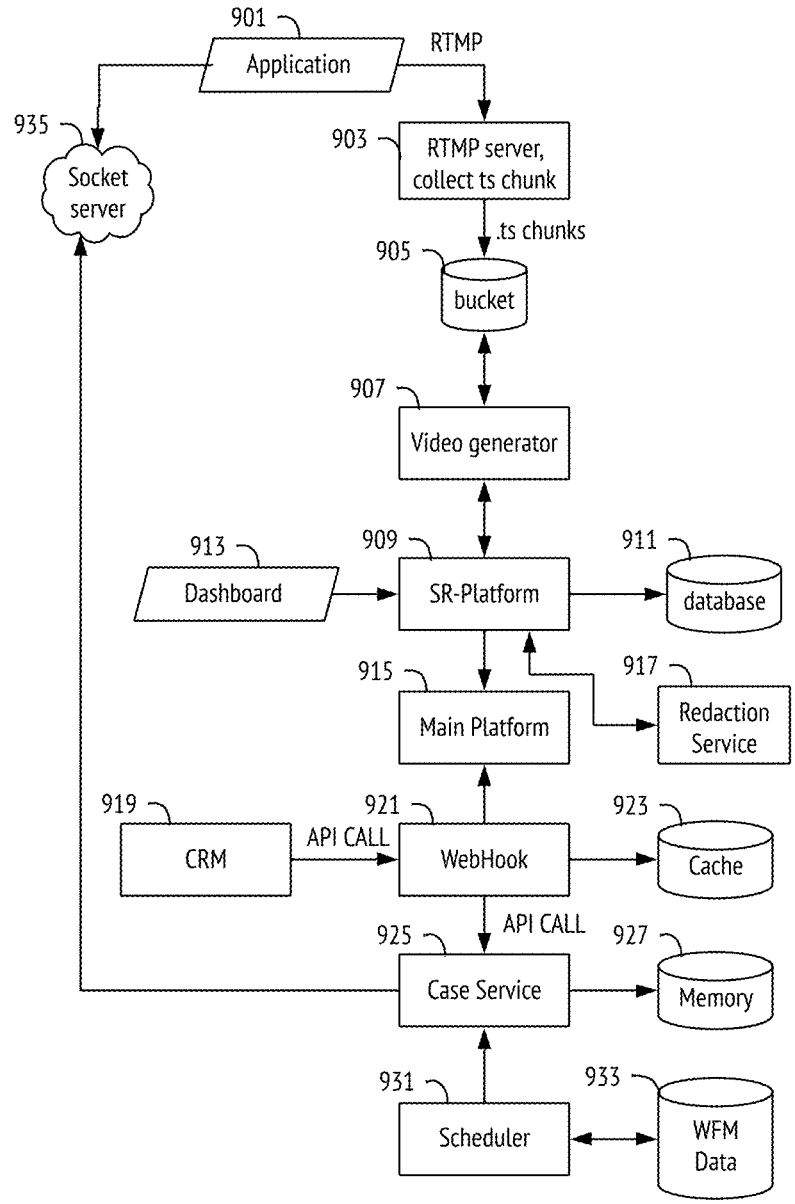
FIG. 9 shows an example comprehensive flowchart detailing the process of video generation and management within a customer-agent interaction recording system, in accordance with the examples disclosed herein.

FIG. 9 shows an example comprehensive flowchart detailing the process of video generation and management within a customer-agent interaction recording system, in accordance with the examples disclosed herein. The screen recording platform ("SR-platform") is connected to a database in order to collect metadata from various sources, such as the case service and the main platform service. SR-platform is responsible for sending metadata to the video generator service. SR-platform is also responsible for sending data for redactions to the redaction service. Two services take care of real-time use cases: case service and callback function (e.g., webhook) service. The callback function (e.g., webhook) service may be integrated with various CRMs and sends CRM data to the case service, along with other information from the main platform service. The case service takes care of the decision-making logic, such as when to start or stop screen-recording an agent, and the case service also sends these decisions to SR-platform so that SR-platform may store it into the database. The case service and the application communicate via socket connection. In some embodiments, the application is built to support cross-platform capabilities (e.g., across computer operating systems). Once an application receives an event to start recording via the socket connection, the application starts sending screen recording chunks to a real-time messaging protocol (RTMP) server. The RTMP server stores these chunks into a bucket. Once the case service sends an event to stop recording, the application stops sending these chunks to the RTMP server and the case service also notifies the SR-platform that the case is ended. The SR-platform then forwards this request to the video generator, which collects the necessary chunks from the bucket and starts generating videos. In some embodiments, videos are M3U8 files that include a .ts chunks path. Once video files are generated, video files are stored in the bucket and the path of the video file is stored in a database.

The process initiates with an application 901 that sends RTMP streams to an RTMP server 903, which collects .ts chunks and stores them in a bucket 905. These chunks are then processed by a video generator 907. An SR-platform 909 plays a central role, interfacing with various components such as a dashboard 913, a database 911, a main platform 915, and a redaction service 917. A customer relationship management (CRM) system 919 sends API calls to a callback function 921 (e.g., webhook), which communicates with a cache 923, the main platform 915, and a case service 925 via API calls. The case service 925 accesses memory 927 and is managed by a scheduler 931 that also interacts with workforce management (WFM) data 933. Additionally, a socket server 935 is connected to the application 901 as well as to the case service 925, indicating the potential for real-time communication. This flowchart effectively outlines the interconnected steps and components involved in the video generation and management process, highlighting the roles of various services and data storage elements within the system.

For screen recording, the entire system may be connected with the CRM, which is enabled with a callback function (e.g., webhook) that may handle various events, e.g., a user is updating the case data or case-related details. Of particular interest is the event where a case is started and an event where the case is ended, because that demarcates the need to create a recording. These events are monitored and relayed via the callback function (e.g., webhook). In some embodiments, the CRM holds metadata, the platform holds metadata, and the two sets of metadata are mapped to each other. One set of data to be mapped is agent-related ID. To do so, the CRM sends their ID, which is started in a database. The callback function (e.g., webhook) requests that the CRM sends the agent-related ID, and that particular ID is mapped through the platform ID. The callback function (e.g., webhook) makes an API call to request the data to be placed into the cache, which reduces the frequency of making these calls frequently, and we can reduce the overhead of the system. Then based on the events after the mappings for the particular agent is received, the case service start and/or stop events are sent. After a case start and/or case stop API call, once the callback function (e.g., webhook) identifies the agent's internal ID. If that internal ID is not found, the callback function (e.g., webhook) may merely ignore that particular request and refrains from making an API call to case service, so that the case starting and case stopping will not occur.

Once that case start or case stop API call happens, case service sends that particular event of starting a recording or stopping a recording to the socket server, and the socket server forwards this particular request to the client application. In some embodiments, the client application includes cross-platform capabilities, and listens for a particular event on the socket server. Once the application is triggered to start recording, it will start recording.

In some embodiments, the recordings are processed using a live-streaming video protocol, such as real-time messaging protocol (RTMP). Buffers are sent into an RTMP server, and as chunks are streamed to the RTMP server, the RTMP server creates the .ts files, which may include various video frames. In some embodiments, small buffers, rather than entire files, are streamed. Thus, the RTMP server may collect buffers of some pre-determined length (e.g., 30 seconds) and create .ts files for each of those buffers. The .ts chunks are stored in the bucket, while streaming is ongoing. In some embodiments, the pre-determined length of the buffer is selected based on the customer's requirements.

In the meantime, the CRM may be sending other events as well, e.g., an agent is updating details. In particular, when an event to stop a case is received, the callback function (e.g., webhook) will trigger the stop process. First, it will check whether the cache includes that particular agent ID or not. If not, it will again request the platform to provide the internal ID, and it will forward that particular request to the case service, which then checks.

For stopping recordings, a mechanism for handling concurrent cases may be employed, where an agent is involved in multiple concurrent cases simultaneously. When a case is started, the system also stores the list of which agent is working on what cases in the memory. Whenever a stop request is received, the case service checks whether the relevant agent has other concurrent cases at the time or not. If the agent is working on other cases as well, the system is to refrain from interfering with those other cases (i.e., permit those other cases to continue being recorded) and seeks to stop only the one case requested. The stop event is sent to the socket server, which forwards that request to the client application, which in turn stops sending the .ts files. For the unaffected cases that the agent is also working on, the case service will not forward those cases, so there is no stop recording event for those cases, and the application will continue to send .ts chunks.

When the case service stops the case regardless of sending the event to the socket server, it sends various metadata to the screen recording platform ("SR-platform"), which stores the various metadata (e.g., when the case started, when the case ended), and once the case ends, the platform forwards this request (including the start time of the case) to another service called video generator.

In some embodiments, the format of a .ts chunk may include initial digits that represent the duration of the video of the chunk (e.g., 30 seconds), and other digits may represent epoch times (e.g., standard time measured from a reference date and time). The video generator collects the various chunks from the start time to the end time of the case, and creates a video or audio file, such as an M3U8 file. In some embodiments, the video or audio file is a text file that contains the various .ts chunks in series. The video generator combines the .ts file paths and creates one video or audio file. The video or audio file is sent back again to the SR-platform, which stores this particular path of the video or audio file into the database.

Once that cycle completes, the SR-platform notifies the main platform that this particular recording has been created. A universally unique identifier (UUID) is assigned and the main platform stores that particular UUID. When a client opens the case, then that particular screen recording can be visualized. In some embodiments, during this entire cycle of video generation, no redaction is performed. Afterwards, SR-platform notifies computer vision services such as redaction to begin redacting the video. After computer vision services complete redaction, it sends back the path of that particular redacted file.

Figure 10:
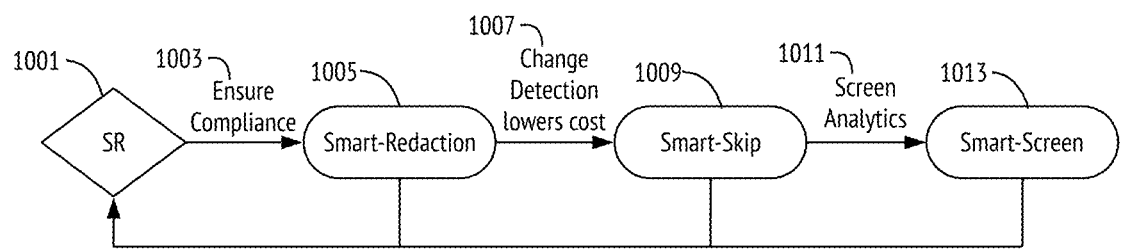
FIG. 10 shows an example flowchart detailing a sequence of processes related to vision artificial intelligence (AI) management and compliance for a customer-agent interaction recording system, in accordance with the examples disclosed herein.

FIG. 10 shows an example flowchart detailing a sequence of processes related to vision artificial intelligence (AI) management and compliance for a customer-agent interaction recording system, in accordance with the examples disclosed herein. FIG. 10 provides an overall of the specific processes shown in FIGS. 11, 12, 13, and 14. The flow begins at the screen recording ("SR") block 1001. To ensure compliance 1003, e.g., to verify adherence to certain standards or regulations, the flow proceeds to smart-redaction 1005, an AI-based process for redacting sensitive information. To detect changes that lower cost 1007, e.g., to detect changes that could reduce operational costs, the flow then advances to smart-skip 1009, an AI-based process for bypassing unnecessary content. To provide screen analytics 1011, e.g., an analysis phase of the screen content, the flow reaches smart-screen 1013, which may provide an interactive display of informative content. Smart-screen is primarily for analytics of the intelligence that is provided by the platform, which the customers may consume in the form of charts, dashboards, and other formats. The flowchart illustrates a streamlined process involving compliance, redaction, cost reduction, content skipping, analytics, and display, highlighting the interconnected steps essential for efficient video management within the system.

The first component that handles a new screen recording ingested into the platform is a smart redaction ("smart-redaction") 1005 feature, which meets any compliance requirements imposed by the customer, and is posed to be customized for a wide range of redaction needs. For example, some customers may implement a payment card industry (PCI) data security standard (DSS), e.g., a financial institution redacting bank account numbers. Still other customers may be interested in standards for protecting personally identifiable information (PII), e.g., a medical service provider redacting private medical information. By redacting information immediately or at least before storing information or further processing, in some embodiments, any information stored in databases, including cloud storages, caches, and other components on computer vision, is based on content that already has sensitive information redacted. For example, anything that is annotated would not include redacted content.

The next component is the smart skip ("smart-skip") 1009 feature, which provides temporal segmentation of a video timeline in such a way that identifies or saves portions of the video where there is activity on the screen and identifies or leaves out portions of the videos where there is no activity on the screen. This highlights the timeline in ways that may make it easier to navigate the recording later. For example, an auditor who is reviewing the actions of an agent may save time by clicking a "next" button to jump from one portion of the video where there is activity to the next, skipping over segments of the video where there is no activity. Smart skip filters in regions of interest in the video where analytics are to be performed, and for stagnant portions of the video where nothing or not much is changing on the screen, analytics may be extrapolated or interpolated from surrounding active portions.

Finally, there is a smart screen component, which organizes and displays screen analytics, which may be computed and/or displayed at various levels of attributes and granularity. In some embodiments, spatial analytics are provided. In some embodiments, temporal analytics are provided. Details of these forms of analytics are described below. FIGS. 11, 12, 13, and 14 provide further details of the overview covered in reference to FIG. 10.

Figure 11:
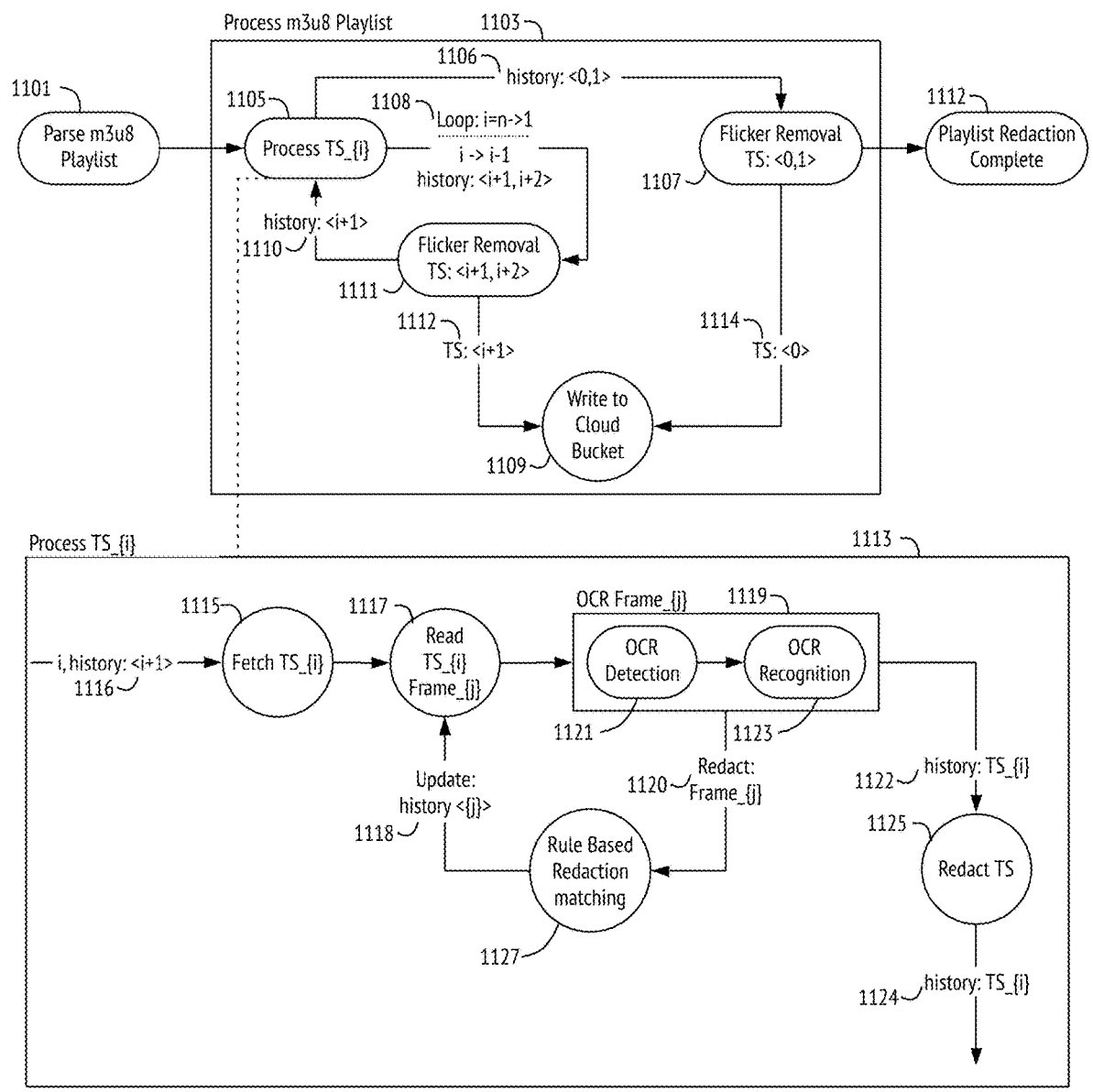
FIG. 11 shows an example detailed flowchart of a smart redaction process related to playlist and frame processing within a customer-agent interaction recording system, in accordance with the examples disclosed herein.

FIG. 11 shows an example detailed flowchart of a smart redaction process related to playlist and frame processing within a customer-agent interaction recording system, in accordance with the examples disclosed herein. This corresponds to the "smart-redaction" 1005 block in FIG. 10. The process begins with parsing 1101 a playlist, which may be in M3U8 format. As explained earlier, an M3U8 playlist contains a set of video slices, each in the form of a .ts chunk of some predetermined length (e.g., 30 seconds).

Then, the playlist is processed 1103. The black box of playlist processing 1103 is detailed as follows. First, each of the N .ts chunks of the playlist is processed 1105 in a for loop 1108, incrementally indexed on the sequential number i of the .ts chunk. Process 1105 redacts information from a chunk; details of process 1105 are provided later with regards to process 1113. In some embodiments, the for loop begins with the first ("1") .ts chunk and ends with the last ("N") .ts chunk. In other embodiments, the for loop begins with the last ("N") .ts chunk and ends with the first ("1") .ts chunk, i.e., it runs in reverse chronological order. The process illustrated in FIG. 11 shows the for loop running in reverse chronological order. Running the loop in reverse chronological order offers some advantages. For example, suppose a scenario where an agent is typing some sensitive personal information, such as a 16-digit credit card number. In a forward flow, the screen cannot capture it because the system does not know when that segment begins, but in a backward flow, the system first sees the 16 digits, and then can track it back to the very first digit when it was typed. Therefore, running the loop in reverse chronological order permits the addressing of many real-time typing workflow issues.

While the loop is running via the indexed chunks, the history 1110 of the last few (e.g., two) chunks are temporarily saved, and a flicker removal 1111 process is performed. In some embodiments, flicker removal removes "flicker" (i.e., the disappearance of video information from a video chunk due to issues such as a poor Internet connection) by interpolating between surrounding chunks. For example, suppose a scenario where a 16-digit credit card number is being typed, and this process is captured in 100 frames. Suppose in 10 of those frames, the credit card number is wholly or partially missing. Then the flicker removal process detects that this is missing by noticing that the credit card number was being typed before and after those 10 frames, and interpolates the missing information. Similarly, when each .ts chunk is processed, a history object is updated as the process moves from one .ts chunk to the next. By carrying required or useful information from the current chunk to the next chunk, the information is bridged between consecutive chunks. In some embodiments, flicker removal is spatial-temporal. In some embodiments, spatial-temporal flicker removal entails viewing attributes spatially but checking temporally what is missing. In some embodiments, temporal interpolation is linear or near-linear. In some embodiments, spatial interpolation is smart, i.e., the system uses AI, probabilistic models, or other pattern-matching techniques to determine what is the most likely missing information. For example, if a user is typing a series of numbers while the screen is scrolling, the system would recognize that the numbers are moving along with the screen, rather than interpreting the video as information being deleted and similar information being created. Overall, this optimizes storage by effectively compressing information. Once flicker removal 1111 is completed for a chunk, the updated chunk, which now has sensitive information redacted, is written 1109 to the cloud bucket. Once the loop 1108 backwards from the last chunk to the first chunk is completed, the process runs final flicker removal 1107 on the remaining chunks in the history 1106, and the updated chunks are written 1109 to the cloud bucket.

Once process 1103 is completed for the given playlist, the playlist redaction process is complete 1112. At this point, anyone who views the conversation would see only a redacted version of the conversation; all sensitive information has been removed.

The processing 1105 step for each .ts chunk is detailed in flow 1113 in the bottom half of FIG. 11, expanding on how individual video slices are processed. First, the ith chunk is fetched 1115 from the cloud bucket, along with the history 1116 of the previously processed chunk(s). Then, the ith chunk is read 1117 on an individual frame-by-frame basis, indexed on the frame number j. As described above for the chunk-by-chunk loop 1108, the frame-by-frame loop may also be run in reverse chronological order. For each frame j, an optical character reading (OCR) 119 is performed. OCR 119 comprises two stages: OCR detection 1121 and OCR recognition 1123. In some embodiments, one or both of these stages are redaction-agnostic; i.e., the OCR process is performed without regards to what information is considered sensitive or not for the purposes of redaction. OCR detection 1121 determines which locations (e.g., "boxes") in a frame j contains a text character (which may be from a variety of written languages and symbols). Then, OCR recognition 1123 determines what the actual text is in a particular text-detected location. Thus, OCR 119 distills a visual image (a frame j) to generate a text string of the written information in that image. i.e. vision to natural language translation.

The OCRed frames are then subjected to rule-based redaction matching 1127 to tag specific regions of the frame that are to be redacted, which may be customized by the customer. In some embodiments, the rule-based redaction matching 1127 may be implemented using a trained neural network model. In some embodiments, both OCR detection 1121 and OCR recognition 1123 are trained on simulated data sets, which are annotated by an annotation team. Alternatively or in addition, the training data may be from a variety of sources, such as annotated client data. In other embodiments, the training data is from generated dummy data so that actual client data is protected and not used in training. For example, the model may recognize a series of numbers with slashes or dashes between one- or two-digits groups as a date, e.g. Dec. 31, 2024 and 31 Dec. 2024 are "December 31, 2024" and "31 Dec. 2024," respectively, or that a series of 16 numbers, especially when clustered by fours, may be a credit card number. In some embodiments, a customer may request that the model be trained only or primarily on their own proprietary data, which may be particularly useful if the customer expects specialized data types to be common in their conversations.

Once the rule-based redaction matching 1127 is completed, the history of the frame(s) is updated 1118, and the loop continues 1117 to the next frame (j+1) in the ith chunk.

Finally, when all the frames of the ith chunk have been read and processed, the flow collects the history 1122 of the ith chunk, redacts 1125 the tagged information from the ith chunk, and updates and shares the history 1124 of the ith chunk in preparation for processing the next chunk.

In some embodiments, redaction of the sensitive information is performed by obscuring the region of the frame(s) of the video where sensitive information appears. This obscuring may include making the region opaque (e.g., all blacked out, all grayed out, or all whitened out). In some embodiments, blurring or pixelating are avoided because such techniques may leave open the possibility of other entities detecting the original redacted information from the limited information in the blurred or pixelated images.

In some embodiments, the process described above is a queue-based mechanism, where some process steps may not occur in real-time or near-real-time. In other embodiments, depending on customer demands, the process occurs in real-time or near-real-time. In some embodiments, real-time or near-real-time is achieved with local computers and devices instead of cloud computing, with managing CPU/GPU orchestration, and with other techniques known to those skilled in the art. For example, the system deployment may be elastic. By monitoring which GPUs are available (e.g., not currently being used by redaction) and the current queue size, the system allocates resources and/or scales accordingly. In some embodiments, the system uses a hybrid strategy, where some parts of redaction are deployed on a cloud provider, and others parts of redaction are deployed on local machines. A similar technique may be employed for smart skip and smart analytics. In some embodiments, the turn-around time for redacting an entire video is specified to be within a predetermined period of time (e.g. 8 hours). In fact, whenever it is not necessary for an auditor or other interested party to immediately review a video that had just ended, emphasis may be placed on more efficiently processing videos overall, rather than on achieving near-instant processing, i.e., prioritizing throughout over latency.

In some embodiments, the components are deployed using kubernetes, where model serving is handled by state-of-the-art NVIDIA stacks, such as TRITON INFERENCE SERVER. This detailed flowchart effectively outlines the steps and components involved in the playlist and frame processing, highlighting the systematic approach to redaction and storage within the described system.

Figure 12:
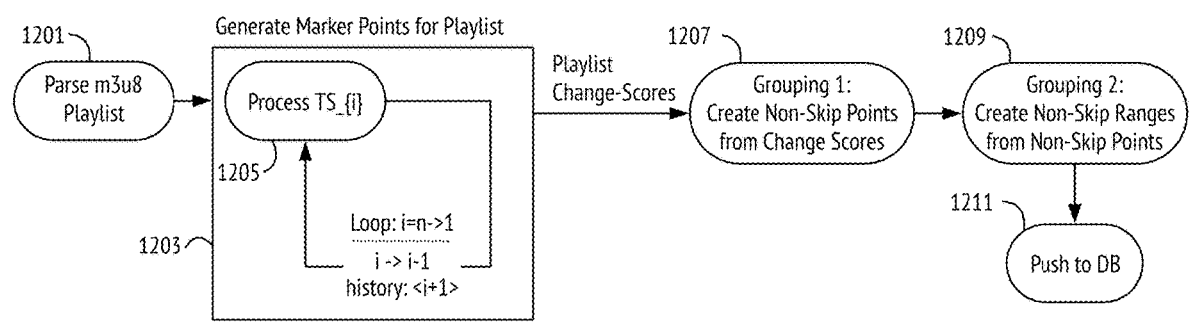
FIG. 12 shows an example detailed flowchart of a smart skip process for a playlist in a customer-agent interaction recording system, in accordance with the examples disclosed herein.

FIG. 12 shows an example detailed flowchart of a smart skip process for a playlist in a customer-agent interaction recording system, in accordance with the examples disclosed herein. This (in combination with FIG. 13) corresponds to the "smart-skip" 1009 block in FIG. 10. Smart skip identifies portions of a video that had activity (e.g., information is being typed) and identifies other portions of the video where there was no activity. This is not merely a naive solution, i.e., the system goes beyond merely detecting whether pixels are changing from frame to frame or from chunk to chunk. Furthermore, in actual deployment, video streaming involves data compressions and variable bit rates, so any implementation of smart skip must be robust to such effects and must address actual content changes. In some embodiments, attributes from each frame is determined, from which a set of metrics is calculated from each set of frame attributes. Then, the comparison of the sets of metrics between two frames quantifies the amount of change between the two frames. An amount of change that is beyond some predefined threshold is considered a notable change.

The process begins with the parsing 1201 a playlist (e.g., in M3U8 format). Then, the system generates 1203 marker points for the playlist. Within this generation 1203 step, there is a for loop that processes 1205 each .ts chunk indexed as i, maintaining a history of the processed segments in order to bridge content and/or information between consecutive chunks. As discussed earlier with reference to other loops, in some embodiments, the for loop may run in reverse chronological order. During the generation 1203 of marker points, the process also creates a set of playlist change scores, which is described below with reference to FIG. 13, which also describes process 1205 in further detail.

After all the .ts chunks in the playlist are processed and marker points have been generated 1203 for the playlist, the playlist undergoes two levels of grouping. Grouping 1 creates 1207 non-skip points from change scores, and grouping 2 creates 1209 non-skip ranges from the non-skip points created 1207 by grouping 1.

To create 1207 non-skip points from change scores, the system identifies points in the playlist where there are significant changes, thus generating an aggregated chart for the entire playlist video. In some embodiments, a "significant change" is identified as change scores between chunks that exceed a threshold. In some embodiments, this threshold is a pre-determined threshold. In other embodiments, this threshold is dynamic ("smart thresholding"), where whether a change score is considered "significant" depends on the context of the situation. For example, in a video where there is much background activity captured by the video, the system would recognize those changes caused by the background activity as irrelevant and thus insignificant.

To create 1209 non-skip ranges from the non-skip points created 1207 by grouping 1, the non-skip points are clustered so that the ranges are identified. For example, if there are a series of non-skip points within a short period of time, the first and last non-skip points are identified as the start and stop points, respectively, of a non-skip range. In some embodiments, the system learns how to make those groupings using an AI model. In some embodiments, the AI model is unsupervised, because every video may have unique contexts that would be difficult to transfer learned patterns to other videos, and it would be difficult or impossible to learn all the kinds of changes that are possible on the customer side. Every new customer may use new domains, different applications. Sometimes the applications include nested layouts, even within the layout. Some customers may request that changes within a layout be tracked. In such cases, a supervised learning approach may not be ideal. Instead, a computer vision-based approach is more appropriate, e.g. edge detection. In such an approach, a video's attributes are analyzed in the context of frame detection and screen recording to generate dynamic ranging in such a way that dynamic ranging provides dynamic grouping and dynamic thresholding. Thus, an unsupervised technique that works on video level does not make any assumptions regarding what applications may be present on a screen.

Finally, the non-skip ranges are pushed to the database ("push to DB") 1211.

Additionally, in some embodiments, all components are deployed using Kubernetes, with elastic deployment via autoscaling based on request queue length. This flowchart effectively outlines the steps and components involved in generating marker points for a playlist, which is a crucial part of the video management process described in the invention.

Figure 13:
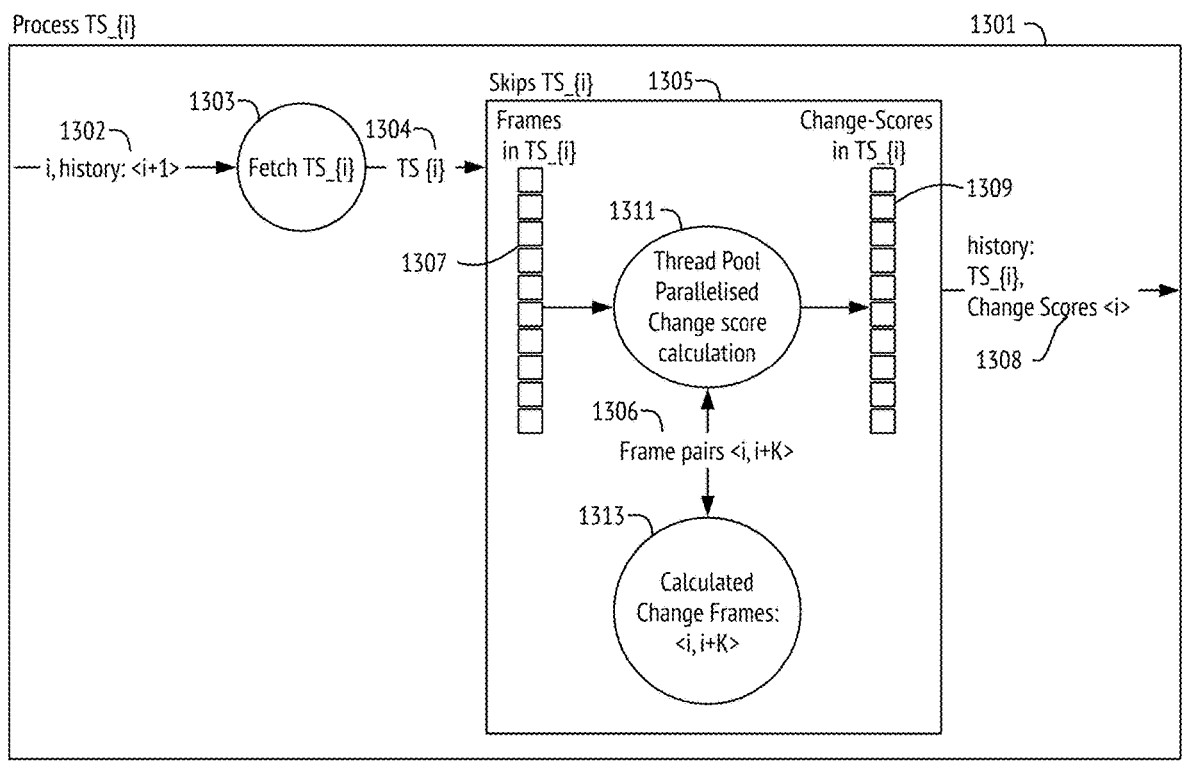
FIG. 13 shows an example flowchart detailing a process for handling time series data (TS) within a customer-agent interaction recording system, in accordance with the examples disclosed herein.

FIG. 13 shows an example flowchart detailing a process for handling time series data (TS) within a customer-agent interaction recording system, in accordance with the examples disclosed herein. This (in combination with FIG. 12) corresponds to the "smart-skip" 1009 block in FIG. 10. The flowchart in FIG. 13 describes process 1205 from FIG. 12 in greater detail, where each .ts chunk is indexed as i is processed. The process begins at block 1302, where history of the processed segments (as described with reference to FIG. 12) and the ith .ts chunk (TS_{i}) are fetched from the bucket. The ith .ts chunk (TS_{i}) 1304 is now ready for analysis by a skips TS_{i} 1305 process that comprises the following. In some embodiments, rather than looping over the frames in the .ts chunk, all the frames in the .ts chunk are analyzed at once or in parallel, and all the frames are sent 1311 to a thread pool for parallelized change score calculation. The frames are paired (i, i+K) 1306, i.e. a frame i is paired with another frame a fixed interval K away, for this calculation 1313. The calculated change frames (i, i+K) are then outputted into a change-score list 1309, which comprises a pairwise ordered change score for each frame, which is then aggregated 1308 and sent as the output of generation 1203 as references in FIG. 12.

Figure 14:
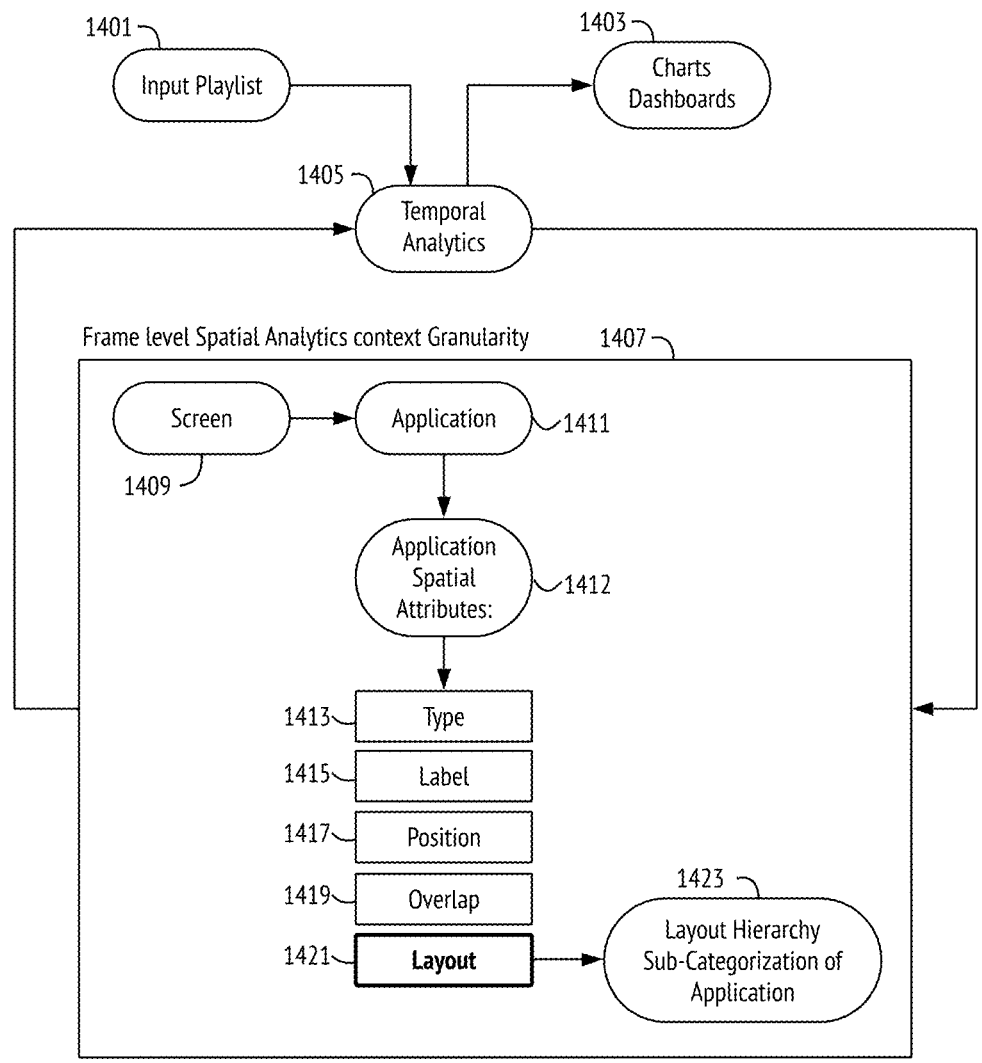
FIG. 14 shows an example flowchart that outlines a process related to smart analytics within a customer-agent interaction recording system, in accordance with the examples disclosed herein.

FIG. 14 shows an example flowchart that outlines a process related to smart analytics within a customer-agent interaction recording system, in accordance with the examples disclosed herein. This corresponds to the "smart-screen" 1013 block in FIG. 10. The process begins with an input playlist 1401, where the playlist is the output of the smart-skip feature as described with reference to FIGS. 10, 12, and 13. Thus, the playlist includes a set of non-skip ranges as marked by the skip-skip feature. This input is fed into a temporal analytics module 1405, which outputs to charts dashboards 1403. Temporal analytics include generating a list or visualization of when particularly notable events occurred during the video recording that corresponds to the playlist. For example, it may list the times at which a user moved from one computer application to another. Then, frame-level spatial analytics 1407 are performed, which comprises the following.

In a given frame analyzed 1407, a screen 1409 may contain multiple applications 1411. For example, a typical user's screen may include an e-mail client, an Internet browser with multiple tabs, local directories, cloud storage directories, text/spreadsheet/presentation editing software, image/video editing software, games, and other applications. In some embodiments, each application on the screen is detected, and various spatial attributes 1412 are inferred and generated for each application, such as type 1413 (e.g., web browser, text editor, productive, entertainment), label 1415 (e.g., name of the application), position 1417 (e.g., where on the screen is the application), overlap 1419 (e.g., which other applications overlap with this application, by how much, and where), and layout 1421. The layout 1421 attribute further leads to determining a layout hierarchy sub-categorization of applications 1423, where applications are spatially embedded in other applications, and the system recognizes the hierarchical structure of such use cases. In some embodiments, the detection and inference of the spatial attributes 1412 are performed by a trained supervised learning model, such as a trained supervised neural network.

In some embodiments, this process of inferring and generating various spatial attributes 1412 uses optical character reading (OCR) technology, similar to that described earlier with reference to FIG. 11, such as by comprising two stages: OCR detection and OCR recognition. In some embodiments, this process may be customer-agnostic. For example, recognizing that an Internet browser is present is an objective fact without any customer-specific information required. In some embodiments, this process may be customer-specific. For example, for some customers, a web-based video-sharing application may be considered "entertainment" whereas for other customers, the same application may be considered "productive". For label 1415, the system may recognize the specific names of the applications.

For the overlap 1419 attribute, the system may recognize which application is in the foreground and which in the background, then focus more granular spatial analytics on the foreground one (e.g., by determining a layout hierarchy sub-categorization of applications 1423), as it is presumed to be the one in active use by the user, especially if the background application is significantly covered up via overlap by the foreground application. Furthermore, there may not be sufficient information about the background application visible outside the overlapping region, so even if analysis were performed on the background application, an incorrect or incomplete inference may be made. For various applications, the system can infer and decide from the application's position (e.g., near the center vs. closer to the edge) and overlap with other applications (e.g., background vs. foreground, amount of overlap) from this level in a hierarchy whether the system is to infer further in the upcoming levels of granularity. Those upcoming levels of granularity include layout. For example, a web browser in the foreground may be identified as an application to be analyzed further, including identifying the webpage URL from the web browser content. Thus, the various items on the webpage (e.g. a dashboard) on the web browser are then the next level in the hierarchy to be analyzed. Nested layouts (layouts within layouts) like this are typical in many use cases.

In some embodiments, the attributes 1412 of type 1413, label 1415, and position 1417 are analyzed using supervised models, whereas layout 1421 is analyzed using unsupervised models, because the system may not be able to predict or assume in advance what kind of various layouts the customer may have. Furthermore, there may be much dynamic motion in various layouts (e.g., a user is dragging and dropping various windows in various applications), which is suitable for an unsupervised approach. In some embodiments, there may be intervention or fine-tuning performed in between quality control (QC) cycles to adjust the model, e.g., to make corrections where a system had failed to infer that an application had been dragged (in position or size) or reorganized on the screen. In some embodiments, the specific attributes 1412, the categories within each attribute 1412, and the various aspects of layout sub-categorization 1423 (e.g., the number of levels in the hierarchy, which applications are to be targeted for sub-categorization) may be customized for a particular customer.

Once the frame-level spatial analytics 1407 have been completed, the system may go again and perform (or re-perform) temporal analytics 1405, using the insights gained from the frame-level spatial analytics 1407 process. From the temporal and spatial analytics, various outcomes may be extracted or inferred. For example, the level of productivity of the video conversation may be determined. The productivity application usage during the video conversation may be determined; this of course may vary from customer to customer and application to application for what is recognized to be productive. This enables, for example, a call center to be able to determine how efficient their agents are in handling customer issues or determine whether the agents are performing the expected practices (i.e., "smart resolution"). Timeline snippets may also be an outcome determined, where a timeline snippet is a report that shows time points and/or time ranges in a conversation where a notable change had occurred, e.g., when a particular application was open, when the user's mouse jumped from application A to application B, when a user was typing. In some embodiments, timeline snippets may detect or make inferences on what those notable changes mean. e.g., an agent asked someone to enter a credit card number, someone is entering a credit card number, someone pressed "submit" after entering their credit card number.

Another outcome determined may be smart resolution, where the system determines various aspects of the resolution of the video conversation. In some embodiments, natural language processing (NLP) or other techniques are applied to information extracted from the video conversation (e.g., a transcript of the conversation, text recognized from the screen), and the system determines whether a resolution was provided to the customer, how satisfactory the resolution was, and whether the sentiment was positive at the end of the call. In some embodiments, multiple attributes are combined to determine whether the resolution was provided or not and how satisfactory the resolution was. In some embodiments, the smart resolution process entails analyzing the timeline snippets to identify patterns in a given call recording for the particular use case. For example, by analyzing various video conversations with a satisfactory resolution, the system may determine what particular flow patterns (e.g., go to application X within Y period of time, use applications A and B but not C, use item D within application D) tend to lead to a satisfactory resolution. Then, the customer may use such smart resolution analytics to train or provide feedback for agents.

Another outcome determined may be smart quality assurance (QA), where the system determines whether the video conversation passed some level of quality assurance (QA). This may be based on the various information provided earlier by timeline snippets and smart resolution. For example, smart QA may determine whether an agent had successfully completed a list of assigned tasks in the order in which they were trained to perform.

Finally, an outcome determined may be smart suggestions, where the system provides in real-time or near-real-time based on previous analytics some suggestions for an agent on a live call, similar to a dynamic FAQ. This may be helpful for training an agent or improving the efficiency and effectiveness of an agent. For example, suppose an agent is on a call with a customer who is having trouble navigating a website. Smart suggestions would provide directions to an agent to explain or show the customer where to click, drag, or enter information on the website. As agents build experience, that experience then further trains the smart suggestions feature to provide even more accurate and more useful suggestions for future agents.

This flowchart effectively illustrates the interconnected steps and components involved in the temporal and spatial analytics process within the described system.

Figure 15:
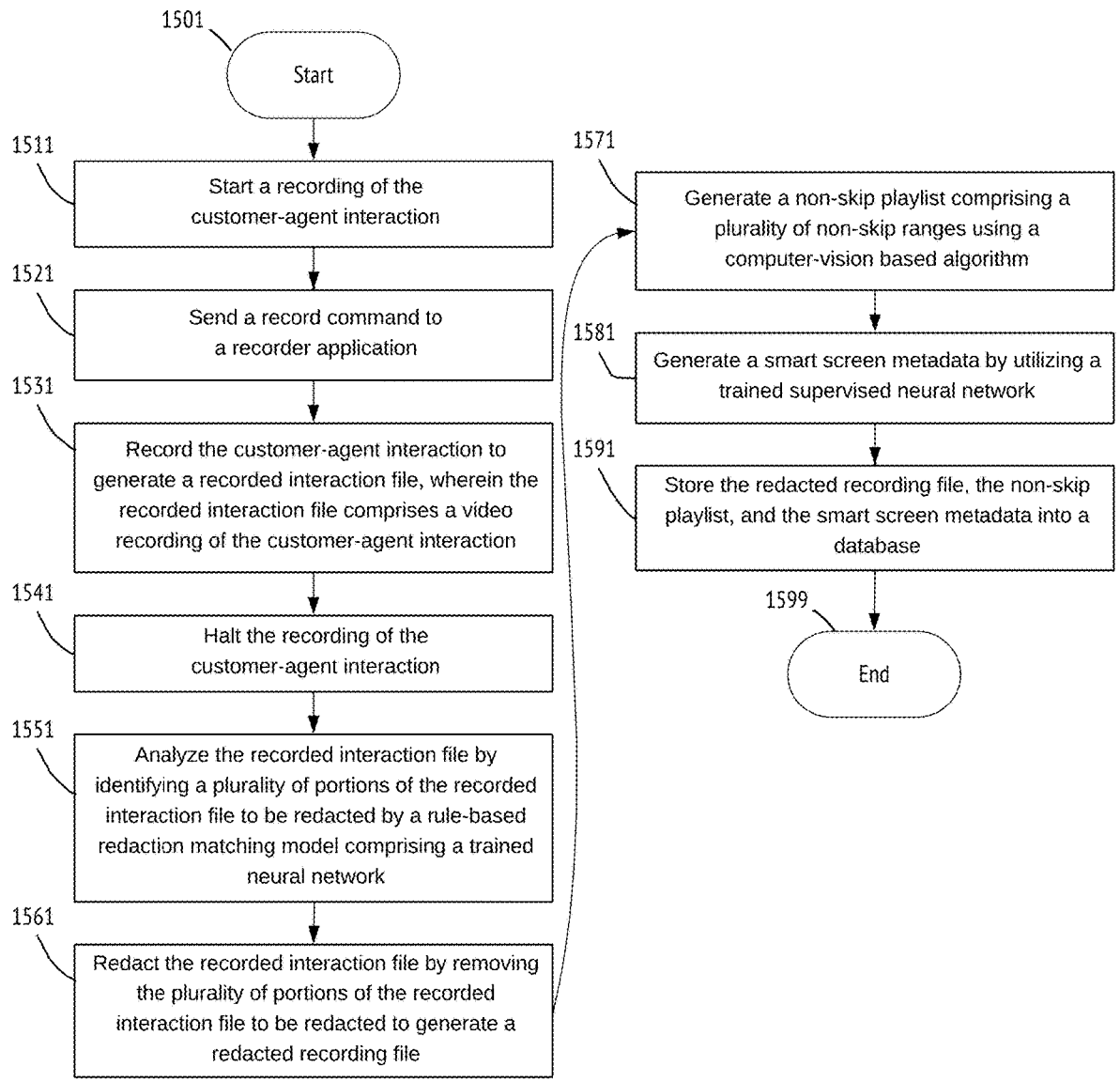
FIG. 15 shows yet another flow diagram detailing the operation of a customer-agent interaction recording system, in accordance with the examples disclosed herein.

FIG. 15 shows yet another flow diagram detailing the operation of a customer-agent interaction recording system, in accordance with the examples disclosed herein. In some embodiments, the flow diagram represents a computer-implemented method for recording and redacting a customer-agent interaction using a customer relationship management (CRM) system. The process starts at step 1501. In step 1511, the system starts a recording of the customer-agent interaction. In step 1521, the system sends a record command to a recorder application. In step 1531, the system records the customer-agent interaction to generate a recorded interaction file, wherein the recorded interaction file comprises a video recording of the customer-agent interaction. In step 1541, the system halts the recording of the customer-agent interaction. In step 1551, the system analyzes the recorded interaction file by identifying a plurality of portions of the recorded interaction file to be redacted by a rule-based redaction matching model comprising a trained neural network. In step 1561, the system redacts the recorded interaction file by removing the plurality of portions of the recorded interaction file to be redacted to generate a redacted recording file. In step 1571, the system generates a non-skip playlist comprising a plurality of non-skip ranges using a computer-vision based algorithm. In step 1581, the system generates a smart screen metadata by utilizing a trained supervised neural network. In step 1591, the system stores the redacted recording file, the non-skip playlist, and the smart screen metadata into a database. This completes the process in step 1599.

Figure 16:
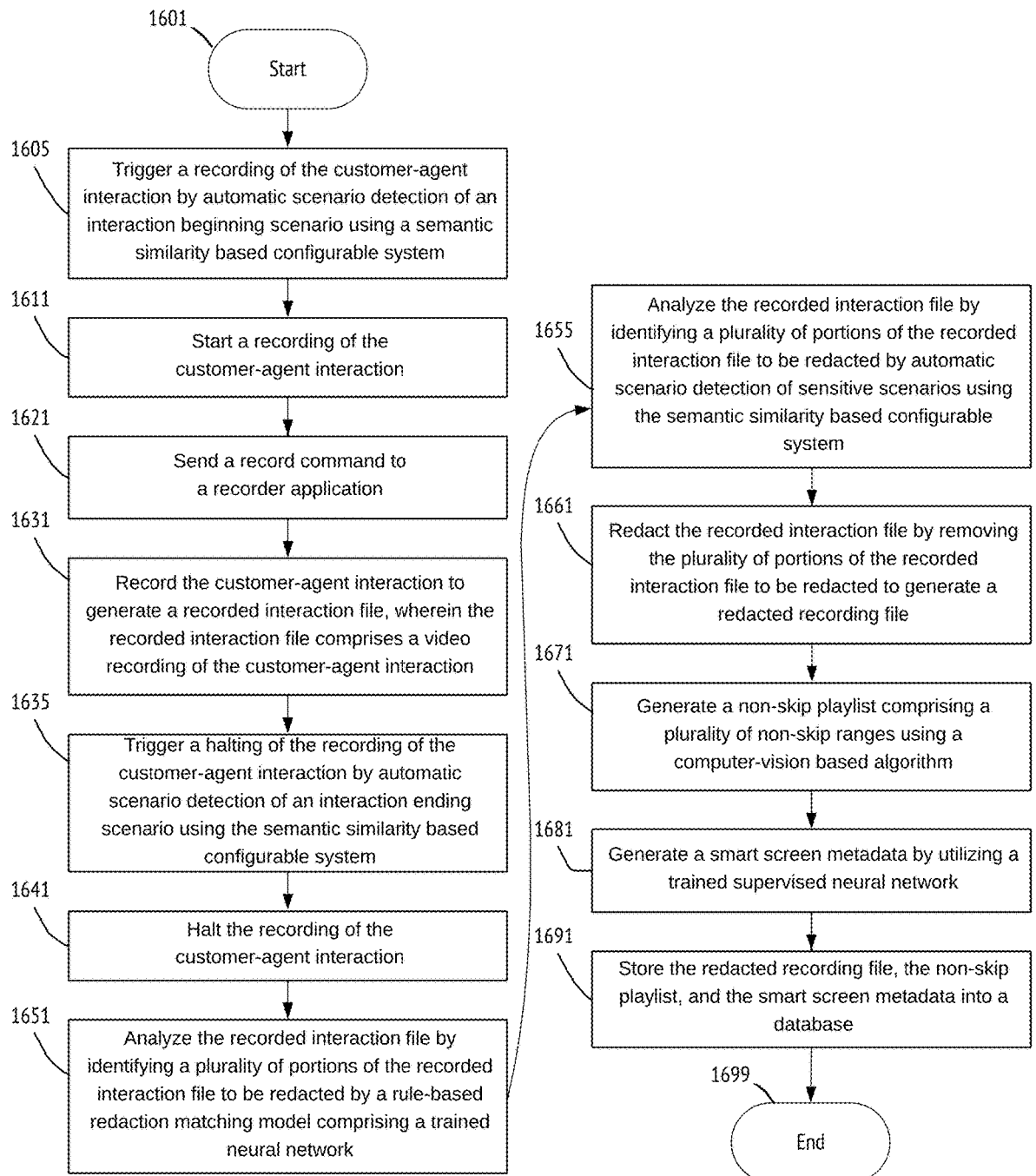
FIG. 16 shows a system diagram illustrating a customer-agent interaction recording system, in accordance with the examples disclosed herein.

FIG. 16 shows yet another flow diagram detailing the operation of a customer-agent interaction recording system, in accordance with the examples disclosed herein. In some embodiments, the flow diagram represents a computer-implemented method for recording and redacting a customer-agent interaction using a customer relationship management (CRM) system and a semantic similarity based configurable system. The process starts at step 1601. In step 1605, the system triggers a recording of the customer-agent interaction by automatic scenario detection of an interaction beginning scenario using the semantic similarity based configurable system. In step 1611, the system starts a recording of the customer-agent interaction. In some embodiments, starting the recording in step 1611 is in response to the system triggering the recording in step 1605. In step 1621, the system sends a record command to a recorder application. In step 1631, the system records the customer-agent interaction to generate a recorded interaction file, wherein the recorded interaction file comprises a video recording of the customer-agent interaction. In step 1635, the system triggers a halting of the recording of the customer-agent interaction by automatic scenario detection of an interaction ending scenario using the semantic similarity based configurable system. In step 1641, the system halts the recording of the customer-agent interaction. In some embodiments, halting the recording in step 1641 is in response to the system triggering the halting in step 1635. In step 1651, the system analyzes the recorded interaction file by identifying a plurality of portions of the recorded interaction file to be redacted by a rule-based redaction matching model comprising a trained neural network. In step 1655, the system analyzes the recorded interaction file by identifying a plurality of portions of the recorded interaction file to be redacted by automatic scenario detection of sensitive scenarios using the semantic similarity based configurable system. In some embodiments, steps 1651 and 1655 are interchanged with each other. In some embodiments, step 1651 is optional when step 1655 is configured to be performed. In step 1661, the system redacts the recorded interaction file by removing the plurality of portions of the recorded interaction file to be redacted to generate a redacted recording file. In step 1671, the system generates a non-skip playlist comprising a plurality of non-skip ranges using a computer-vision based algorithm. In step 1681, the system generates a smart screen metadata by utilizing a trained supervised neural network. In step 1691, the system stores the redacted recording file, the non-skip playlist, and the smart screen metadata into a database. This completes the process in step 1699.

Scenario Detection System & Conversation Tag System

A scenario detection system is used in some embodiments of the present invention, and is described next. In the descriptions that follow, a "client" denotes the owner or operator of the system, such as an organization providing a service or a product, a "customer" denotes a caller (e.g., a service or product user), and an "agent" denotes a responder (e.g., a customer service representative, an account manager, etc.).

Figure 17:
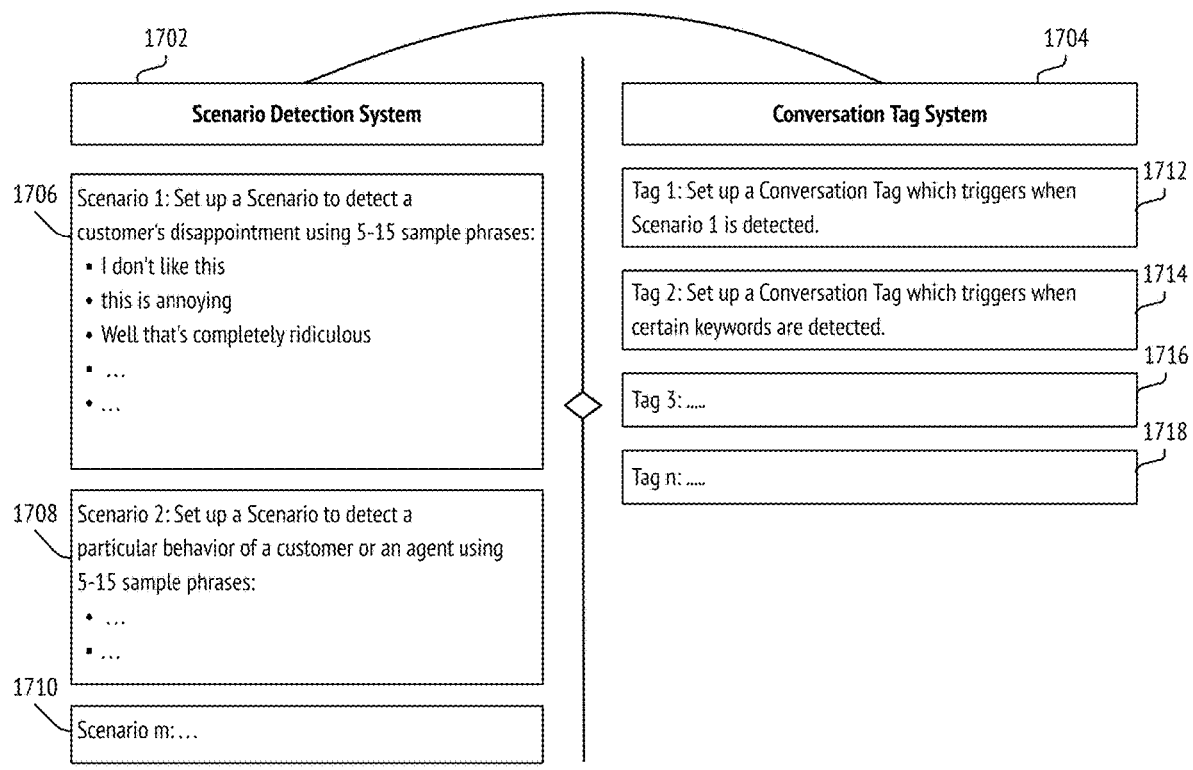
FIG. 17 shows an example high level diagram of a scenario detection system and a conversation tag system, in accordance with the examples disclosed herein.

FIG. 17 shows an example high level diagram of a scenario detection system 1702 and a conversation tag system 1704, in accordance with the examples disclosed herein. An integrated system of "scenarios and conversation tags" enables clients to configure various types of events to be detected. The "scenarios" portion of the integrated system is a behavior detection system, and the "conversation tags" portion of the integrated system is an alarm system. The alarm is triggered contingent on detection of a scenario, and, in some embodiments, a few other configuration options.

In some embodiments, a "scenario" is defined to be a behavior that the detection system 1702 will detect in each sentence within a given conversation. The system permits a client to describe a scenario using a set of representative phrases. For instance, a "customer disappointed" scenario meant to capture a customer's frustration may be described by the following phrases: "I simply hate this," "this thing has never worked well for me," "what a mess," "I've had enough now." Furthermore, a customer may also add "negative phrases" to the description, which are phrases that seem close to phrases that describe a desired scenario but where the client does not wish to trigger the scenario. For example, in the "customer disappointed" scenario, a client may not wish this scenario to trigger for sentences similar to "this is confusing," and so such sentences may be added to the set of negative phrases.

On its own, a scenario detected by the detection system 1702 for a sentence may not be shown to clients. In contrast, a scenario may trigger a "conversation tag," which may be shown to clients, depending on the set configuration options. In some embodiments, a "conversation tag" is a text string label assigned to a dialogue from a conversation. It is assigned to a dialogue based on the following criteria:

1. Who is the speaker of the dialogue? A user may configure this to be one of "agent" or "customer."
2. (a) Whether the dialogue conveys a specific intent (as described in a "scenario"), e.g., a tag called "frustrated customer" may be based on a "scenario" that describes a situation where the customer is complaining about pricing, or
    (b) whether the dialogue contains some specific keywords.
3. Whether the tag should apply to dialogues occurring at any time in the conversation or if it should only apply to those occurring within the first N seconds (where N is configured by the user).

Some potential configuration options are listed below:
1. Speaker: Whether the tag should trigger only for the agents' sentences, or customers' sentences, or a sequence of an agent sentence followed by a customer sentence. The last option is called a "dynamic tag."
2. Speaker behavior: Whether the tag should trigger if the "speaker" mentioned a particular phrase or whether it should trigger if a particular scenario in the speaker's sentence is detected. Because this is a configurable feature, "speaker behavior" may refer to any behavior on the part of the speaker. For example: (A) "frustration with pricing" is a behavior where the customer is complaining about high prices or better prices elsewhere: (B) "proper introductory greeting" is a behavior where the agent greets the customer, e.g., by saying: "thanks for calling ABC Company: how can I help you?": (C) "asking for refunds" is a behavior where a customer is for some reason asking about the process to return their product for a refund.
3. Timing: Whether the tag triggers at all times in a conversation or if it triggers only within the first X seconds of the conversation (where X is preset by the client).

As shown in FIG. 17, the client begins by configuring the scenario detection system 1702 so that it contains any number of scenarios, e.g., scenario 1 1706, scenario 2 1708, and scenario m 1710. Each scenario encapsulates some behavior of a customer or an agent. To set up a scenario, the client provides a list of several (e.g., 5 to 15) associated example phrases that capture how the behavior would be exhibited by a customer or agent. For example, to detect the "customer disappointment" scenario as shown in scenario 1 1706, the following phrases are associated with that scenario: "I don't like this," "this is annoying," "well, that's completely ridiculous." To detect the "customer frustration" scenario, an example phrase could be: "I simply hate your after-sales support."

Once a set of scenarios and associated lists of phrases have been set up into the scenario detection system 1702 (a behavior detection system), the client may configure the "conversation tags" system 1704 (an alarm system), which triggers whenever a scenario is detected in customer/agent utterances. Note that a conversation tag need not always be contingent on the detection of a scenario; a client may configure it to trigger only under certain circumstances, such as only when certain exact keywords are detected in customer/agent utterances. For example, tag 1 1712 sets up a conversation tag which triggers when scenario 1 1706 is detected and tag 2 1714 sets up a conversation tag which triggers when certain keywords are detected. Other tags, e.g., tag 3 1716 and tag n 1718, may also be established.

In some embodiments, triggering a conversation tag is based on a label of a closest scenario and a plurality of configured options. In some embodiments, the plurality of configured options includes the speaker identity (i.e., whether the speaker is an agent or a customer), where triggering a conversation tag is further based on an identity of a speaker of the utterance. In some embodiments, triggering a conversation tag is further based on whether a sequence of an agent sentence is followed by a customer sentence. In some embodiments, the plurality of configured options includes speaker behavior, where triggering a conversation tag is further based on whether a speaker of the utterance mentioned a particular phrase. In some embodiments, the plurality of configured options includes timing, where triggering a conversation tag is further based on whether the utterance occurred within a preset period of time after a conversation has begun. Timing refers to whether a tag may trigger at any time in the conversation, or if it should only trigger for those dialogues that occurred within the first N seconds, where N is configurable by the user.

Advantages of the integrated scenario detection system 1702 and conversation tag system 1704 include (1) the ability to tag based on a sequence of customer-agent scenarios ("dynamic tag"), and (2) the ability to make the tag contingent on presence of one of a set of keywords or the presence of a scenario. By separating the behavior detection (via scenario detection) and the alarm system (conversation tags), the client is able to independently configure multiple tags with the same underlying scenario but with different configurations. For example, the system may act differently depending on whether an utterance is from a customer or from an agent, or if the system has a history regarding a particular customer's behavior or mental state.

Retrieve Stage & Rerank Stage of the Scenario Detection System

Figure 18:
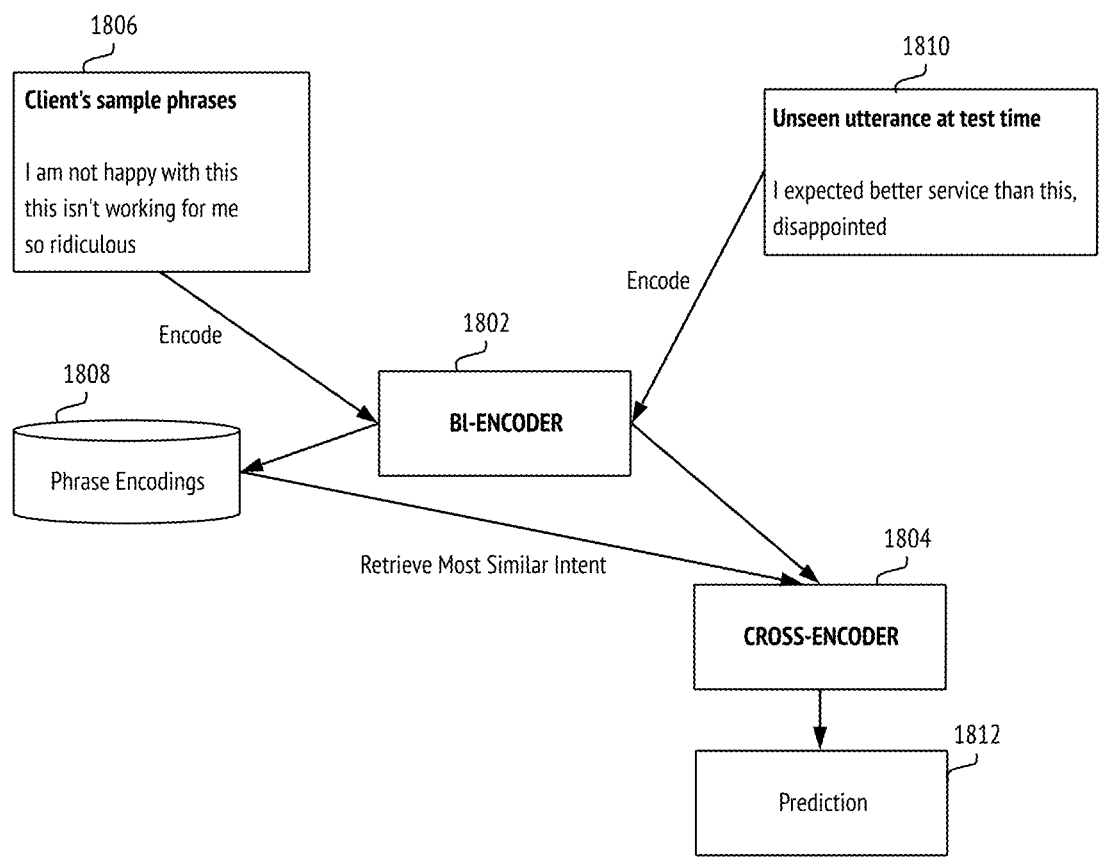
FIG. 18 shows an example overview schematic diagram of the scenario detection system, in accordance with the examples disclosed herein.

FIG. 18 shows an example overview schematic diagram of the scenario detection system, in accordance with the examples disclosed herein. The scenario detection system comprises two stages: a retrieve stage and a rerank stage. The retrieve stage acts as a coarse sieve, where in some embodiments, it is implemented with a bi-encoder model 1802, a neural network that encodes a sentence in human language into an embedding vector (or simply "embedding"), which may be an ordered sequence of real numbers. The rerank stage acts as a fine sieve, which in some embodiments is implemented with a cross-encoder model 1804. This retrieve-rerank framework is commonly employed in text-based semantic search. However, it may be adapted for scenario detection as described in this disclosure.

The scenario detection system works as follows. First, the client's sample phrases 1806 and their associated scenarios are entered into the bi-encoder 1802. For example, a "customer disappointed" scenario may be described by the following phrases: "I am not happy with this." "this isn't working for me," and/or "so ridiculous." The bi-encoder 1802 encodes such phrases for all scenarios, and then stores them in a database 1808 (e.g., "phrase encodings"). In some embodiments, a scenario is encoded as a normalized centroid of embeddings of all input phrases, and a dialogue is encoded during test time as a single normalized embedding. In some embodiments, the centroid of a set of vectors in a vector space is the vector in the vector space that minimizes the weighted sum of the generalized squared distances from each of the vectors in the set of vectors to a point in the vector space. In some embodiments, the distance here is the Euclidean distance. In other embodiments, other geometries are employed. In some embodiments, the weighted sum is an equal sum, where each vector is weighted equally. In the training phase, encoding entails the following: For every scenario, N phrases are taken from the user, where N may vary from a minimum of 3 to any number of phrases the user may want to provide. The N phrases are then encoded separately using a bi-encoder, which generates a vector of size [M×1] (e.g., M=768) for every phrase. The normalized centroid of all the N vectors (essentially the mean of all vectors) for this particular scenario is then calculated, and this encoding forms the encoding for the scenario. For example, consider a user establishing a scenario named "Greeting" and providing five associated phrases. All five phrases are then separately encoded to generate five vectors of size [768×1] and then the normalized centroid of these five encoded vectors are calculated to form the encoding for scenario "Greeting." In the inference phase, encoding entails the following: When a new query Q is received, it is directly encoded using the bi-encoder to generate a vector of size [M×1] (e.g., M=768). In addition, the vector is then normalized as performed for the scenario phrases, and the two are compared to seek a match.

Next, a new sentence from a conversation (e.g., "unseen utterance at test time" 1810) is encoded using the bi-encoder 1802 and the closest scenario phrase encoding 1808 to that sentence is retrieved. For example, the sentences "I expected better service than this" or "disappointed" may result in the phrases associated with the "customer disappointed" scenario being retrieved. Finally, the cross-encoder 1804 computes a score associated with the sentence and all client phrases of the closest scenario. If that score exceeds a certain threshold, then the label of that closest scenario is assigned to the sentence as a prediction 1812. Otherwise, nothing is assigned to the sentence.

The advantage of the retrieve-rerank implementation over the traditional keyword matching approach is that retrieve-rerank does not rely on the presence of keywords to detect an intent. Instead, it focuses on semantics of a sentence: it maps each sentence to a list of numbers, i.e., an embedding vector, such that the distance between the embedding vectors of sentences with similar meanings is small. This is independent of whether two sentences with similar meanings have the same set of keywords or not.

Figure 19:
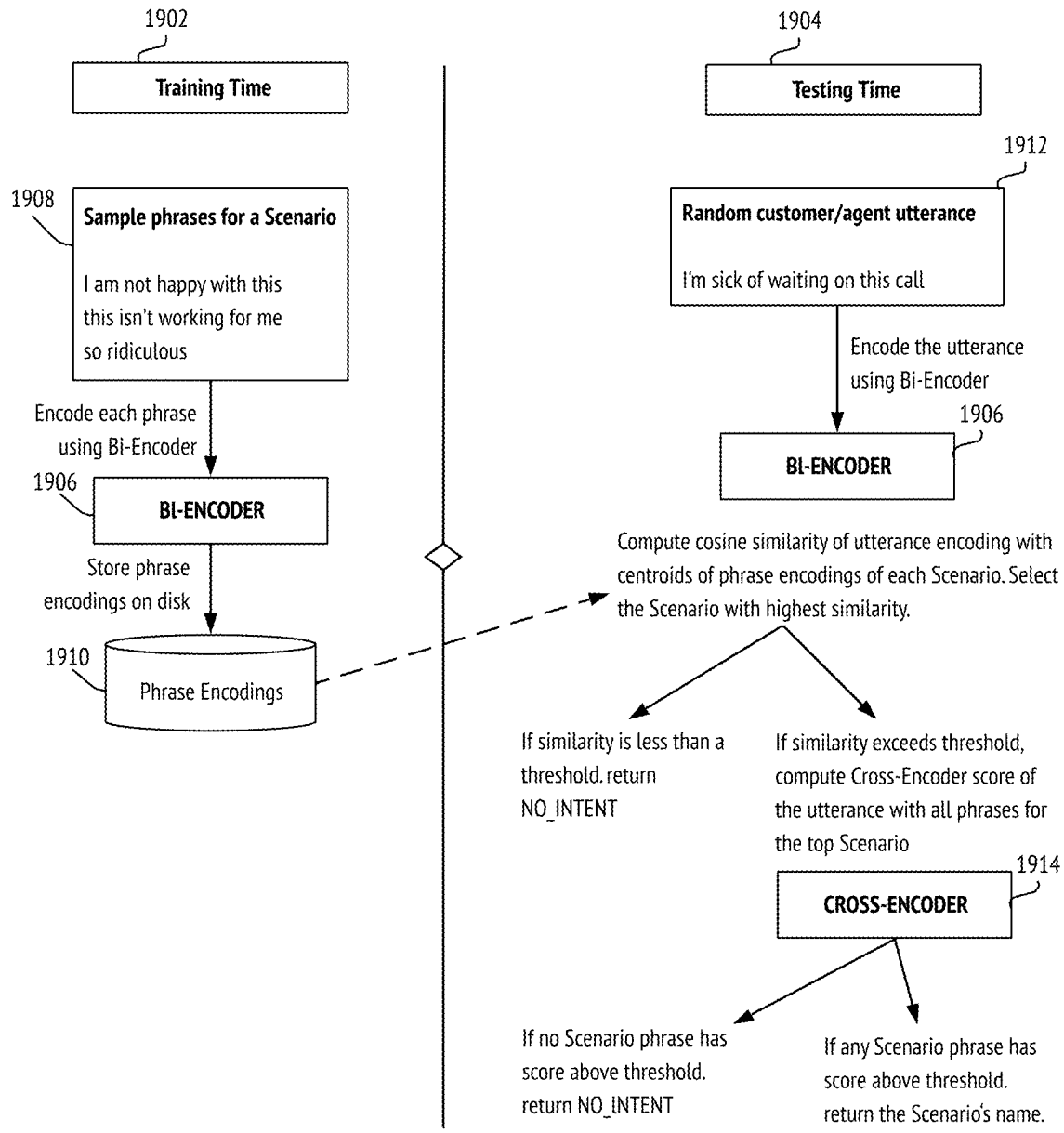
FIG. 19 shows an example detailed diagram of a scenario detection system, in accordance with the examples disclosed herein.

FIG. 19 shows an example detailed diagram of a scenario detection system, in accordance with the examples disclosed herein. The scenario detection system takes actions during training time ("training time") 1902 (i.e., a client is setting up a scenario for the first time), and during testing time ("testing time") 1904 (i.e., system is attempting to detect the presence of a scenario in a customer or agent utterance).

During training time 1902, the bi-encoder 1906 takes in a list of sample phrases 1908 that can describe a particular scenario. For example, the phrases "I am not happy with this," "this isn't working for me," and "so ridiculous" may be used to describe the scenario in which the "customer disappointed" scenario. The bi-encoder 1906 then encodes each phrase provided by the user, and stores these phrase embeddings into a database ("phrase encodings") 1910. Encoding is performed as described with reference to FIG. 2.

During testing time 1904, the system is given a random or arbitrary utterance 1912 from a customer or an agent. This utterance is encoded using the bi-encoder 1906. In some embodiments, a first similarity score (e.g., cosine similarity) of the encoding of this utterance 1912 with each stored phrase embedding is computed. In other embodiments, the first similarity score (e.g., cosine similarity) of the encoding of this utterance 1912 with the centroids of the phrase encodings 1910 associated with each scenario in the stored phrase embeddings is computed. The scenario whose phrase embedding has the highest first similarity score with the utterance is retrieved, where the similarity score between two embeddings is calculated as the cosine distance between the two embedding vectors, producing a real number between 0 and 1. If this highest first similarity is below some first threshold score, "no intent" ("NO_INTENT," i.e., no intent matched, intentless) is returned. Otherwise, (i.e., this highest first similarity exceeds some first threshold score), a second similarity score of the utterance 1912 with all phrases belonging to the top intent using a cross-encoder 1914 is computed.

With regards to the "highest" first similarity: For a single dialogue, its embedding is computed, and then its similarity score with stored embeddings of all scenarios that have been programmed for this client is also computed; the highest similarity score with this dialogue embedding (among all scenarios) is selected. With regards to the concept of "no intent" or "intentless:" Each client programs N intents, where N is any positive integer and a scenario is synonymous with an intent. "No intent" or "intentless" means that the dialogue at hand does not exhibit any intent out of the N that the client has programmed. However, in this case, it may be that the dialogue exhibits some real intent that is not in the set of N programmed intents.

If the second similarity score with any phrase exceeds some second threshold score, the label of the intent is retrieved and generated. Otherwise, i.e., the second similarity score does not exceed some second threshold score, "no intent" ("NO_INTENT," i.e., lack of intent, the utterance is intentless) is returned. With regards to the "first threshold score" and the "second threshold score," the threshold values are chosen as follows: A subset from a set of utterances is selected as a test set and the model is run on this test set. Then, various threshold levels are set and the threshold that generates the best precision and recall on this test set is selected as a suitable threshold score. After significant testing with various clients, a specific threshold value of 0.55 appears to work across all clients sufficiently well. Of course, the threshold value may be adjusted across clients depending on the quality of precision and recall. One measure of performance for these experiments is the average F1 score (i.e., the harmonic average of precision and recall) across all intents present in the test set.

Bi-Encoder of the Scenario Detection System

Figure 20:
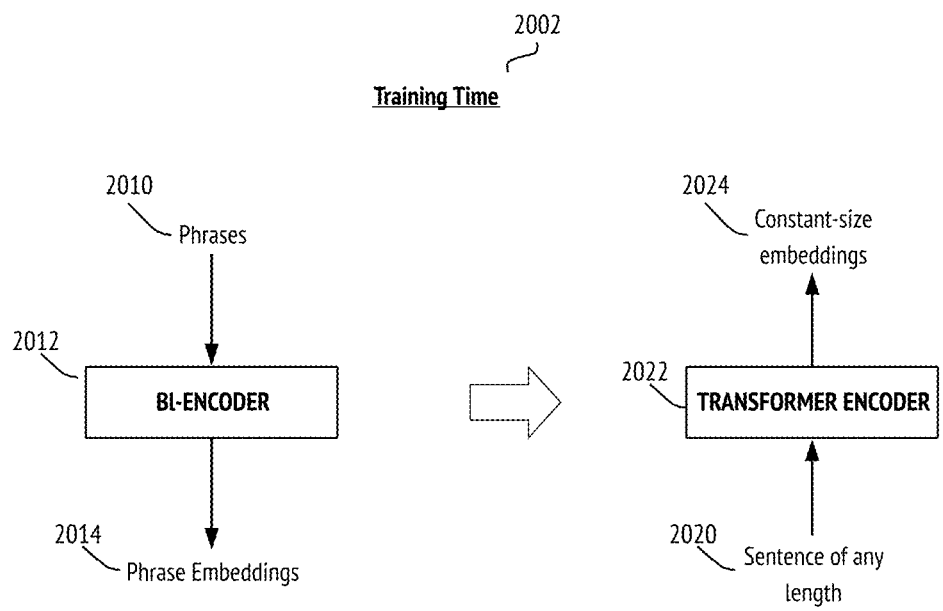
FIG. 20 shows an overview schematic diagram of bi-encoder operation, in accordance with the examples disclosed herein.

FIG. 20 shows an overview schematic diagram of bi-encoder operation during "training time" 2002, in accordance with the examples disclosed herein. Phrases 2010 are inputted into the bi-encoder 2012, which generates phrase embeddings 2014. In some embodiments, the bi-encoder 2012 includes a large language model (LLM), which includes a transformer encoder 2022, and is trained on contrastive loss. Sentences 2020 of any length are inputted into the transformer encoder 2022, which generates constant-size embeddings 2024.

The token space of the bi-encoder 2012 is a finite countable set of all tokens, and each token is assigned a unique "token ID." A token in transformer parlance is a sequence of characters. During tokenization, a string is represented as a sequence of tokens, e.g., "hello world" may be represented as these three tokens: ["he," "-llo," "world"]. Thus, each input phrase or sentence is mapped to a single embedding vector. The transformer encoder 2022 receives a sentence's representation as a sequence of token IDs and produces a "contextual embeddings," or a sequence of vectors of real numbers. The number of embedding vectors produced equals the number of token IDs in the input sequence. Then the average over those vectors is calculated to generate a single vector representing the embedding of the given phrase or sentence. Thus, a transformer encoder 2022 encodes a sentence into a sequence of vectors which captures relationships between various words in the sentence.

To convert input phrases into phrase embeddings, the bi-encoder 2012 uses the architecture of a transformer's encoder, which includes several layers, each containing two main sub-components: a multi-head self-attention mechanism and a position-wise feed-forward network. Each of these sub-components is followed by residual connections and layer normalization to help stabilize the learning process. The output of the bi-encoder 2012 is configured to generate embeddings of fixed length, i.e., a vector of length 768, independent of what the input phrase or sentence length is.

The contrastive loss is computed via a triplet objective function. Given an anchor sentence a, a positive sentence p, and a negative sentence n, the triplet loss tunes the network such that the distance between a and p is smaller than the distance between a and n. Specifically, the following loss function is minimized: $\max(\|sa-sp\|-\|sa-sn\|+epsilon, 0)$, with sx representing the sentence embedding for a, n, and p, and $\|\cdot\|$ representing a distance metric. A margin epsilon ensures that sp is at least closer to sa than sn is. As a metric, the Euclidean distance is used and the margin is set to 1.

Figure 21:
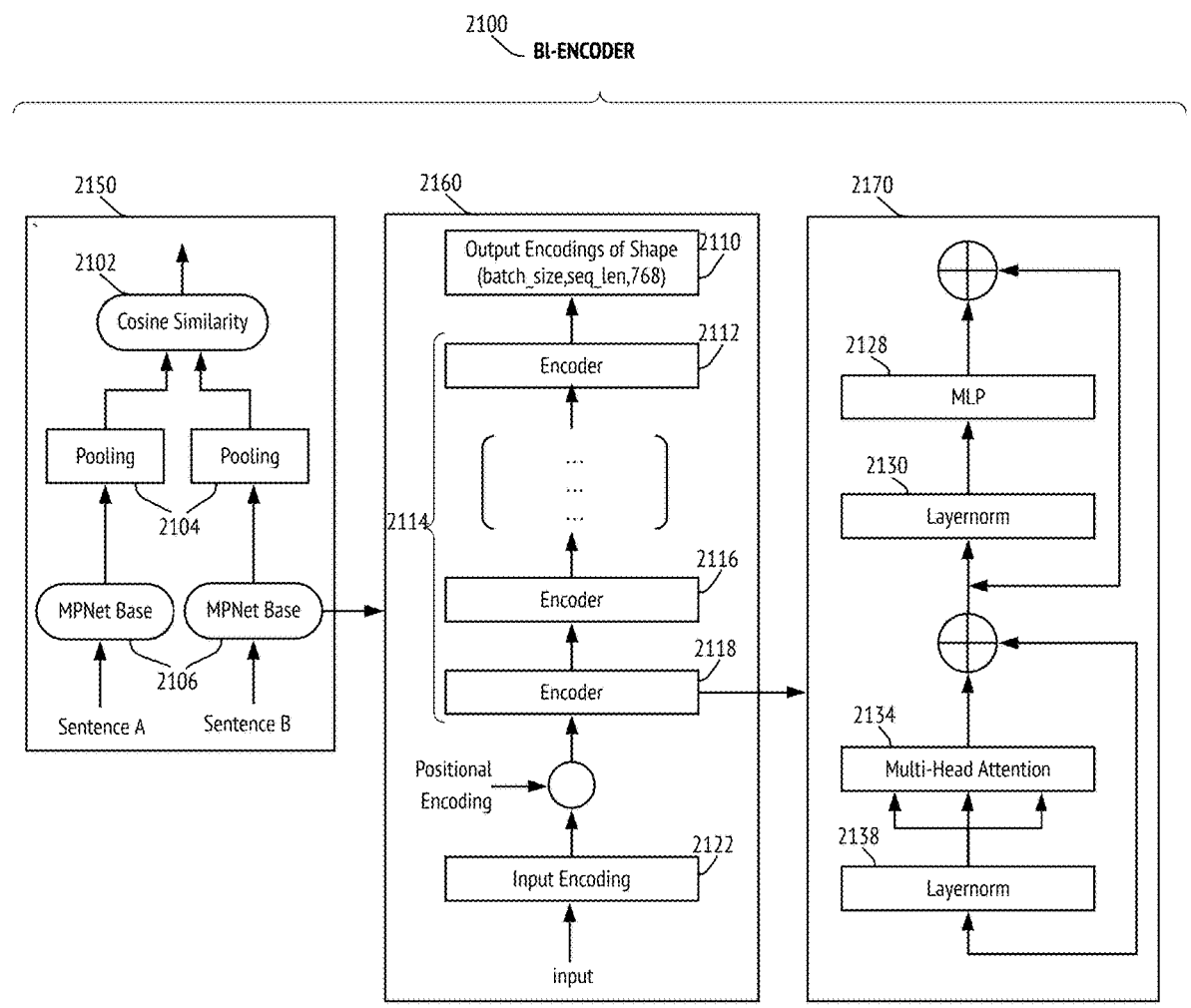
FIG. 21 shows an example block diagram of a bi-encoder, in accordance with the examples disclosed herein.

FIG. 21 shows an example block diagram of a bi-encoder 2100, in accordance with the examples disclosed herein. Bi-encoders belong to a transformer-based language model class, specifically designed to generate embeddings of sentences. These tools were first introduced in the paper "*Sentence-BERT: Sentence Embeddings using Siamese BERT-Networks*" by Reimers et. al. (available at arxiv.org/abs/1908.10084), published in August 2019. These tools were introduced as modifications of a pre-trained BERT (Bidirectional Encoder Representations from Transformers) network that uses Siamese and triplet network structures to derive semantically meaningful sentence embeddings that can be compared using cosine similarity 2102. A description of BERT can be found in the paper "A Primer in BERTology: What we know about how BERT works" by Rogers et. al. (available at arxiv.org/abs/2002.12327). The purpose of these models is to convert sentences into vectors such that similar sentence vectors are close to one another in the vector space and dissimilar sentence vectors are far away from one another. The models are successfully applied in many tasks, such as large scale semantic similarity comparison, clustering, and information retrieval via semantic search. Although various embodiments using BERT-based models are described herein, other LLM algorithms or other AI-based approaches are within the scope of the present invention.

In some embodiments, the bi-encoder 2100 includes a first component 2150, a second component 2160, and a third component 2170. The first component 2150 includes one or more MPNet-based models 2106, one or more pooling operations 2104, and a cosine similarity operation 2102, where MPNet stands for "*Masked and Permuted Pre-train-*

*ing for Language Understanding*" (see Song et. al. April 2020 paper available at arxiv.org/abs/2004.09297). The second component 2160 includes input encoding 2122, a number (e.g., 9) of encoder stacks 2114 (i.e., a stack of encoders in series, which includes encoder 2112, encoder 2116, and encoder 2118), and output encodings of shape 2110. The third component 2170 includes a layernorm 2130, another layernorm 2138, multi-head attention 2134, and multilayer perceptron (MLP) 2128.

The Siamese network architecture enables fixed-sized vectors for input sentences to be derived. Using a similarity measure, such as cosine similarity 2102 or Manhattan/Euclidean distance, semantically similar sentences can be found. Bi-encoder class models add a pooling 2104 operation to the output of BERT/ROBERTa to derive a fixed-sized sentence embedding, where ROBERTa stands for "ROBERTa: A Robustly Optimized BERT Pretraining Approach" (see Liu et. al., July 2019, and available at arxiv.org/abs/1907.11692).

The triplet objective function tunes a network such that the distance between an anchor sentence a and a positive sentence p is smaller than the distance between a and a negative sentence n. The loss function for this triplet objective function is described above with reference to FIG. 4. Of the bi-encoder models available in Sentence-BERT and the HUGGING FACE collaboration platform, the all-mpnet-base-v2 model 2106 (see huggingface.co/sentence-transformers/all-mpnet-base-v2) has been applied to implement the embodiment described in the present disclosure. This model was developed using the pre-trained MICROSOFT/mpnet-base model 2106 (see huggingface.co/microsoft/mpnet-base) and fine-tuning it on a 1 billion sentence pairs dataset by using the following contrastive learning objective: Given a sentence from the pair, the model predicts which sentence out of a set of randomly sampled other sentences was actually paired with it in the dataset. Formally, the cosine similarity 2102 from each possible sentence pair from the batch is calculated and then cross entropy loss is applied by comparing with those of true pairs. Given an input sentence, it maps sentences to a multi-dimensional (e.g., 768-dimensional) dense vector that captures the semantic information of the given sentence.

The cross entropy loss is computed as follows: Given an input sentence, the model computes a similarity score between that input sentence and N other sentences (where N is a positive integer) of which one sentence is semantically similar to the input sentence. The softmax operation is applied on these scores to generate a categorical distribution over the N sentences (i.e., the "soft-maxed" scores now sum to unity, i.e., 1). To teach the model to maximize the softmaxed score of the sentence that was semantically closest to the input, the cross entropy loss is calculated as the negative logarithm of the softmaxed-score of this closest sentence. Minimizing this cross entropy loss is equivalent to maximizing the softmax-score.

Specifically, this model encodes the given query (i.e., any sentence from an agent-user conversation) and the intent phrases (i.e., phrases that describe an intent), and then the cosine similarity 2102 between these phrases is used to determine the best candidate intent for the given query.

Cross-Encoder of the Scenario Detection System

Figure 22:
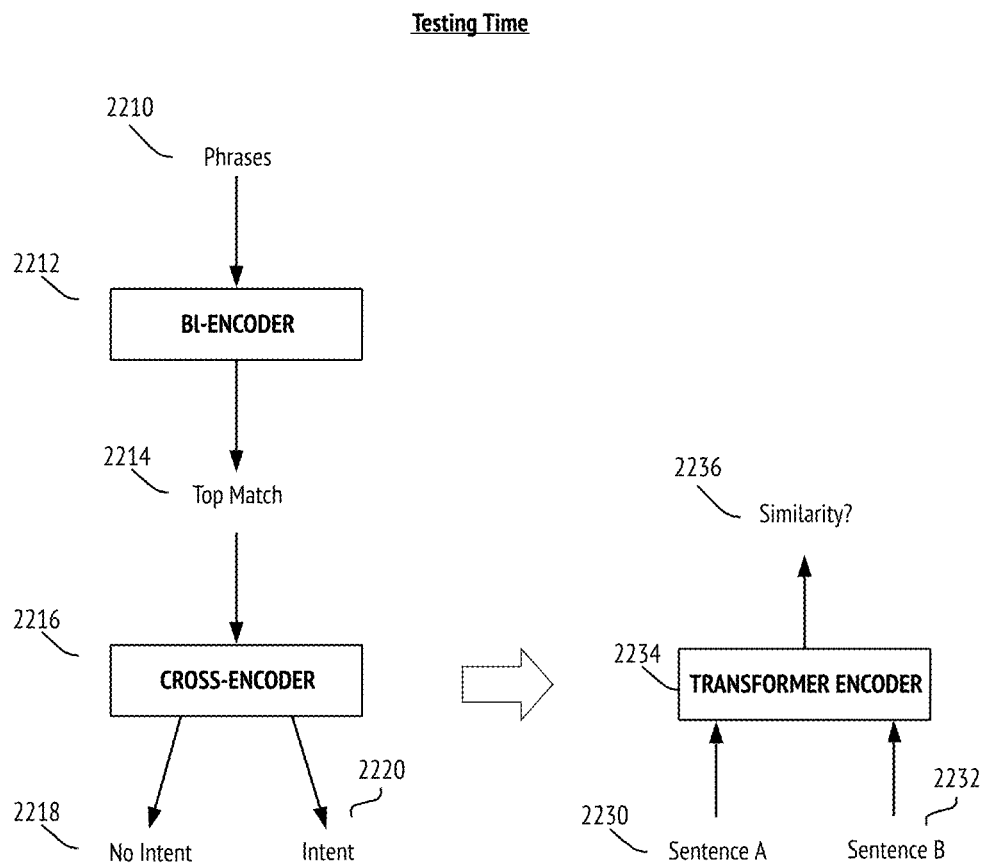
FIG. 22 shows an overview schematic diagram of cross-encoder operation, in accordance with the examples disclosed herein.

FIG. 22 shows an overview schematic diagram of cross-encoder operation during "testing time," in accordance with the examples disclosed herein. In some embodiments, the cross-encoder 2216 is a large language model (LLM) that includes a transformer's encoder block and a classification head, trained to detect similarity between two sentences. Phrases 2210 are inputted into a bi-encoder 2212, which generates a top match 2214. The top match 2214 is sent to a cross-encoder 2216, which returns either "no intent" 2218 or "intent" 2220. Then, a transformer encoder 2234 is able to accept sentences (e.g., sentence A 2230 and sentence B 2232) to generate a similarity score 2236.

The model's output is a metric for similarity, so the cross-encoder takes in two sentences as input and generates an output x, where x is a real number between 0 and 1. The number x represents the probability of similarity between the two given inputs, where 0 represents non-similarity and 1 represents identical inputs. A threshold mechanism on the output x given the model decides between "intent" and "no intent." Heuristically, a threshold of 0.55 appears suitable for many applications. For example, suppose the intent match from the bi-encoder phase is "Greeting." Then, all the phrases from the intent "Greeting" are paired up with the query. Thus, if there are five phrases associated with the intent "Greeting," then five phrase-query pairs (e.g., [phrase_a, query], [phrase_b, query]) are generated. These are sent to the cross-encoder and a score for each phrase-query pair is determined. If any of these five scores are above a threshold (e.g., 0.55), then that query is given the intent "Greeting." Otherwise, the query is said to have "No Intent." The classification head includes a simple feed forward layer, which takes the embeddings from the last transformer encoder layer and generates a single number representing the probability of how similar both the input sentences were.

Figure 23:
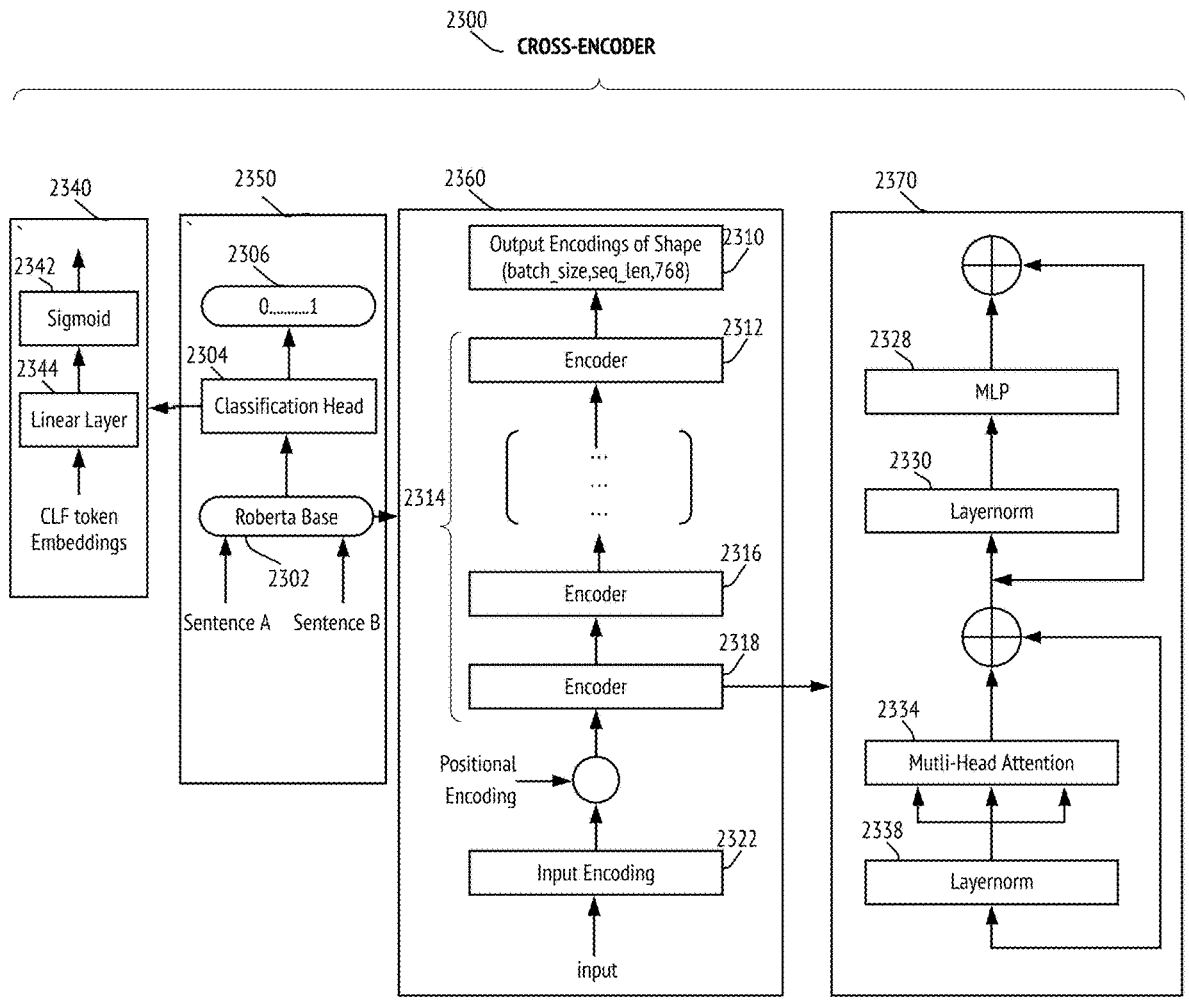
FIG. 23 shows an example block diagram of a cross-encoder, in accordance with the examples disclosed herein.

FIG. 23 shows an example block diagram of a cross-encoder, in accordance with the examples disclosed herein. Cross-encoder models also belong to a transformer-based language model class, but unlike bi-encoders, which generate a sentence embedding for a given sentence, cross-encoders generate an output value (e.g., between 0 and 1) indicating the similarity of an input sentence pair. A user or system may provide to a bi-encoder independently sentences A and B, which result in the respective sentence embeddings u and v, while for a cross-encoder, a user or system provides two sentences simultaneously by pairing them. A cross-encoder does not produce a sentence embedding. While a cross-encoder generally produces better results on sentence similarity than a bi-encoder does, it can be computationally expensive, and hence may be impractical for a very large semantic search type operation. Cross-encoders are mostly used whenever the user has a predefined set of sentence pairs to score. For example, a user desires the similarity scores for 100 sentence pairs.

Of the cross-encoder models available in Sentence-BERT and the HUGGING FACE collaboration platform, the stsb-roberta-base model 2302 (see huggingface.co/cross-encoder/stsb-roberta-base) has been applied to implement the present disclosure. This model was developed using the pre-trained Roberta-base model 2302 (see huggingface.co/roberta-base) and fine-tuning it on a sentence similarity dataset, where given a sentence pair, the model's objective outputs a value between 0 and 1, where a value closer to 0 indicates dissimilarity between two sentences and a value closer to 1 indicates similarity between the two sentences. Specifically the model helps confirm whether the candidate that the bi-encoder tagged as an intent for a given query appropriately belongs to that particular intent class.

In some embodiments, the cross-encoder 2300 includes a first component 2340, a second component 2350, a third component 2360, and a fourth component 2370. The first component 2340 includes a linear layer 2344 that accepts CLS ("Classification") token embeddings and a sigmoid operator 2342. The second component 2350 includes a Roberta-base model 2302 that accepts sentences (e.g., sentence A, sentence B) and a classification head 2304 that outputs a value 2306 (e.g., between 0 and 1). The third component 2360 includes input encoding 2322, a number (e.g., 9) of encoder stacks 2314 (i.e., a stack of encoders in series, which includes encoder 2312, encoder 2316, and encoder 2318), and output encodings of shape 2310. The fourth component 2370 includes a layernorm 2330, another layernorm 2338, multi-head attention 2334, and multilayer perceptron (MLP) 2328.

The bi-encoder and the cross-encoder coordinate their actions, where the retrieval stage uses the bi-encoder and the rerank stage uses the cross-encoder. In particular, the bi-encoder model is trained on cosine similarity loss and strives to generate high-quality sentence embeddings. In this stage, the system marks the query at hand to a particular intent out of a set of intents. This step may be considered an "intent vs intent classifier," i.e., its job is to decide to which intent the new query belongs. Next, the rerank stage is the final decider. The model distinguishes between "intent" and "no intent" ("NO_INTENT." i.e., lack of intent, the utterance is intentless), but in the absence of a model trained for that particular task, a proxy task is performed instead, where the phrases of the given intent are compared with the query at hand. Based on which phrase is the most similar, "intent" or "no intent" ("NO_INTENT." i.e., lack of intent, the utterance is intentless), is determined.

While the concept of semantic search has been limited to information retrieval and knowledge search, the present disclosure uses embedding based search as a pseudo-task for intent detection. In particular, the system does not match a query with the phrases directly at the bi-encoder stage, but instead matches the query embeddings with intent embeddings, where intent embeddings are found by taking the centroid of all the phrase embeddings for that particular intent. Bi-encoders are generally used to fetch the top few (e.g., 5-10) matching sentences or paragraphs in information retrieval or knowledge search, whereas in the present disclosure, generally only the top choice is returned. In addition, a threshold on the similarity between the query and the centroid of intents, i.e., a hyperparameter, may be used. In some embodiments, a validation set on which the threshold is based maximizes the micro-average precision and recall.

Finally, cross-encoders are generally used to rerank and order predictions coming from a bi-encoder in order to generate relevant outputs at the top, whereas the present disclosure uses the cross-encoder similarity output as a "pseudo" in order to determine "intent" versus "no intent" ("NO_INTENT," i.e., lack of intent, the utterance is intentless) given an intent recommendation from the bi-encoder. A query is classified as an "intent" or as a "no intent" ("NO_INTENT," i.e., lack of intent, the utterance is intentless) using a threshold on the similarity score from the cross-encoder. This threshold is again a hyperparameter, which may be obtained by optimizing the Micro Average Precision and Recall on a validation set.

Figure 24:
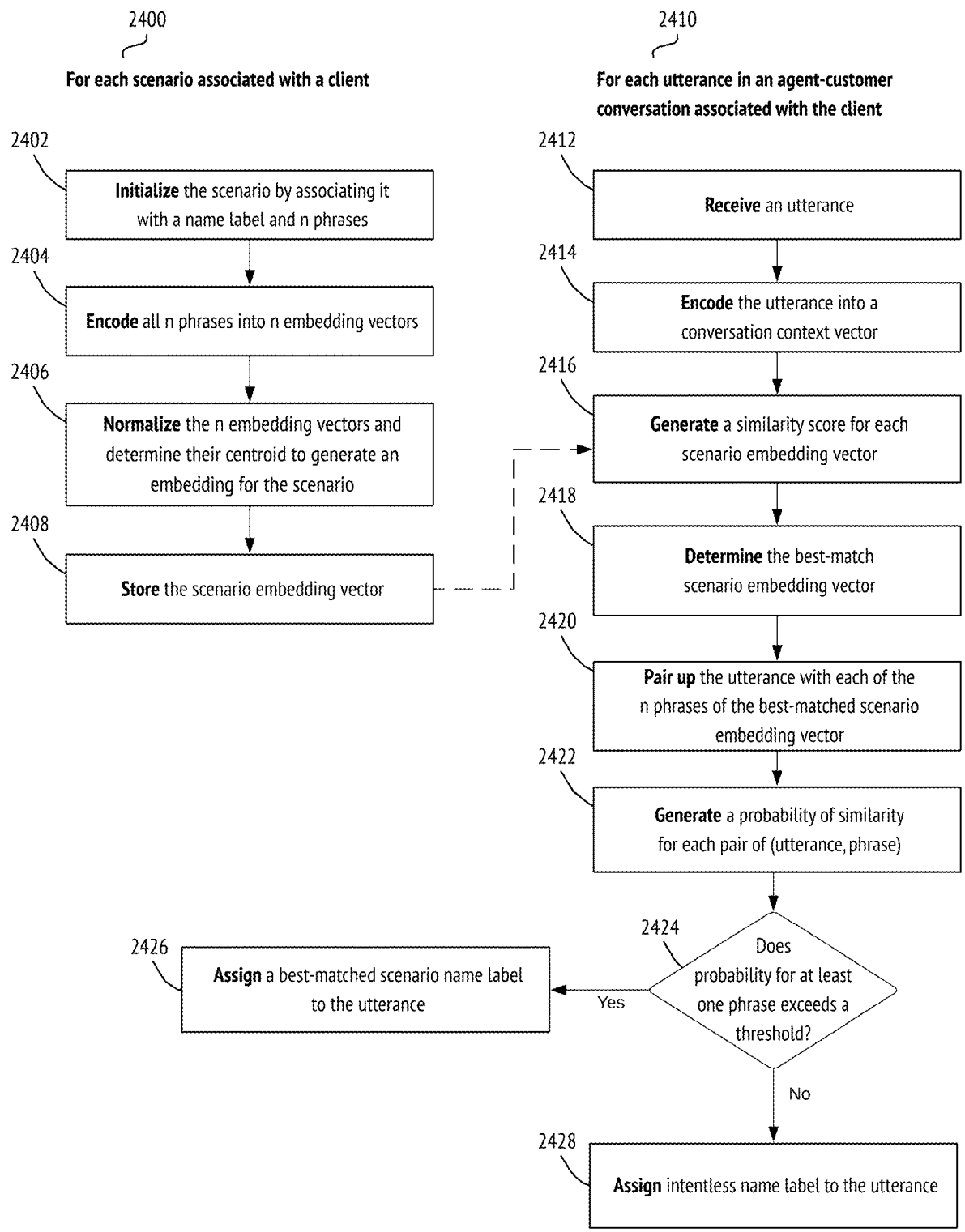
FIG. 24 shows an example flow diagram detailing the operation of a scenario detection and conversation tag system, in accordance with the examples disclosed herein.

FIG. 24 shows an example flow diagram detailing the operation of a scenario detection and conversation tag system, in accordance with the examples disclosed herein. For each scenario 2400 associated with a client, the operation takes steps 2402, 2404, 2406, and 2408. In step 2402, the system initializes the scenario by associating it with a name label (e.g., a text string), and n phrases, where n is some positive integer. The number n may be different for each scenario. In step 2404, the system encodes all n phrases into n embedding vectors (i.e., "phrase encodings") using a bi-encoder. In step 2406, the system normalizes the n embedding vectors and determines their centroid to generate a scenario embedding vector (i.e., "scenario encoding"). Finally, in step 2408, the system stores the scenario embedding vector into a database. In some embodiments, in step 2408, the system stores the scenario embedding vector, the name label, and the list of n embedding vectors as an associated group into the database.

Next, for each utterance 2410 in an agent-customer conversation associated with the client, and for each defined scenario, the operation takes steps 2412, 2414, 2416, 2418, 2420, 2422, 2424, 2426, and 2428. In some embodiments, the system decomposes the conversation into a set of utterances i.e., the conversation comprises utterances, and the bi-encoder is ready to receive utterances. In alternative embodiments, the conversation is already pre-decomposed into a set of utterances. For each utterance 2410, the following steps are taken: In step 2412, the bi-encoder receives an utterance. In step 2414, the system encodes the utterance into a conversation context vector using the bi-encoder. In step 2416, the system compares the conversation context vector with the scenario embedding vectors stored in the database, and generates a similarity score for each scenario embedding vector stored in the database. In some embodiments, the similarity score is a cosine similarity score. In step 2418, the system determines the best-match scenario embedding vector, i.e., the scenario embedding vector that best matches the conversation context vector of the utterance, using the bi-encoder. In some embodiments, determining the best match entails identifying the scenario embedding vector whose similarity score is the highest. In step 2420, the system pairs up the utterance with each of the n phrases associated with the best-matched scenario embedding vector to generate ordered pairs, such as "(utterance A, phrase 1 of matched scenario)," "(utterance A, phrase 2 of matched scenario)," and "(utterance A, phrase 3 of matched scenario)." In step 2422, using the cross-encoder, the system generates a probability of similarity for each generated ordered pair of (utterance, phrase). In some embodiments, this probability of similarity corresponds to the second similarity score referenced in FIG. 3. In step 2424, the system determines whether the probability for at least one phrase associated with the best-matched scenario embedding vector exceeds a preset threshold (e.g., 0.55). If "yes" (step 2426), then the bi-encoder is considered to be "correct," and a best-matched scenario name label associated with the best-matched scenario embedding vector is assigned to the utterance. In some embodiments, other information associated with the best-matched scenario, such as intent, is also assigned to the utterance. Otherwise (step 2428), the bi-encoder is considered to be "wrong," and an intentless name label (i.e., "no intent") is assigned to the utterance.

Figure 25:
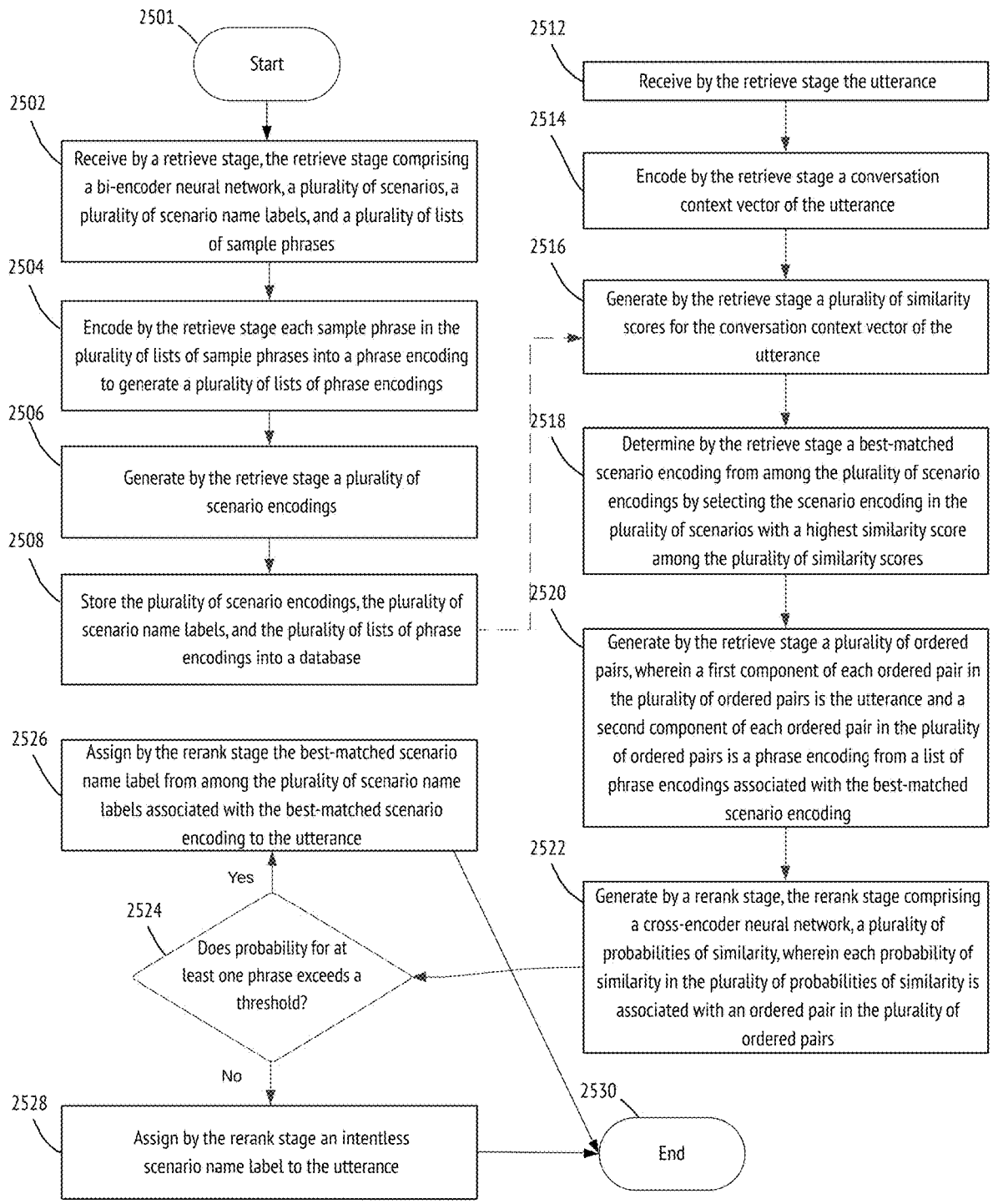
FIG. 25 shows another flow diagram detailing the operation of a scenario detection and conversation tag system, in accordance with the examples disclosed herein.

FIG. 25 shows another flow diagram detailing the operation of a scenario detection and conversation tag system, in accordance with the examples disclosed herein. In particular, the flow diagram determines a best-matched scenario name label for an utterance during automatic scenario detection in customer-agent conversations.

The operation begins in step 2501.

In step 2502, the system receives by a retrieve stage, the retrieve stage comprising a bi-encoder neural network, a plurality of scenarios, a plurality of scenario name labels, and a plurality of lists of sample phrases, wherein each scenario in the plurality of scenarios is associated with a name label in the plurality of name labels and with a list of sample phrases in the plurality of lists of sample phrases.

In step 2504, the system encodes by the retrieve stage each sample phrase in the plurality of lists of sample phrases into a phrase encoding to generate a plurality of lists of phrase encodings.

In step 2506, the system generates by the retrieve stage a plurality of scenario encodings, wherein each scenario encoding in the plurality of scenario encodings is associated with a scenario in the plurality of scenarios, is associated with a name label in the plurality of scenario name labels, and is associated with a list of phrase encodings in the plurality of lists of phrase encodings, and wherein each scenario encoding in the plurality of scenario encodings is based on normalizing and determining the centroid of a list of phrase encodings associated with the scenario in the plurality of scenarios.

In step 2508, the system stores the plurality of scenario encodings, the plurality of scenario name labels, and the plurality of lists of phrase encodings into a database.

In step 2512, the system receives by the retrieve stage the utterance.

In step 2514, the system encodes by the retrieve stage a conversation context vector of the utterance.

In step 2516, the system generates by the retrieve stage a plurality of similarity scores for the conversation context vector of the utterance, wherein each similarity score in the plurality of similarity scores is associated with a scenario encoding in the plurality of scenario encodings stored in the database.

In step 2518, the system determines by the retrieve stage a best-matched scenario encoding from among the plurality of scenario encodings by selecting the scenario encoding in the plurality of scenarios with a highest similarity score among the plurality of similarity scores.

In step 2520, the system generates by the retrieve stage a plurality of ordered pairs, wherein a first component of each ordered pair in the plurality of ordered pairs is the utterance and a second component of each ordered pair in the plurality of ordered pairs is a phrase encoding from a list of phrase encodings associated with the best-matched scenario encoding.

In step 2522, the system generates by a rerank stage, the rerank stage comprising a cross-encoder neural network, a plurality of probabilities of similarity, wherein each probability of similarity in the plurality of probabilities of similarity is associated with an ordered pair in the plurality of ordered pairs.

In step 2524, the system determines by the rerank stage whether at least one probability of similarity in the plurality of probabilities of similarity exceeds a preset threshold.

In step 2526, the system assigns by the rerank stage the best-matched scenario name label from among the plurality of scenario name labels associated with the best-matched scenario encoding to the utterance if at least one probability of similarity in the plurality of probabilities of similarity exceeds a preset threshold.

Finally, in step 2528, the system assigns by the rerank stage an intentless scenario name label to the utterance if no probability of similarity in the plurality of probabilities of similarity exceeds the preset threshold.

This concludes the operation (step 2530).

Figure 26:
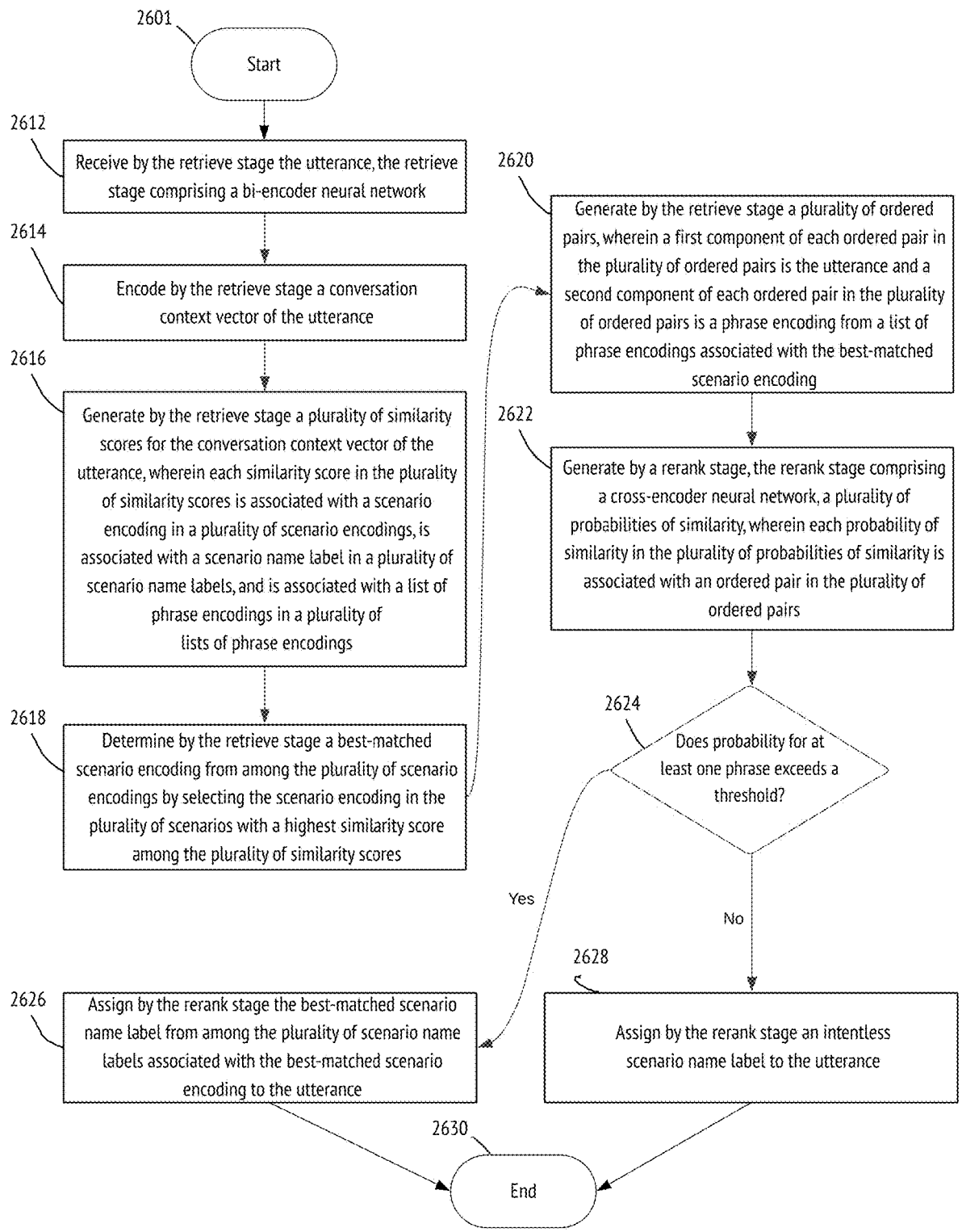
FIG. 26 shows yet another flow diagram detailing the operation of a scenario detection and conversation tag system, in accordance with the examples disclosed herein.

FIG. 26 shows yet another flow diagram detailing the operation of a scenario detection and conversation tag system, in accordance with the examples disclosed herein. In particular, the flow diagram determines a best-matched scenario name label for an utterance during automatic scenario detection in customer-agent conversations.

The operation begins in step 2601.

In step 2612, the system by a retrieve stage the utterance, the retrieve stage comprising a bi-encoder neural network.

In step 2614, the system encodes by the retrieve stage a conversation context vector of the utterance.

In step 2616, the system generates by the retrieve stage a plurality of similarity scores for the conversation context vector of the utterance, wherein each similarity score in the plurality of similarity scores is associated with a scenario encoding in a plurality of scenario encodings, is associated with a scenario name label in a plurality of scenario name labels, and is associated with a list of phrase encodings in a plurality of lists of phrase encodings.

In step 2618, the system determines by the retrieve stage a best-matched scenario encoding from among the plurality of scenario encodings by selecting the scenario encoding in the plurality of scenarios with a highest similarity score among the plurality of similarity scores.

In step 2620, the system generates by the retrieve stage a plurality of ordered pairs, wherein a first component of each ordered pair in the plurality of ordered pairs is the utterance and a second component of each ordered pair in the plurality of ordered pairs is a phrase encoding from a list of phrase encodings associated with the best-matched scenario encoding.

In step 2622, the system generates by a rerank stage, the rerank stage comprising a cross-encoder neural network, a plurality of probabilities of similarity, wherein each probability of similarity in the plurality of probabilities of similarity is associated with an ordered pair in the plurality of ordered pairs.

In step 2624, the system determines by the rerank stage whether at least one probability of similarity in the plurality of probabilities of similarity exceeds a preset threshold.

In step 2626, the system assigns by the rerank stage the best-matched scenario name label from among the plurality of scenario name labels associated with the best-matched scenario encoding to the utterance if at least one probability of similarity in the plurality of probabilities of similarity exceeds a preset threshold.

Finally, in step 2628, the system assigns by the rerank stage an intentless scenario name label to the utterance if no probability of similarity in the plurality of probabilities of similarity exceeds the preset threshold.

This concludes the operation (step 2630).

Figure 27:
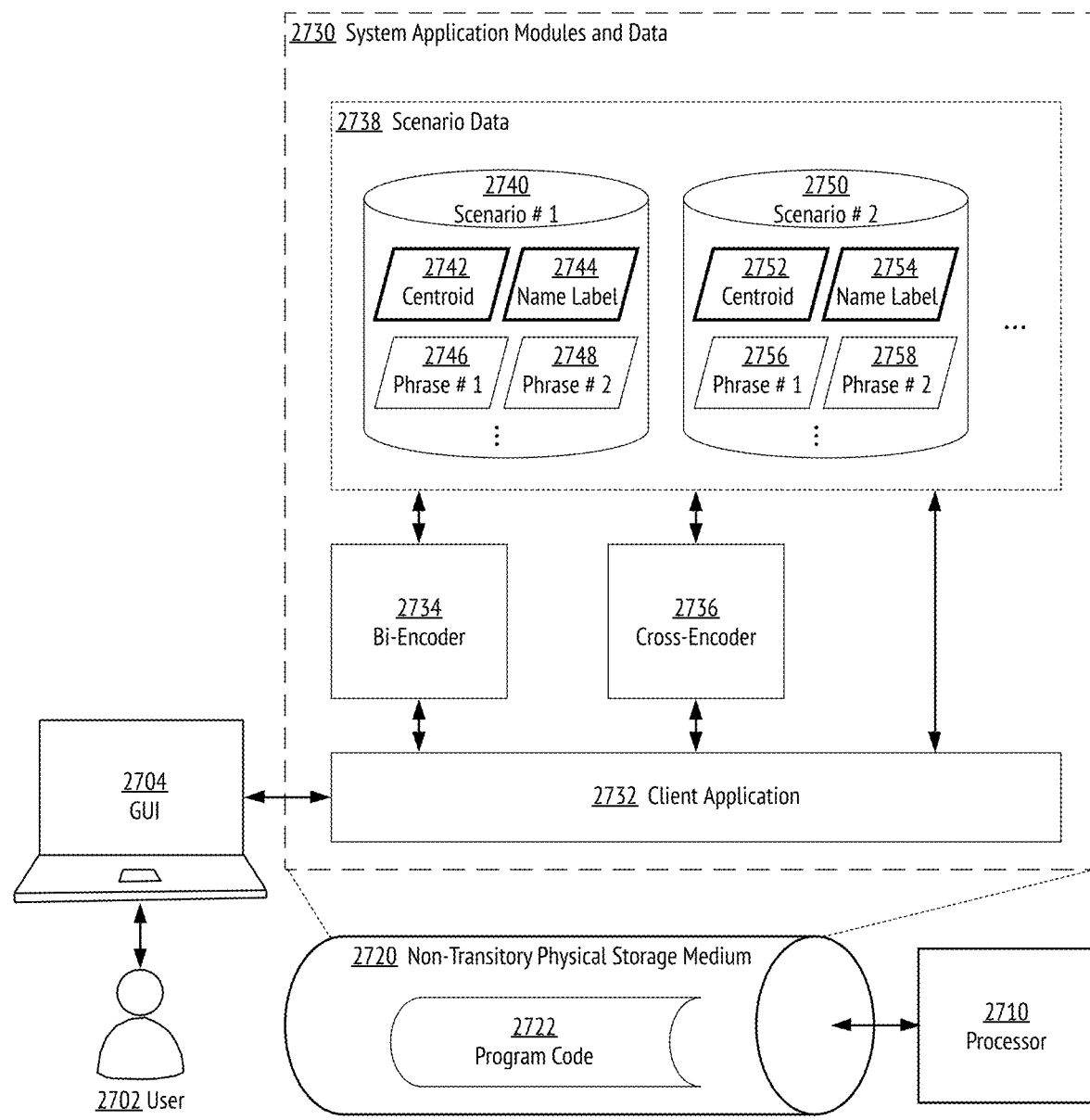
FIG. 27 shows a system diagram illustrating a scenario detection and conversation tag system, in accordance with the examples disclosed herein.

FIG. 27 shows a system diagram illustrating a scenario detection and conversation tag system, in accordance with the examples disclosed herein. The system includes access to at least one hardware processor 2710 responsible for executing program code 2722 to implement the modules 2730 described below. The system includes access to at least one non-transitory physical storage medium 2720, accessible by the at least one hardware processor 2710, which stores the program code 2722 that is executable by the hardware processor 2710. The program code may be stored and distributed among two or more non-transitory physical storage media, and may be executed by two or more processors. The system may further include a Graphical User Interface (GUI) 2704 allowing a user 2702 (e.g., a client or an agent) to interact with the system modules 2730.

In various embodiments, the scenario detection and conversation tag system may incorporate the modules and databases described in the present disclosure, including:

a client application 2732 for coordinating the scenario detection and conversation tag system and for running the various methods described herein, a bi-encoder ML model 2734 trained to generate embedding or context vectors from sentences, as further detailed in the present disclosure, a cross-encoder ML model 2736 trained to compare embedding and/or context vectors, as further detailed in the present disclosure, a scenario database 2738, including data associated with one or more scenarios (e.g., 2740, 2750). For any given scenario, the scenario data 2738 includes one centroid embedding vector, one name label, as well as a number of phrase embedding vectors related to that scenario. For example, for scenario #1 (2740), FIG. 27 shows centroid embedding vector 2742, name label 2744, and phrase embedding vectors 2746, 2748, etc., and for scenario #2 (2750), FIG. 27 shows centroid embedding vector 2752, name label 2754, and phrase embedding vectors 2756, 2758, etc.

Graphical User Interface (GUI) Implementation

Figure 28:
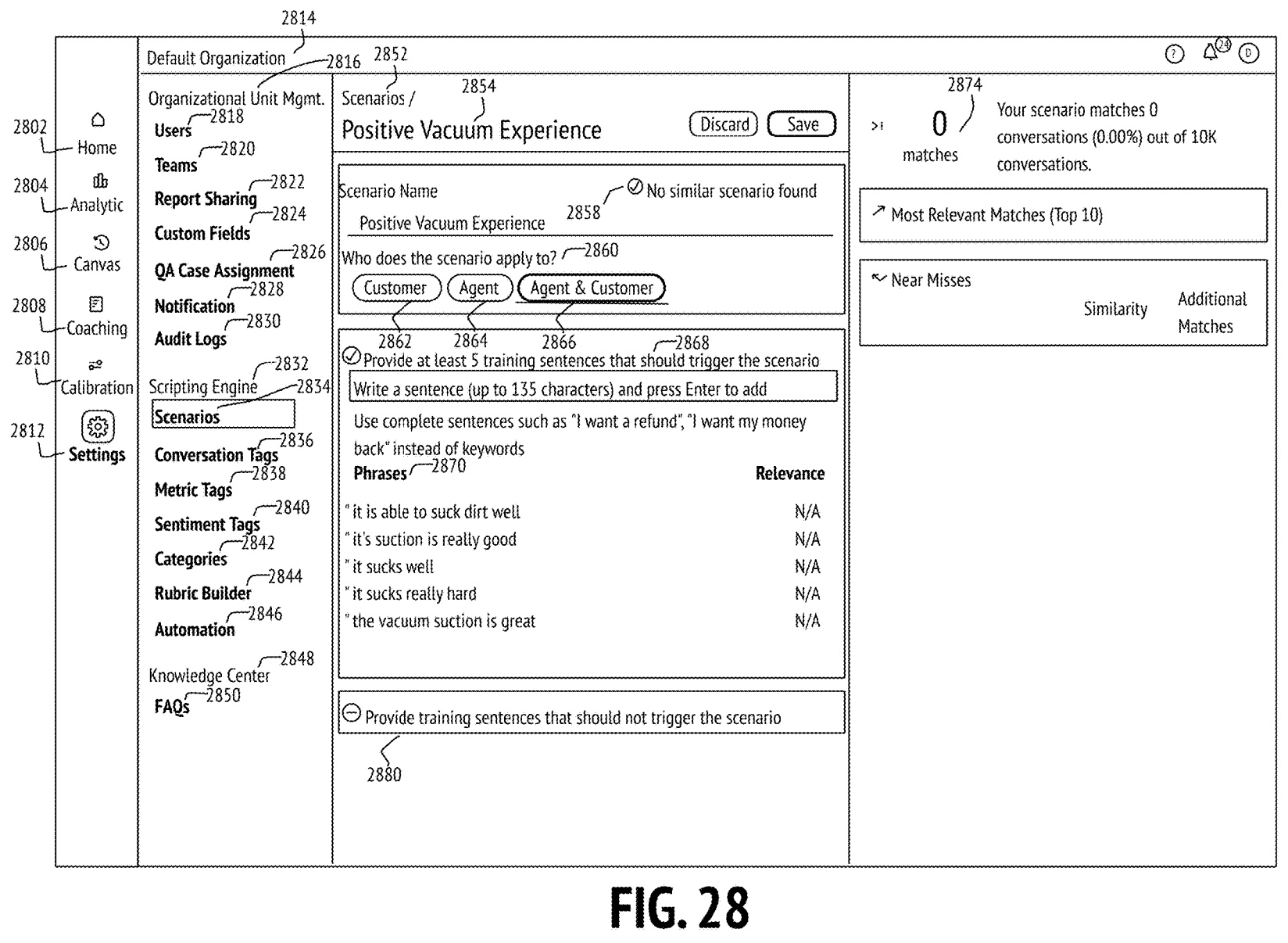

FIG. 28 shows a first example graphical user interface (GUI) as it relates to a scenario detection and conversation tag system, according to exemplary embodiments of the present invention. A default organization 2814 is able to use the GUI to train the scenario detection and conversation tag system. The left-side menu includes options for home 2802, analytics 2804, canvas 2806, coaching 2808, calibration 2810, and settings 2812. Organizational unit management 2816 includes options for users 2818, teams 2820, report sharing 2822, custom fields 2824, QA case assignment 2826, notification 2828, and audit logs 2830. Scripting engine 2832 includes options for scenarios 2834, conversation tags 2836, metric tags 2838, sentiment tags 2840, categories 2842, rubric builder 2844, and automation 2846. Knowledge center 2848 includes option FAQs 2850.

When scenarios 2834 is selected, the scenarios 2852 window allows the user to enter a scenario name, e.g., "positive vacuum experience" 2854 for a vacuum cleaner product. The GUI would indicate "no similar scenario found" 2858 if there are no existing scenarios similar to the one entered. The user then may select 2860 whom the scenario applies to, choosing among just the customer 2862, just the agent 2864, and both the agent and the customer 2866. The user is then prompted 2868 to enter a number (e.g., 5) of training sentences that should trigger the scenario. The entered phrases 2870 are then displayed, e.g., "it is able to suck dirt well." The user may also provide 2880 training sentences that should not trigger the scenario.

The GUI indicates 2874 whether the entered scenario matches any of the accessible stored conversations. In the case shown, there are zero matches.

Figure 29:
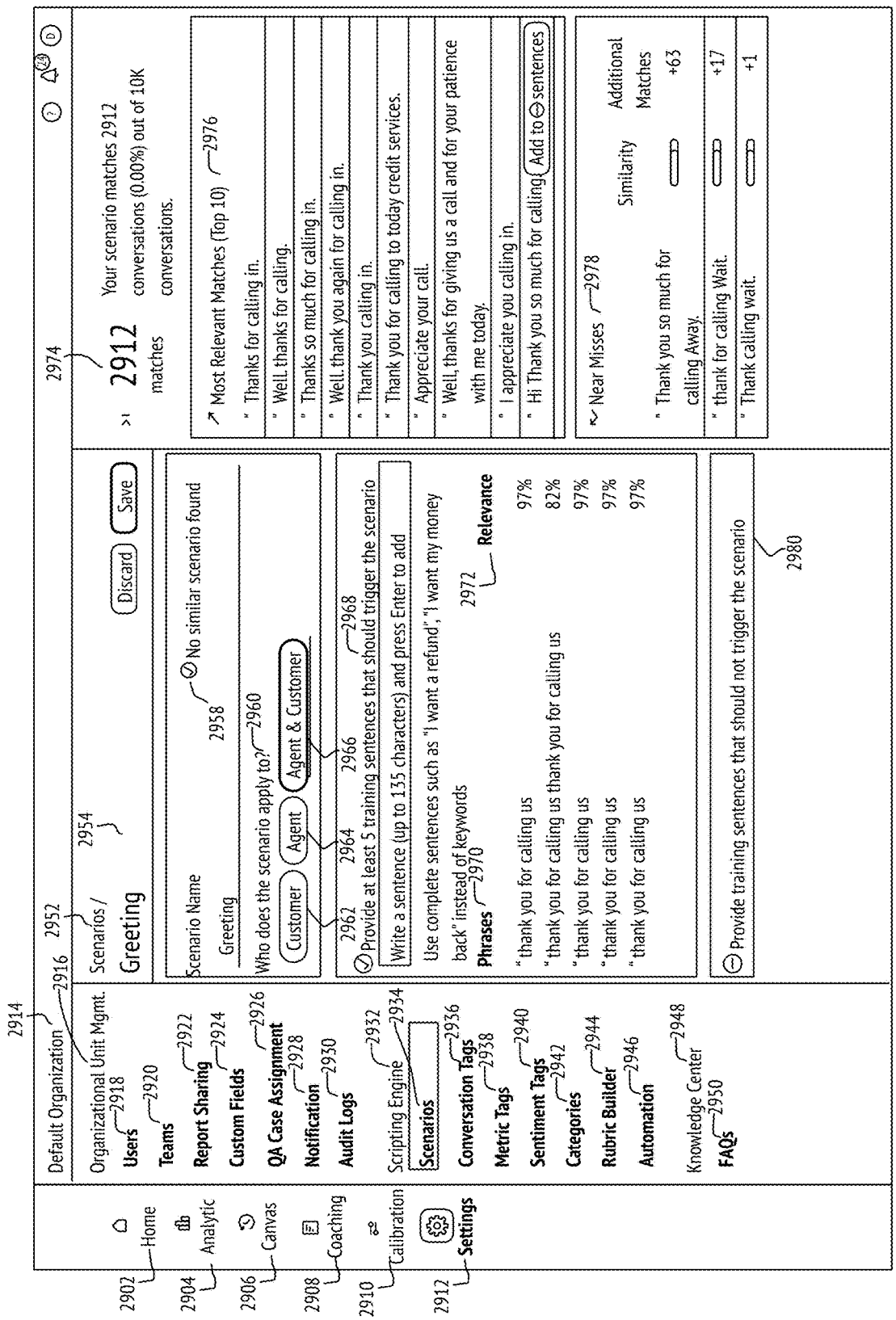
FIG. 29 shows a second example graphical user interface (GUI) as it relates to a scenario detection and conversation tag system, according to exemplary embodiments of the present invention.

FIG. 29 shows a second example graphical user interface (GUI) as it relates to a scenario detection and conversation tag system, according to exemplary embodiments of the present invention. A default organization 2914 is able to use the GUI to train the scenario detection and conversation tag system. The left-side menu includes options for home 2902, analytics 2904, canvas 2906, coaching 2908, calibration 2910, and settings 2912. Organizational unit management 2916 includes options for users 2918, teams 2920, report sharing 2922, custom fields 2924, QA case assignment 2926, notification 2928, and audit logs 2930. Scripting engine 2932 includes options for scenarios 2934, conversation tags 2936, metric tags 2938, sentiment tags 2940, categories 2942, rubric builder 2944, and automation 2946. Knowledge center 2948 includes option FAQs 2950.

When scenarios 2934 is selected, the scenarios 2952 window allows the user to enter a scenario name, e.g., "greeting" 2954 for phrases associated with greetings. The GUI would indicate "no similar scenario found" 2958 if there are no existing scenarios similar to the one entered. The user then may select 2960 whom the scenario applies to, choosing among just the customer 2962, just the agent 2964, and both the agent and the customer 2966. The user is then prompted 2968 to enter a number (e.g., 5) of training sentences that should trigger the scenario. The entered phrases 2970 are then displayed. e.g., "thank you for calling us," with relevance 2972 percentages provided. The user may also provide 2980 training sentences that should not trigger the scenario.

The GUI indicates 2974 whether the entered scenario matches any of the accessible stored conversations. In the case shown, the "greeting" scenario matched 2,912 conversations out of 10,000 conversations. The most relevant (e.g., top 10) matches 2976 are shown, e.g., "thanks for calling in," "well, thanks for calling." A set of near misses 2978 are also displayed, e.g., "thank you so much for calling away."

Figure 30:
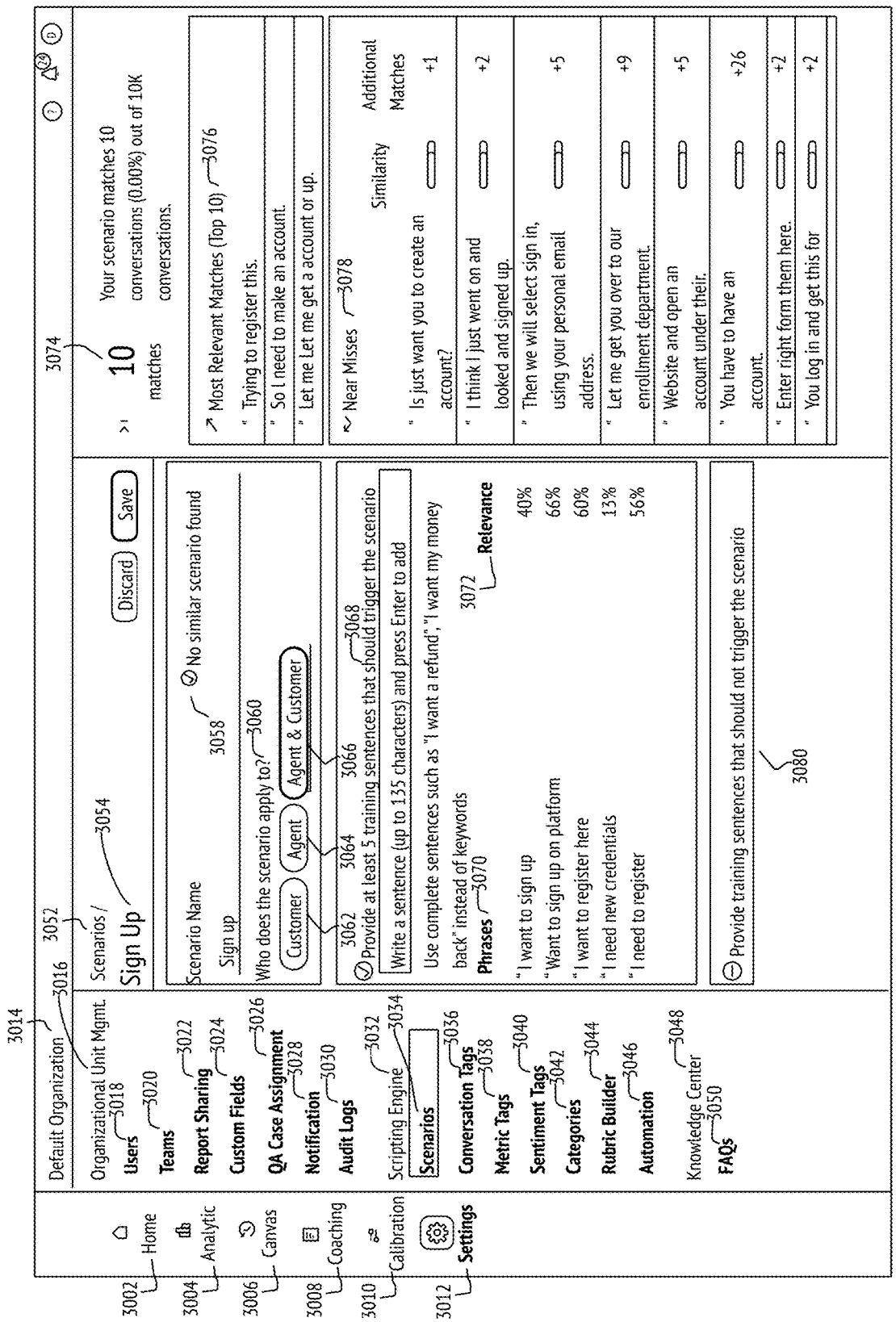
FIG. 30 shows a third example graphical user interface (GUI) as it relates to a scenario detection and conversation tag system, according to exemplary embodiments of the present invention.

FIG. 30 shows a third example graphical user interface (GUI) as it relates to a scenario detection and conversation tag system, according to exemplary embodiments of the present invention. A default organization 3014 is able to use the GUI to train the scenario detection and conversation tag system. The left-side menu includes options for home 3002, analytics 3004, canvas 3006, coaching 3008, calibration 3010, and settings 3012. Organizational unit management 3016 includes options for users 3018, teams 3020, report sharing 3022, custom fields 3024, QA case assignment 3026, notification 3028, and audit logs 3030. Scripting engine 3032 includes options for scenarios 3034, conversation tags 3036, metric tags 3038, sentiment tags 3040, categories 3042, rubric builder 3044, and automation 3046. Knowledge center 3048 includes option FAQs 3050.

When scenarios 3034 is selected, the scenarios 3052 window allows the user to enter a scenario name, e.g., "sign up" 3054 for phrases associated with signing up a new account with the organization. The GUI would indicate "no similar scenario found" 3058 if there are no existing scenarios similar to the one entered. The user then may select 3060 whom the scenario applies to, choosing among just the customer 3062, just the agent 3064, and both the agent and the customer 3066. The user is then prompted 3068 to enter a number (e.g., 5) of training sentences that should trigger the scenario. The entered phrases 3070 are then displayed, e.g., "I want to sign up," with relevance 3072 percentages provided. The user may also provide 3080 training sentences that should not trigger the scenario.

The GUI indicates 3074 whether the entered scenario matches any of the accessible stored conversations. In the case shown, the "sign up" scenario matched 10 conversations out of 10,000 conversations. The most relevant (e.g., top 10) matches 3076 are shown, e.g., "trying to register this," "so I need to make an account." A set of near misses 3078 are also displayed, e.g., "let me get you over to our enrollment department."

Figure 31:
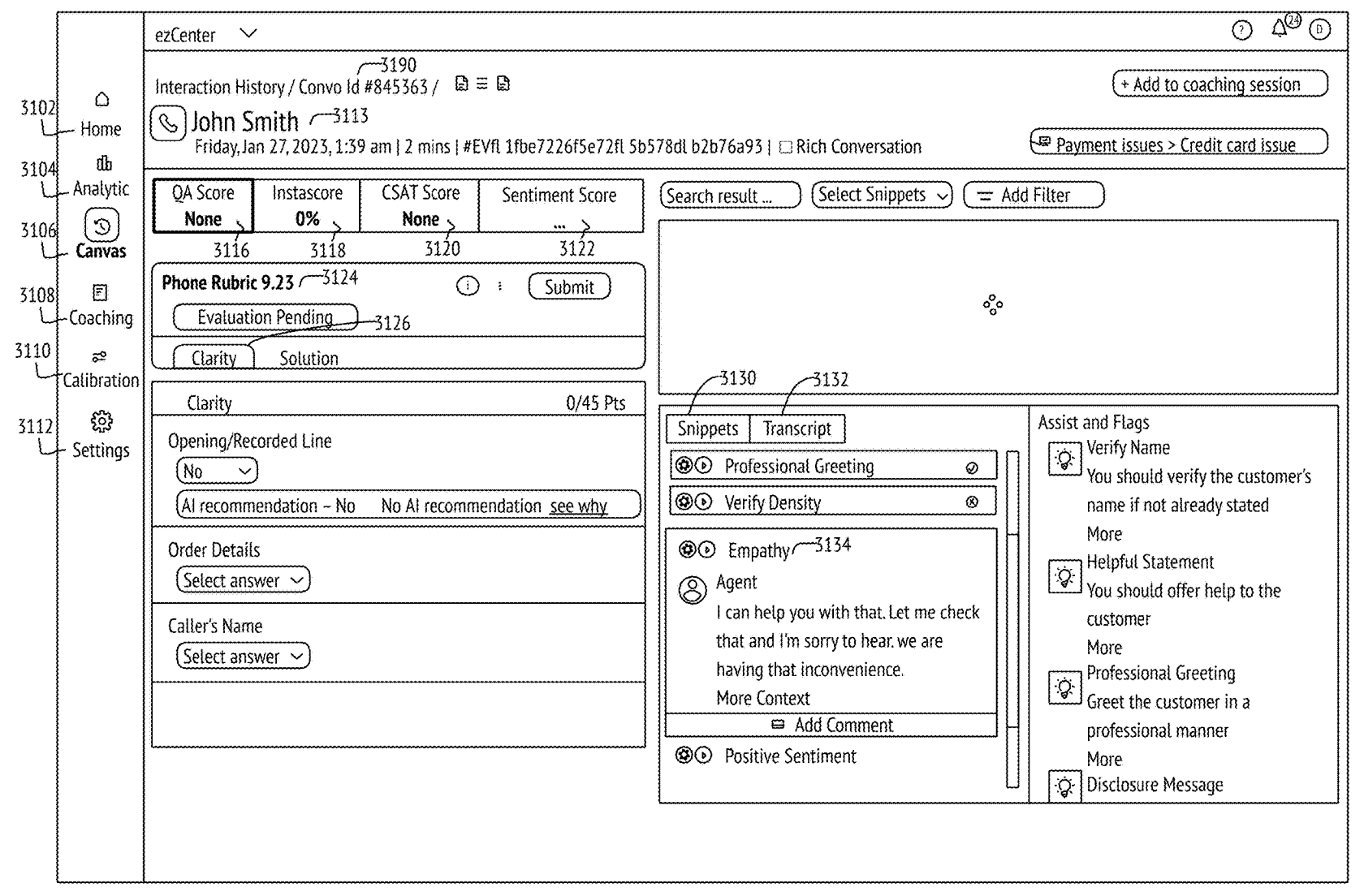

FIG. 31 shows a fourth example graphical user interface (GUI) as it relates to a scenario detection and conversation tag system, according to exemplary embodiments of the present invention. A default organization is able to use the GUI to view the call history and analytics for a selected customer or agent, e.g., John Smith 3113, as analyzed by the scenario detection and conversation tag system, as well as information and analytics for a particular conversation as indicated by a "convo ID" 3190. The left-side menu includes options for home 3102, analytics 3104, canvas 3106, coaching 3108, calibration 3110, and settings 3112. Various scores regarding the selected customer or agent, e.g., QA score 3116, Instascore 3118, CSAT score 3120, and sentiment score 3122. A phone rubric 3124 is provided.

The user is able to review snippets 3130 and a transcript 3132 of the particular conversation. For example, a particular snippet where the agent says "I can help you with that: let me check that, and I'm sorry to hear" may be tagged as the agent exhibiting "empathy" 3134.

Machine Learning (ML) and Neural Networks

Machine learning (ML) algorithms are characterized by the ability to improve their performance at a task over time without being explicitly programmed with the rules to perform that task (i.e., learn). A machine learning (ML) model is the output generated when a ML algorithm is trained on data. As described herein, embodiments of the present invention use one or more artificial intelligence (AI) and machine learning (ML) algorithms for scenario detection and conversation tag. Various exemplary ML algorithms are within the scope of the present invention. The following description describes illustrative ML techniques for implementing various embodiments of the present invention.

Neural Networks

Figure 32:
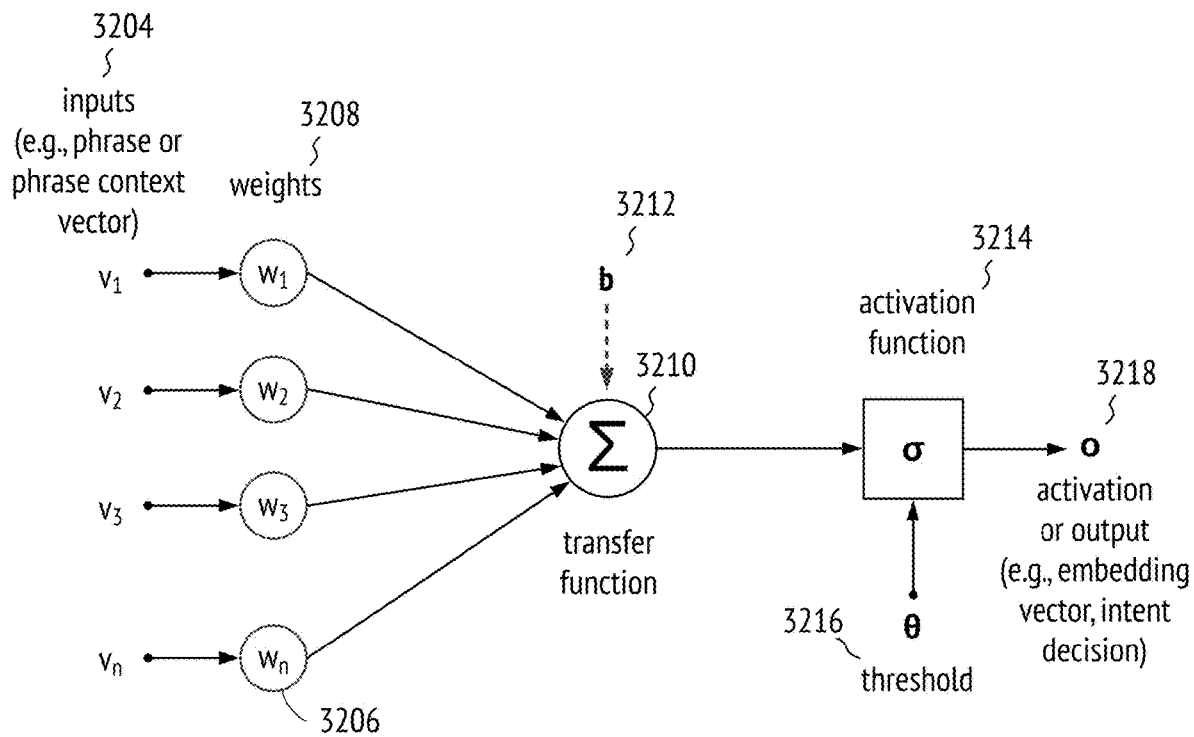
FIG. 32 describes fundamental neural network operation as it relates to a scenario detection and conversation tag system, according to exemplary embodiments of the present invention.

A neural network is a computational model inspired by the structure of the human brain, consisting of interconnected units called neurons that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 32 describes fundamental neural network operation as it relates to a scenario detection and conversation tag system, according to exemplary embodiments of the present invention.

FIG. 32 shows a single-layered neural network, also known as a single-layer perceptron. Such a perceptron is the building block for neural networking layers included in bi-encoder and cross-encoders, according to embodiments of the present invention. The operation of a single-layered neural network involves the following steps:

1. Input: Receiving an input vector v 3204 with elements $v_j$, with $j \in [1, n]$ representing the $j^{th}$ input, and where each element of the vector corresponds to a neuron 3206 in the input layer. In a scenario detection and conversation tag system, the input vector may be the letters, syllables, or words of a phrase, utterance, or sentence. The input vector may also be the elements of a phrase context vector or embedding vector, as described in the present disclosure.
2. Transfer Function: Multiplying each input by a corresponding weight $w_j$ 3208. These weighted inputs are then summed together as the transfer function, yielding the net input to the activation function $\Sigma_{j=1}^{n} v_j \cdot w_j$ 3210.

Each neuron in a neural network may have a bias value 3212, which is added to the weighted sum of the inputs to that neuron. Both the weights and bias values are learned during the training process. The purpose of the bias is to provide every neuron with a trainable constant value that can help the model fit the data better. With biases, the net input to the activation function is $\Sigma_{j=1}^{n} \{v_j \cdot w_j\} + b$.

3. Activation Function: Passing the net input through an activation function 3214. The activation function σ determines the activation value o 3218, which is the output of the neuron. It is typically a non-linear function such as a sigmoid or ReLU (Rectified Linear Unit) function. The threshold θ 3216 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.

4. Output: The activation value o 3218 is the output of the activation function. This value is what gets passed on to the next layer in the network or becomes the final output in the case of the last layer. In a scenario detection and conversation tag system, the final output of the neural network may be an embedding or context vector representing a scenario phrase, or a scenario intent boolean variable.

Figure 33:
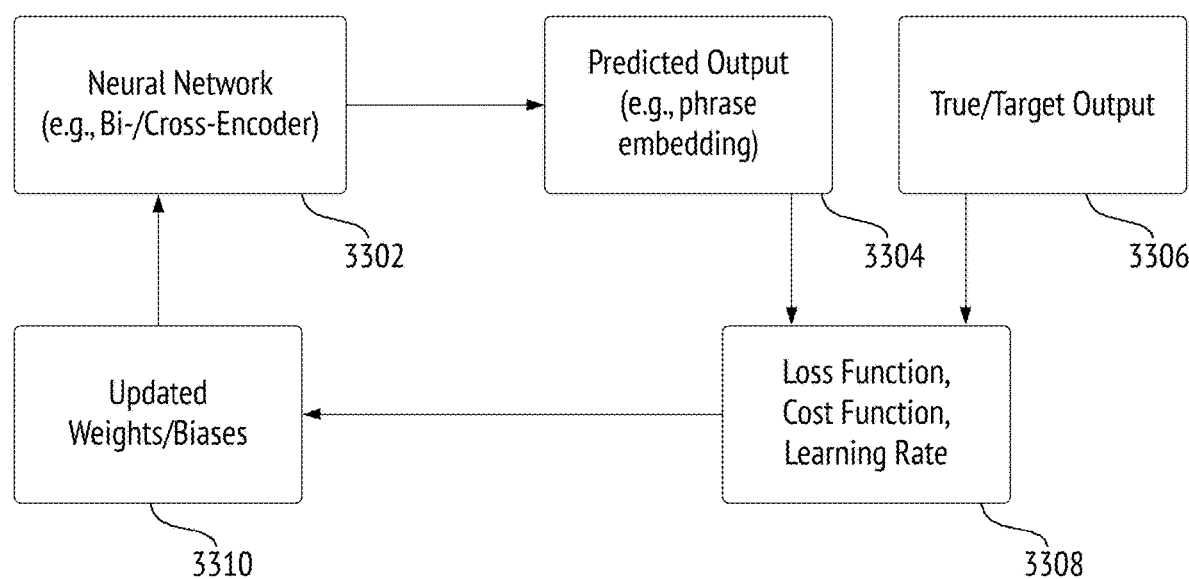
FIG. 33 shows an overview of the neural network training process that can be used in a scenario detection and conversation tag system, according to exemplary embodiments of the present invention.

FIG. 33 shows an overview of the neural network training process that can be used in a scenario detection and conversation tag system, according to exemplary embodiments of the present invention.

In a scenario detection and conversation tag system, the neural network 3302 undergoing the training may be a bi-encoder or a cross-encoder, as described in the present disclosure. The training of a neural network involves repeatedly updating the weights and biases 3310 of the network to minimize the difference between the predicted output 3304 and the true or target output 3306, where the predicted output 3304 is the result produced by the network when a set of inputs from a dataset is passed through it. The true or target output 3306 is the true desired result. The difference between the predicted output and the true output is calculated using a loss function 3308, which quantifies the error made by the network in its predictions. In a scenario detection and conversation tag system, the predicted 3304 and true/target outputs 3306 of the neural network may be an embedding or context vector representing a scenario phrase, or a scenario intent boolean variable.

The loss function is a part of the cost function 3308, which is a measure of how well the network is performing over the whole dataset. The goal of training is to minimize the cost function 3308. This is achieved by iteratively adjusting the weights and biases 3310 of the network in the direction that leads to the steepest descent in the cost function. The size of these adjustments is determined by the learning rate 3308, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 3310 of the network based on the error (e.g., cost function) 3308 of the output. After forward propagation through neural network 3302, the output 3304 of the network is compared with true output 3306, and the error 3308 is calculated. This error is then propagated back through the network, starting from the output layer and moving towards the input layer. The weights and biases 3310 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

Figure 34:
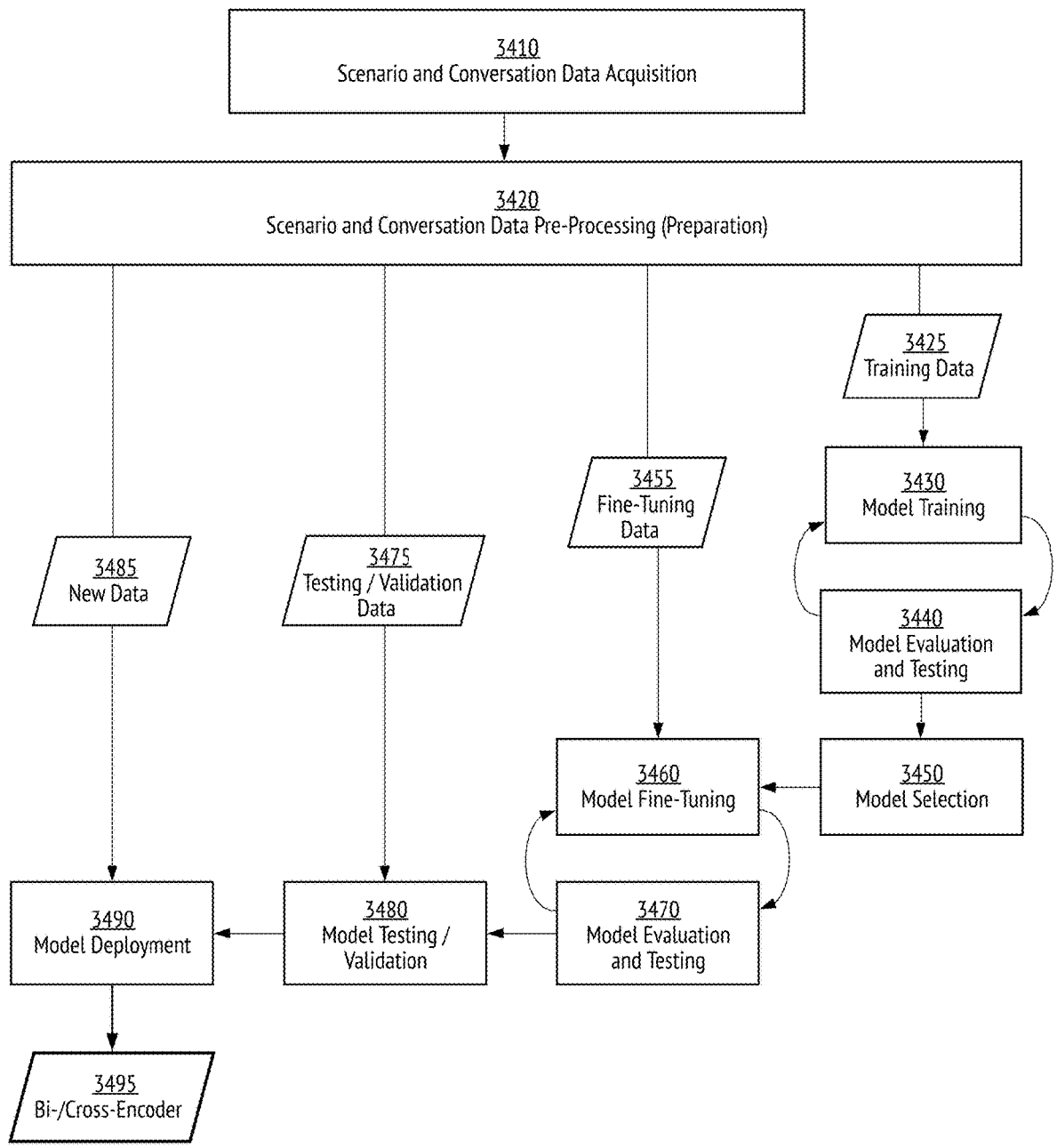
FIG. 34 is an illustrative flow diagram showing the different phases and datasets involved in training a machine learning algorithm for a scenario detection and conversation tag system, according to exemplary embodiments of the present invention.

FIG. 34 provides additional details on the training process, according to exemplary embodiments of the present invention.

Transformer Model Architecture

The transformer architecture, as used by the bi-encoder and cross-encoder described in FIGS. 4-7, is a neural network design that was introduced in the paper "Attention is All You Need" by Vaswani et al. (available at arxiv.org/abs/1706.03762) published in June 2017, and incorporated herein by reference as if fully set forth herein. Large Language Models (LLMs) heavily rely on the transformer architecture.

The architecture (see FIG. 1 of the referenced paper) is based on the concept of "attention," allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens." This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space) to an embeddings space. This process, referred to as "encoding," transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding." Therefore, the training of a neural network and its evaluation (i.e., its use upon deployment) both occur within the embeddings space.

In the remainder of this document, the processes of tokenization, encoding, decoding, and detokenization are assumed. In other words, the processes described below occur in the "embeddings space." Hence, while the tokenization and encoding of training data and input prompts may not be represented or discussed explicitly, they are implied. Similarly, the decoding and detokenization of neural network outputs is also implied.

Training and Fine-Tuning Machine Learning (ML) Modules

FIG. 34 is an illustrative flow diagram showing the different phases and datasets involved in training a machine learning algorithm for a scenario detection and conversation tag system, according to exemplary embodiments of the present invention.

The training process begins at step 3410 with the acquisition, retrieval, assimilation, or generation of scenario and conversation data. At step 3420, acquired data are pre-processed, or prepared. At step 3430, the ML model (e.g., bi-encoder or cross-encoder) is trained using training data 3425. At step 3440, the ML model is evaluated, validated, and tested, and further refinements to the ML model are fed back into step 3430 for additional training. Once its performance is acceptable, at step 3450, optimal model parameters are selected.

Training data 3425 is a documented data set containing multiple instances of system inputs and correct outcomes. It trains the ML model to optimize the performance for a specific target task. In FIG. 34, training data 3425 may also include subsets for validating and testing the ML model, as part of the training iterations 3430 and 3440. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 2825 may be expanded via an augmentation process.

In some embodiments, an additional fine-tuning 3460 phase including iterative fine-tuning 3460 and evaluation, validation, and testing 3470 steps, is carried out using fine-tuning data 3455. Fine-tuning in machine learning is a process that involves taking a selected 3450 pre-trained model and further adjusting or "tuning" its parameters to better suit a specific task or fine-tuning dataset 3455. This technique is particularly useful when dealing with deep learning models that have been trained on large, general training datasets 3425 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 3425, such as ImageNet for image recognition tasks. The model's existing weights, which have been learned from the original training, serve as the starting point. During fine-tuning, the model is trained further on a new fine-tuning dataset 3455, which may contain different classes or types of data than the original training set. This additional training phase allows the model to adjust its weights to better capture the characteristics of the new fine-tuning dataset 3455, thereby improving its performance on the specific task it is being fine-tuned for.

In some embodiments, additional test and validation 3480 phases are carried out using test and validation data 3475. Testing and validation of a ML model both refer to the process of evaluating the model's performance on a separate dataset 3475 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the model is trained 3430, selected 3450, and optionally fine-tuned 3460 and validated/tested 3480, it is deployed 3490. Deployed ML models such as the bi-encoder and cross-encoder 3495 usually receive new data 3485 that was pre-processed 3420.

In machine learning, data pre-processing 3420 is tailored to the phase of model development. During model training 3430, pre-processing involves cleaning, normalizing, and transforming raw data into a format suitable for learning patterns. For fine-tuning 3460, pre-processing adapts the data to align with the distribution of the specific targeted task, ensuring the pre-trained model can effectively transfer its knowledge. Validation 3480 pre-processing mirrors that of training to accurately assess model generalization without leakage of information from the training set. Finally, in deployment (3490 and 3495), pre-processing ensures real-world data matches the trained model's expectations, often involving dynamic adjustments to maintain consistency with the training and validation stages.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "*Understanding Large Language Models–A Transformative Reading List*," by S. Raschka (posted Feb. 7, 2023, available at sebastianraschka-.com/blog/2023/llm-reading-list.html), describes various LLM architectures that are within the scope of the methods and systems described herein, and is hereby incorporated by reference in its entirety herein as if fully set forth herein.

The input to each of the listed ML modules is a feature vector comprising the input data described above for each ML module. The output of the ML module is a feature vector comprising the corresponding output data described above for each ML module.

Prior to deployment, each of the ML modules listed above may be trained on one or more respective sample input datasets and on one or more corresponding sample output datasets. The input and output training datasets may be generated from a database containing a history of input instances and output instances, or may be generated synthetically by subject matter experts.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be in direct or indirect communication with, for example, one another over the same or different wired or wireless networks.

Figure 35:
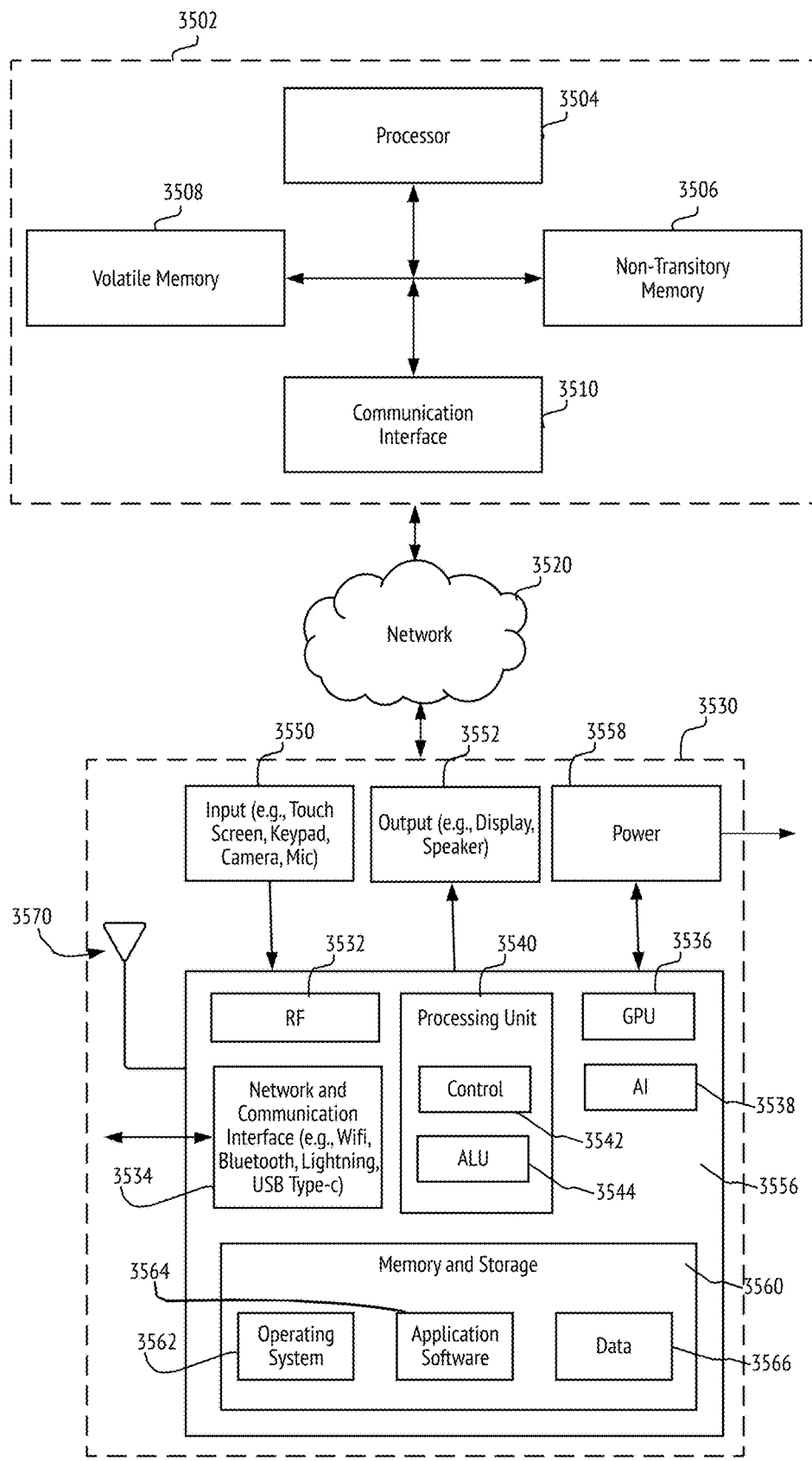
FIG. 35 provides illustrative schematics of a server (management computing entity) and a client (user computing entity) used for a scenario detection and conversation tag system, according to some embodiments of the present invention.

FIG. 35 provides illustrative schematics of a server (management computing entity) 3502 connected via a network 3520 to a client (user computing entity) 3530 used for communication within a scenario detection and conversation tag system, according to some embodiments of the present invention. While FIG. 35 illustrates the various system entities as separate, standalone entities, the various embodiments are not limited to this particular architecture. Additionally, the terms "client device," "client computing entity," "edge device," and "edge computing system" are equivalent and are used interchangeably herein.

Exemplary Management Computing Entity

FIG. 35 provides a schematic of a server (management computing entity, 3502) according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity (3502) may also include one or more communications interfaces (3510) for communicating with various computing entities, such as by communicating data, content, and/or information (similar terms used herein interchangeably) that can be transmitted, received, operated on, processed, displayed, stored, and/or the like.

As shown in FIG. 35, in one embodiment, the management computing entity (3502) may include or be in communication with one or more processors (i.e., processing elements, 3504, also referred to as processors and/or processing circuitry, and similar terms used herein interchangeably) that communicate with other elements within the management computing entity (3502) via a bus, for example. As will be understood, the processor (3504) may be embodied in a number of different ways. For example, the processor (3504) may be embodied as one or more complex programmable logic devices (CPLDs), microprocessors, multi-core processors, co-processing entities, application-specific instruction-set processors (ASIPs), microcontrollers, and/or controllers. Further, the processor (3504) may be embodied as one or more other processing devices or circuitry. The term circuitry may refer to an entire hardware embodiment or a combination of hardware and computer program products. Thus, the processor (3504) may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processor (3504) may be configured for a particular use or configured to execute instructions stored in volatile or non-volatile (or non-transitory) media or otherwise accessible to the processor (3504). As such, whether configured by hardware or computer program products, or by a combination thereof, the processor (3504) may be capable of performing steps or operations according to embodiments of the present disclosure when configured accordingly.

In one embodiment, the management computing entity (3502) may further include or be in communication with non-transitory memory (also referred to as non-volatile media, non-volatile storage, non-transitory storage, memory, memory storage, and/or memory circuitry-similar terms used herein interchangeably). In one embodiment, the non-transitory memory or storage may include one or more non-transitory memory or storage media (3506), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity (3502) may further include or be in communication with volatile media (also referred to as volatile storage, memory, memory storage, memory and/or circuitry-similar terms used herein interchangeably). In one embodiment, the volatile storage or memory may also include one or more volatile storage or memory media 3508, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor (3504). Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity (3502) with the assistance of the processor (3504) and operating system.

As indicated, in one embodiment, the management computing entity (3502) may also include one or more communications interfaces (3510) for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity (3502) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity (3502) may include or be in communication with one or more input elements, such as a keyboard input, a mouse input, a touch screen/display input, motion input, movement input, audio input, pointing device input, joystick input, keypad input, and/or the like. The management computing entity (3502) may also include or be in communication with one or more output elements (not shown), such as audio output, video output, screen/display output, motion output, movement output, and/or the like.

As will be appreciated, one or more of the components of the management computing entity (3502) may be located remotely from other management computing entity (3502) components, such as in a distributed system. Furthermore, one or more of the components may be combined and additional components performing functions described herein may be included in the management computing entity (3502). Thus, the management computing entity (3502) can be adapted to accommodate a variety of needs and circumstances. As will be recognized, these architectures and descriptions are provided for exemplary purposes only and are not limited to the various embodiments.

Exemplary User Computing Entity

A user may be a human individual, a company, an organization, an entity, a department within an organization, a representative of an organization and/or person, an artificial users such as algorithms, artificial intelligence, or other software that interfaces, and/or the like. FIG. 35 further provides an illustrative schematic representation of a client user computing entity 3530 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities can be operated by various parties. Such functions, operations, and/or processes may include, for example, transmitting, receiving, retrieving, operating on, crawling, extracting, processing, displaying, storing, determining, creating, generating, generating for display, monitoring, evaluating, comparing, and/or similar terms used herein interchangeably. In various embodiments, these functions, operations, and/or processes can be performed on machine-readable or human-readable data, content, information, and/or similar terms used herein interchangeably. Furthermore, in embodiments of the present invention, computing device 3530 may be a general-purpose computing device with dedicated graphical processing unit (GPU) 3536 and artificial intelligence 3538 modules. In some embodiments, computing device 3530 may be built over a backplane 3556 connected to a power source 3558. It may alternatively be implemented in the cloud, with logically and/or physically distributed architectures.

As shown in FIG. 35, user computing entity 3530 may include an antenna 3570, a radio frequency (RF) transceiver 3532, and a processor unit 3540 that provides signals to and receives signals from the transceiver. The signals provided to and received from the transceiver may include signaling information in accordance with air interface standards of applicable wireless systems. In this regard, the user computing entity (3530) may be capable of operating with one or more air interface standards, communication protocols, modulation types, and access types. More particularly, user computing entity 3530 may operate in accordance with any of a number of wireless communication standards and protocols, such as those described above with regard to management computing entity 3502. In a particular embodiment, user computing entity 3530 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, user computing entity 3530 may operate in accordance with multiple wired communication standards and protocols, such as those described above with regard to management computing entity 3502, via its own network and communications interface 3534.

Via these communication standards and protocols, user computing entity 3530 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 3530 can also download changes, add-ons, and updates, for instance, to its firmware, software (e.g., including executable instructions, applications, program modules), and operating system.

In some implementations, processing unit 3540 may be embodied in several different ways. For example, processing unit 3540 may be embodied as one or more complex programmable logic devices (CPLDs), microprocessors, multi-core processors, co-processing entities, application-specific instruction-set processors (ASIPs), microcontrollers, and/or controllers. Further, processing unit 3540 may be embodied as one or more other processing devices or circuitry. The term circuitry may refer to an entirely hardware embodiment or a combination of hardware and computer program products. Thus, processing unit 3540 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 3540 may be configured for a particular use or configured to execute instructions stored in volatile or non-volatile media or otherwise accessible to the processing unit. As such, whether configured by hardware or computer program products, or by a combination thereof, processing unit 3540 may be capable of performing steps or operations according to embodiments of the present invention when configured accordingly.

In some embodiments, processing unit 3540 may comprise a control unit 3542 and a dedicated arithmetic logic unit (ALU) 3544 to perform arithmetic and logic operations. In some embodiments, user computing entity 3530 may comprise a graphics processing unit (GPU) 3546 for specialized parallel processing tasks, and/or an artificial intelligence (AI) module or accelerator 3548, also specialized for applications including artificial neural networks and machine learning. In some embodiments, processing unit 3540 may be coupled with GPU 3546 and/or AI accelerator 3548 to distribute and coordinate processing tasks.

In some embodiments, computing entity 3530 may include a user interface, comprising an input interface 3550 and an output interface 3552, each coupled to processing unit 3540. User input interface 3550 may comprise any of a number of devices or interfaces allowing computing entity 3530 to receive data, such as a keypad (hard or soft), a touch display, a mic for voice/speech, and a camera for motion or posture interfaces. User output interface 3552 may comprise any of a number of devices or interfaces allowing computing entity 3530 to provide information to a user, such as through the touch display, or a speaker for audio outputs. In some embodiments, output interface 3552 may connect computing entity 3530 to an external loudspeaker or projector, for audio or visual output. In some embodiments, user interfaces 3550 and 3552 integrate multimodal data, and cater to both humans and bots/algorithms. Some examples of human interfaces include a dashboard-style interface, a workflow-based interface, conversational interfaces, and spatial-computer interfaces. Some examples of bot/algorithmic interfaces include code interfaces, text-based API interfaces, and the like.

User computing entity 3530 can also include volatile and/or non-volatile storage or memory 3560, which can be embedded and/or may be removable. For example, the non-volatile or non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory can store an operating system 3562, application software 3564, data 3566, databases, database instances, database management systems, data, applications, programs, program modules, scripts, source code, object code, byte code, compiled code, interpreted code, machine code, executable instructions, and/or the like to implement the functions of the user computing entity (3530). As indicated, this may include a user application that is resident on the entity or accessible through a browser or other user interface for communicating with the management computing entity (3502) and/or various other computing entities.

In some embodiments, user computing entity 3530 may include one or more components or functionality that are the same or similar to those of management computing entity 3502, as described in greater detail above. As will be recognized, these architectures and descriptions are provided for exemplary purposes only and are not limited to the various embodiments.

In some embodiments, computing entities 3510 and/or 3530 may communicate to external devices like other computing devices and/or access points to receive information such as software or firmware, or to send information from the memory of the computing entity to external systems or devices such as servers, computers, smartphones, and the like.

In some embodiments, two or more computing entities such as 3510 and/or 3530 may establish connections using a network such as 3520 utilizing any of the networking protocols listed previously. In some embodiments, the computing entities may use network interfaces such as 3510 and 3534 to communicate with each other, such as by communicating data, content, information, and/or similar terms used herein interchangeably that can be transmitted, received, operated on, processed, displayed, stored, and/or the like.

In some embodiments of the present invention, the entire system may be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

Additional Hardware & Software Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

Conclusions

One of ordinary skill in the art knows that the use cases, structures, schematics, flow diagrams, and steps may be performed in any order or sub-combination, while the inventive concept of the present invention remains without departing from the broader scope of the invention. Every embodiment may be unique, and step(s) of method(s) may be either shortened or lengthened, overlapped with other activities, postponed, delayed, and/or continued after a time gap, such that every active user and running application program is accommodated by the server(s) to practice the methods of the present invention.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter. In addition, those skilled in the art will understand and appreciate that the methods could alternatively be represented as a series of interrelated states via a state diagram or events or their equivalent.

As used herein, the singular forms "a," "an," and "the" include plural references unless the context clearly indicates otherwise. Thus, for example, reference to "a cable" includes a single cable as well as a bundle of two or more different cables, and the like. The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes parameters, etc., to provide a thorough understanding of the present invention. The particular features, structures, materials, or characteristics may be combined in any suitable manner in one or more embodiments. The words "example," "exemplary," "illustrative" and the like, are used herein to mean serving as an example, instance, or illustration. Any aspect or design described herein as "example" or equivalents are not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or." That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number +/−10%, such that "about 10" would include from 9 to 11. In other exemplary embodiments, the term "about" may include the recited number +/−X %, where X is considered the normal variation in said measurement by one of ordinary skill in the art.

Features that are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom. Features of the transitory physical storage medium described may be incorporated into/used in a corresponding method and/or system, and vice versa.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention, as defined by the claims.

What is claimed is:

1. A computer-implemented method for generating a recording of a customer-agent interaction and redacting the customer-agent interaction using a customer relationship management (CRM) system, the method comprising:

triggering the recording of the customer-agent interaction by automatic scenario detection of an interaction beginning scenario using a semantic similarity based configurable system, wherein the automatic scenario detection of the interaction beginning scenario using the semantic similarity based configurable system for triggering the recording of the customer-agent interaction comprises:

receiving, by a retrieve stage, a plurality of interaction beginning scenarios and a plurality of lists of interaction beginning sample phrases, wherein each interaction beginning scenario of the plurality of interaction beginning scenarios is associated with a list of interaction beginning sample phrases;

encoding, by the retrieve stage, each interaction beginning sample phrase in the plurality of lists of interaction beginning sample phrases into phrase encodings;

receiving, by the retrieve stage, an utterance, wherein the utterance comprises a portion of the customer-agent interaction being currently recorded;

encoding, by the retrieve stage, the utterance, to generate an encoding of the utterance;

determining, by the retrieve stage, a plurality of first similarity scores for the encoding of the utterance, wherein each first similarity score of the plurality of first similarity scores is associated with an interaction beginning scenario of the plurality of interaction beginning scenarios;

determining, by the retrieve stage, a highest first similarity score among the plurality of first similarity scores;

determining, by the retrieve stage, a no interaction beginning scenario if the highest first similarity score is below a first preset threshold;

determining, by the retrieve stage, the interaction beginning scenario from the plurality of interaction beginning scenarios associated with the utterance, if the highest first similarity score is not below a first preset threshold, wherein the interaction beginning scenario is associated with the highest first similarity score of the plurality of first similarity scores indicating a beginning of the customer-agent interaction;

processing, by a rerank stage, the interaction beginning scenario, if the highest first similarity score is not below the first preset threshold, wherein the processing by the rerank stage, of the interaction beginning scenario, comprises:

determining, by the rerank stage, a plurality of second similarity scores for the encoding of the utterance and the interaction beginning scenario, wherein each second similarity score of the plurality of second similarity scores is associated with the list of interaction beginning sample phrases associated with the interaction beginning scenario;

determining, by the rerank stage, a no interaction beginning scenario if none of the second similarity scores among the plurality of second similarity scores exceeds a second preset threshold; and generating, by the rerank stage, an interaction beginning label of the interaction beginning scenario if at least one of the second similarity scores among the plurality of second similarity scores exceeds the second preset threshold;

starting a recording of the customer-agent interaction;
sending a record command to a recorder application;
recording the customer-agent interaction to generate a recorded interaction file,
  wherein the recorded interaction file comprises a video recording of the customer-agent interaction;
triggering a halting of the recording of the customer-agent interaction by automatic scenario detection of an interaction ending scenario using the semantic similarity based configurable system;
halting the recording of the customer-agent interaction;
analyzing the recorded interaction file by identifying a first plurality of portions of the recorded interaction file to be redacted by a rule-based redaction matching model comprising a trained neural network, and by identifying a second plurality of portions of the recorded interaction file to be redacted by automatic scenario detection of sensitive scenarios using the semantic similarity based configurable system;
redacting the recorded interaction file by removing the first plurality of portions of the recorded interaction file to be redacted and the second plurality of portions of the recorded interaction file to be redacted to generate a redacted recording file;
generating a non-skip playlist comprising a plurality of non-skip ranges using a computer-vision based algorithm;
generating a smart screen metadata by utilizing a trained supervised neural network; and
storing the redacted recording file, the non-skip playlist, and the smart screen metadata into a database.

2. The computer-implemented method of claim 1, wherein the smart screen metadata comprises timeline snippets comprising a plurality of time ranges in the customer-agent interaction based on the plurality of non-skip ranges.

3. The computer-implemented method of claim 1, wherein the smart screen metadata comprises a resolution metadata, and wherein the resolution metadata is determined from natural language processing applied to the redacted recording file.

4. The computer-implemented method of claim 3, wherein the smart screen metadata further comprises a quality assurance metadata, and wherein the quality assurance metadata is based on the resolution metadata.

5. The computer-implemented method of claim 1, wherein the rule-based redaction matching model comprising the trained neural network is trained on simulated data sets.

6. The computer-implemented method of claim 1, wherein the computer-vision based algorithm analyzes the redacted recording file in a context of frame detection and screen recording to generate a dynamic ranging to generate the non-skip playlist, and wherein the dynamic ranging is configured to provide dynamic grouping and dynamic thresholding.

7. The computer-implemented method of claim 1, wherein the trained supervised neural network uses optical character reading (OCR) to generate the smart screen metadata, and wherein the OCR comprises OCR detection and OCR recognition.

8. The computer-implemented method of claim 1, wherein the utterance is a first utterance, and wherein the automatic scenario detection using the semantic similarity based configurable system for identifying the plurality of portions of the recorded interaction file to be redacted comprises:

receiving, by a retrieve stage, a plurality of sensitive scenarios and a plurality of lists of sensitive sample phrases, wherein each sensitive scenario of the plurality of sensitive scenarios is associated with a list of sensitive sample phrases;

encoding, by the retrieve stage, each sensitive sample phrase in the plurality of lists of sensitive sample phrases into phrase encodings;

receiving, by the retrieve stage, a second utterance, wherein the second utterance comprises a portion of the customer-agent interaction being currently analyzed;

encoding, by the retrieve stage, an encoding of the second utterance;

determining, by the retrieve stage, a plurality of third similarity scores for the encoding of the second utterance, wherein each third similarity score of the plurality of third similarity scores is associated with a sensitive scenario of the plurality of sensitive scenarios;

determining a highest third similarity score among the plurality of third similarity scores;

determining a no sensitive scenario if the highest third similarity score is below a third preset threshold;

determining a sensitive scenario from the plurality of sensitive scenarios associated with the second utterance, wherein the sensitive scenario is associated with the highest third similarity score of the plurality of third similarity scores;

determining, by a rerank stage, a plurality of fourth similarity scores for the encoding of the second utterance and the sensitive scenario, wherein each fourth similarity score of the plurality of fourth similarity scores is associated with the list of sensitive sample phrases associated with the sensitive scenario;

determining, by the rerank stage, a no sensitive scenario if none of the fourth similarity scores among the plurality of fourth similarity scores exceeds a fourth preset threshold; and generating, by the rerank stage, a sensitive label of the sensitive scenario if at least one of the fourth similarity scores among the plurality of fourth similarity scores exceeds the fourth preset threshold.

9. The computer-implemented method of claim 1, wherein the utterance is a first utterance, and wherein the automatic scenario detection using the semantic similarity based configurable system for triggering the halting of the recording of the customer-agent interaction comprises:

receiving, by a retrieve stage, a plurality of interaction ending scenarios and a plurality of lists of interaction ending sample phrases, wherein each interaction ending scenario of the plurality of interaction ending scenarios is associated with a list of interaction ending sample phrases;

encoding, by the retrieve stage, each interaction ending sample phrase in the plurality of lists of interaction ending sample phrases into phrase encodings;

receiving, by the retrieve stage, a second utterance;

encoding, by the retrieve stage, an encoding of the second utterance, wherein the second utterance comprises a portion of the customer-agent interaction being currently analyzed;

determining, by the retrieve stage, a plurality of third similarity scores for the encoding of the second utterance, wherein each third similarity score of the plurality of third similarity scores is associated with an interaction ending scenario of the plurality of interaction ending scenarios;

determining a highest third similarity score among the plurality of third similarity scores;

determining a no interaction ending scenario if the highest third similarity score is below a third preset threshold;

determining an interaction ending scenario from the plurality of interaction ending scenarios associated with the second utterance, wherein the interaction ending scenario is associated with the highest third similarity score of the plurality of third similarity scores;

determining by a rerank stage a plurality of fourth similarity scores for the second utterance and the interaction ending scenario, wherein each fourth similarity score of the plurality of fourth similarity scores is associated with the list of interaction ending sample phrases associated with the interaction ending scenario;

determining by the rerank stage, a no interaction ending scenario if none of the fourth similarity scores among the plurality of fourth similarity scores exceeds a fourth preset threshold; and generating by the rerank stage, an interaction ending label of the interaction ending scenario if at least one of the fourth similarity scores among the plurality of fourth similarity scores exceeds the fourth preset threshold.

10. The computer-implemented method of claim 1, further comprising:
generating an analytics report.

11. The computer-implemented method of claim 1, further comprising:
generating an audit report of the first plurality of portions and the second plurality of portions that were redacted.

12. The computer-implemented method of claim 1, further comprising:
streaming the recording of the customer-agent interaction to a media service.

13. The computer-implemented method of claim 1, further comprising:
streaming the redacted recording file of the customer-agent interaction to a media service.

14. The computer-implemented method of claim 1, wherein analyzing the recorded interaction file is concurrent with recording the customer-agent interaction to generate the recorded interaction file.

15. A non-transitory computer-readable storage medium storing program code, the program code executable by a hardware processor, the program code when executed by the hardware processor causing the hardware processor to execute a computer-implemented method for generating a recording of a customer-agent interaction and redacting the customer-agent interaction using a customer relationship management (CRM) system, the program code comprising code to:

trigger the recording of the customer-agent interaction by automatic scenario detection of an interaction beginning scenario using a semantic similarity based configurable system, wherein the code for automatic scenario detection of the interaction beginning scenario using the semantic similarity based configurable system to trigger the recording of the customer-agent interaction further comprises code to:

receive, by a retrieve stage, a plurality of interaction beginning scenarios and a plurality of lists of interaction beginning sample phrases, wherein each scenario of the plurality of scenarios is associated with a list of interaction beginning sample phrases;

encode, by the retrieve stage, each interaction beginning sample phrase in the plurality of lists of interaction beginning sample phrases into phrase encodings;

receive, by the retrieve stage, an utterance, wherein the utterance comprises a portion of the customer-agent interaction being currently recorded;

encode, by the retrieve stage, the utterance, to generate an encoding of the utterance;

determine, by the retrieve stage, a plurality of first similarity scores for the encoding of the utterance, wherein each first similarity score of the plurality of first similarity scores is associated with an interaction beginning scenario of the plurality of scenarios;

determine, by the retrieve stage, a highest first similarity score among the plurality of first similarity scores;
determine, by the retrieve stage, a no interaction beginning scenario if the highest first similarity score is below a first preset threshold;
determine, by the retrieve stage, the interaction beginning scenario from the plurality of interaction beginning scenarios associated with the utterance, if the highest first similarity score is not below a first preset threshold, wherein the interaction beginning scenario is associated with the highest first similarity score of the plurality of first similarity scores indicating a beginning of the customer-agent interaction;
process, by a rerank stage, the interaction beginning scenario, if the highest first similarity score is not below the first preset threshold, wherein the code for processing by the rerank stage, of the interaction beginning scenario, further comprises code to:
  determine, by the rerank stage, a plurality of second similarity scores for the encoding of the utterance and the interaction beginning scenario, wherein each second similarity score of the plurality of second similarity scores is associated with the list of interaction beginning sample phrases associated with the interaction beginning scenario;
  determine, by the rerank stage, a no interaction beginning scenario if none of the second similarity scores among the plurality of second similarity scores exceeds a second preset threshold; and
  generate, by the rerank stage, an interaction beginning label of the interaction beginning scenario if at least one of the second similarity scores among the plurality of second similarity scores exceeds the second preset threshold;
start a recording of the customer-agent interaction;
send a record command to a recorder application;
record the customer-agent interaction to generate a recorded interaction file, wherein the recorded interaction file comprises a video recording of the customer-agent interaction;
trigger a halting of the recording of the customer-agent interaction by automatic scenario detection of an interaction ending scenario using the semantic similarity based configurable system;
halt the recording of the customer-agent interaction;
analyze the recorded interaction file by identifying a first plurality of portions of the recorded interaction file to be redacted by a rule-based redaction matching model comprising a trained neural network, and by identifying a second plurality of portions of the recorded interaction file to be redacted by automatic scenario detection of sensitive scenarios using the semantic similarity based configurable system;
redact the recorded interaction file by removing the first plurality of portions of the recorded interaction file to be redacted and the second plurality of portions of the recorded interaction file to be redacted to generate a redacted recording file;
generate a non-skip playlist comprising a plurality of non-skip ranges using a computer-vision based algorithm;
generate a smart screen metadata by utilizing a trained supervised neural network; and
store the redacted recording file, the non-skip playlist, and the smart screen metadata into a database.

16. The non-transitory computer-readable storage medium of claim 15, wherein the smart screen metadata comprises timeline snippets comprising a plurality of time ranges in the customer-agent interaction based on the plurality of non-skip ranges.

17. The non-transitory computer-readable storage medium of claim 16, wherein the smart screen metadata comprises resolution metadata, and wherein the resolution metadata is determined from natural language processing applied to the redacted recording file.

18. The non-transitory computer-readable storage medium of claim 17, wherein the smart screen metadata further comprises quality assurance metadata, and wherein the quality assurance metadata is based on the resolution metadata.

* * * * *